(12) United States Patent
Murakami et al.

(10) Patent No.: US 10,707,941 B2
(45) Date of Patent: Jul. 7, 2020

(54) TRANSMISSION METHOD, TRANSMISSION DEVICE, AND COMMUNICATION SYSTEM

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/738,426

(22) PCT Filed: Jun. 15, 2016

(86) PCT No.: PCT/JP2016/002877
§ 371 (c)(1),
(2) Date: Dec. 20, 2017

(87) PCT Pub. No.: WO2016/208151
PCT Pub. Date: Dec. 29, 2016

(65) Prior Publication Data
US 2018/0359016 A1    Dec. 13, 2018

(30) Foreign Application Priority Data

Jun. 23, 2015  (JP) ................................ 2015-125574
Apr. 21, 2016  (JP) ................................ 2016-085088

(51) Int. Cl.
H04B 7/06       (2006.01)
H04B 7/024      (2017.01)
(Continued)

(52) U.S. Cl.
CPC .......... H04B 7/0678 (2013.01); H04B 7/024 (2013.01); H04B 17/309 (2015.01);
(Continued)

(58) Field of Classification Search
CPC ......... H04W 72/1278; H04W 72/1231; H04W 76/34; H04W 76/15; H04B 7/0678; H04B 7/024; H04B 17/309
(Continued)

(56) References Cited

U.S. PATENT DOCUMENTS 5,873,044 A  *  2/1999  Goldberg ............. H04B 7/2681
                                              455/503
2009/0036150 A1    2/2009  Liao et al.
(Continued)

FOREIGN PATENT DOCUMENTS

JP    2010-535450    11/2010
JP    2011-061728     3/2011
(Continued)

OTHER PUBLICATIONS

Extended European Search Report dated May 4, 2018 in European Application No. 16813925.1.
(Continued)

*Primary Examiner* — Kevin M Burd
(74) *Attorney, Agent, or Firm* — Wenderoth, Lind & Ponack, L.L.P.

(57) ABSTRACT

An indicator in a master AP from among a plurality of APs obtains communication quality of communication with an AP which is a communication partner. In the case where the obtained communication quality is less than a threshold, the indicator causes the plurality of APs including the master AP to perform cooperative operation to transmit data. In the case where the obtained communication quality is not less than
(Continued)

the threshold, the indicator causes the plurality of APs including the master AP to stop the cooperative operation.

19 Claims, 49 Drawing Sheets

(51) Int. Cl.
| | | |
|---|---|---|
| *H04W 28/16* | (2009.01) | |
| *H04W 16/28* | (2009.01) | |
| *H04B 17/309* | (2015.01) | |
| *H04W 76/34* | (2018.01) | |
| *H04W 76/15* | (2018.01) | |
| *H04W 72/04* | (2009.01) | |

(52) U.S. Cl.
CPC .......... *H04W 16/28* (2013.01); *H04W 28/16* (2013.01); *H04W 72/0453* (2013.01); *H04W 76/15* (2018.02); *H04W 76/34* (2018.02)

(58) Field of Classification Search
USPC ......................................................... 375/262
See application file for complete search history.

(56) References Cited

U.S. PATENT DOCUMENTS

| | | |
|---|---|---|
| 2009/0129327 A1 | 5/2009 | Horn et al. |
| 2009/0129338 A1 | 5/2009 | Horn et al. |
| 2009/0135784 A1 | 5/2009 | Horn et al. |
| 2009/0137228 A1 | 5/2009 | Horn et al. |
| 2009/0137249 A1 | 5/2009 | Horn et al. |
| 2010/0098045 A1* | 4/2010 | Miyazaki ........... H04B 7/15557 370/342 |
| 2010/0260137 A1* | 10/2010 | Vrzic ................... H04L 5/0007 370/330 |
| 2012/0172076 A1 | 7/2012 | Seki |
| 2013/0083730 A1 | 4/2013 | Gaal et al. |
| 2013/0083731 A1 | 4/2013 | Gaal et al. |
| 2013/0084913 A1 | 4/2013 | Gaal et al. |
| 2013/0188575 A1* | 7/2013 | Lee ....................... H04W 24/00 370/329 |
| 2014/0071841 A1 | 3/2014 | Hu et al. |
| 2014/0073337 A1* | 3/2014 | Hong ................... H04W 16/28 455/452.1 |
| 2014/0133589 A1* | 5/2014 | Ouchi ................. H04B 7/0689 375/260 |
| 2014/0204871 A1 | 7/2014 | Ode |
| 2014/0273916 A1* | 9/2014 | Roy ................... H04B 7/15507 455/404.1 |
| 2015/0029930 A1 | 1/2015 | Horn et al. |
| 2015/0350992 A1* | 12/2015 | Han ..................... H04W 36/26 370/331 |

FOREIGN PATENT DOCUMENTS

| | | |
|---|---|---|
| JP | 2012-178822 | 9/2012 |
| JP | 2013-258736 | 12/2013 |
| JP | 2014-534678 | 12/2014 |
| WO | 2009/017447 | 2/2009 |
| WO | 2013/052134 | 4/2013 |

OTHER PUBLICATIONS

International Search Report (ISR) dated Aug. 9, 2016 in International (PCT) Application No. PCT/JP2016/002877.
Lin Cheng, et al., "Optical CoMP Transmission in Millimeter-Wave Small Cells for Mobile Fronthaul", Optical Fiber Communications Conference and Exhibition (OFC), 2014, Mar. 2014.

* cited by examiner

TRANSMISSION METHOD, TRANSMISSION DEVICE, AND COMMUNICATION SYSTEM

TECHNICAL FIELD

The present disclosure relates to a wireless communication technique.

BACKGROUND ART

Various frequency bandwidths are used in wireless communication. In wireless LAN, for example, IEEE 802.11g uses a frequency bandwidth of 2.4 GHz to 2.5 GHz band with a maximum transmission rate of 54 Mbps. In mobile phones, for example, LTE uses a frequency bandwidth of 2 GHz with a maximum transmission rate of 112.5 Mbps.

CITATION LIST

Patent Literature

PTL 1: Japanese Unexamined Patent Application Publication No. 2013-258736
PTL 2: Japanese Unexamined Patent Application Publication (Translation of PCT Application) No. 2010-535450
PTL 3: Japanese Unexamined Patent Application Publication (Translation of PCT Application) No. 2014-534678

SUMMARY OF THE INVENTION

To achieve larger-capacity transmission, the introduction of wireless communication using a frequency of 6 GHz or more, for example, a frequency bandwidth called millimeter wave, is desired.

In view of this, an aspect of the present disclosure provides, for example, a transmission method used in a plurality of transmission devices that each perform wireless transmission to a reception device using a millimeter wave frequency bandwidth, the transmission method including: obtaining communication quality of communication with the reception device; causing the plurality of transmission devices to perform cooperative operation to transmit data, in the case where the communication quality obtained is less than a threshold; and stopping the cooperative operation, in the case where the communication quality obtained is not less than the threshold.

These general and specific aspects may be implemented using a system, a method, an integrated circuit, a computer program, or a recording medium, or any combination of systems, devices, methods, integrated circuits, computer programs, or recording media.

With the transmission method according to the present disclosure, wireless transmission can be performed using a frequency bandwidth of millimeter wave in a plurality of transmission devices.

DESCRIPTION OF EXEMPLARY EMBODIMENTS

1. Underlying Knowledge Forming Basis of the Present Disclosure

As a method for realizing large-capacity transmission in a unit such as Gbps, for example, a method of introducing a wireless communication scheme that uses a frequency band such as millimeter wave is known. Radio waves in the millimeter wave frequency band have properties of high straightness and fast attenuation. It is therefore difficult to widen the cell range within which radio waves reach.

The inventors of the present disclosure find it difficult to realize a wireless communication system using radio waves in the millimeter wave frequency band and having a wide cell range. The inventors of the present disclosure accordingly propose a new transmission scheme that solves this problem and achieves wireless communication using radio waves in the millimeter wave frequency band.

The inventors of the present disclosure also acknowledge the demand to realize multicast or unicast communication using radio waves in the millimeter wave frequency band. In particular, there is a need for a scheme for accommodating many terminals in multicast. There is also a need to realize unicast simultaneously with multicast.

Unicast refers to designating a single address in a network and transmitting data to the specific destination. Multicast refers to designating a plurality of destinations and transmitting data to the destinations.

2. Embodiment 1

Wireless communication system 100 according to one embodiment of the present disclosure is described below.

2.1 Wireless Communication System 100

Figure 1:
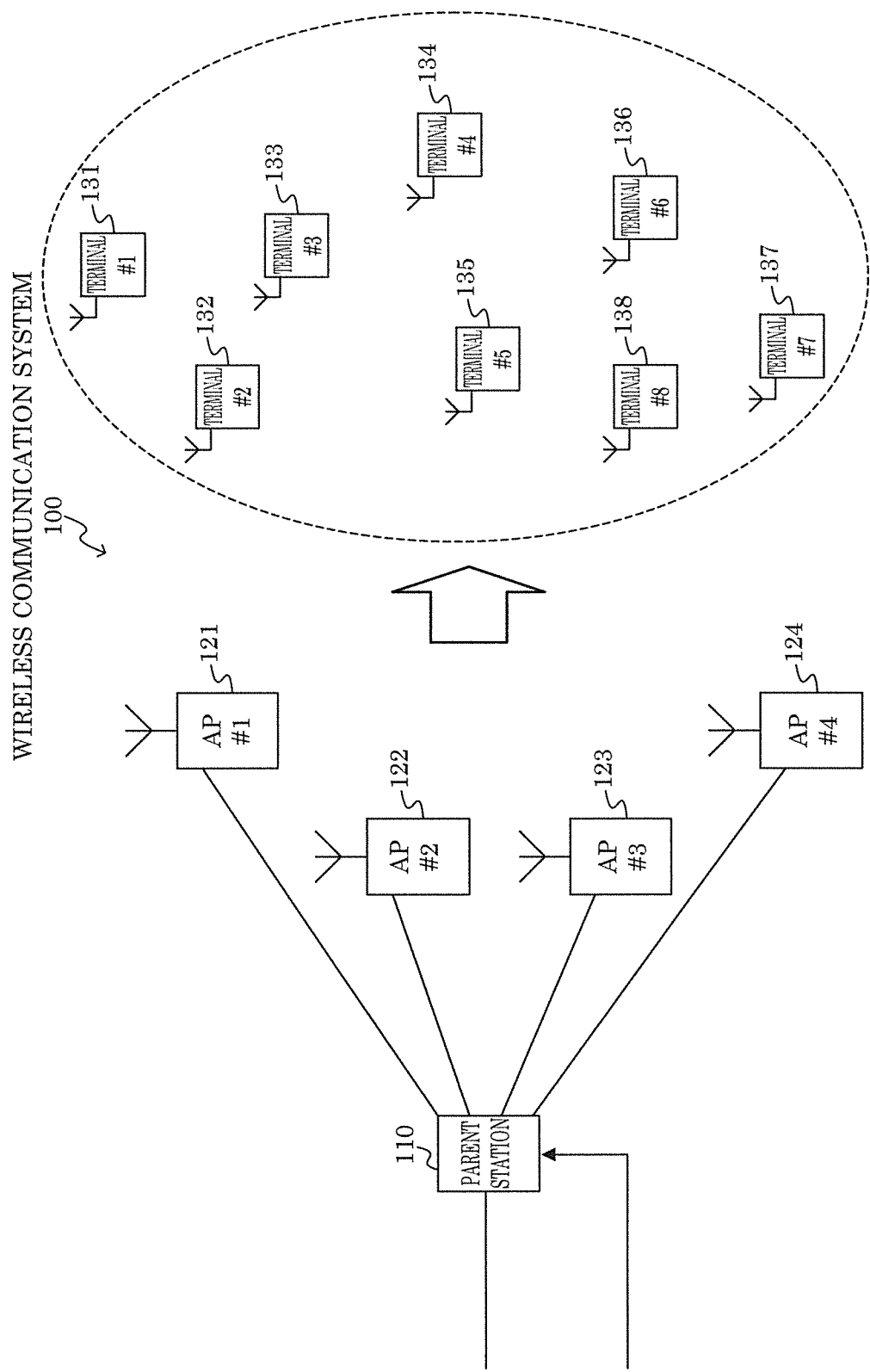
FIG. 1 is a block diagram illustrating the structure of wireless communication system 100 according to Embodiment 1.

Wireless communication system 100 includes parent station 110, access points (APs) 121, 122, 123, and 124, and terminals 131, 132, . . . , 138, as illustrated in FIG. 1.

Parent station 110 is connected to a communication device (not illustrated) directly, or indirectly via a communication line. The communication device is, for example, a broadcast device for broadcasting data or a distribution system or a server for transmitting data. The communication device transmits a control signal and data. The control signal includes unicast transmission method-related setting or multicast transmission method-related setting, and phase change method setting (described later). The communication device may include a plurality of communication devices. In this case, a first communication device may transmit the control signal, and a second communication device may transmit the data. Parent station 110 is, for example, connected wiredly to APs 121, 122, 123, and 124. Parent station 110 may be connected wirelessly to APs 121, 122, 123, and 124.

Parent station 110 receives the control signal and the data from the communication device. Parent station 110 transmits the control signal and the data to each of APs 121, 122, 123, and 124. APs 121, 122, 123, and 124 wirelessly transmit the data obtained from parent station 110.

Terminals 131, 132, . . . , 138 are each a mobile phone, a smartphone, a tablet, or a personal computer (PC) that has a wireless communication function using a frequency bandwidth of 6 GHz or more such as millimeter wave, e.g. a frequency bandwidth of 60 GHz.

Terminal 131, for example, wirelessly receives data from AP 121 in the case where terminal 131 is located near AP 121. Terminals 132, 133, . . . , 138 each wirelessly receive data from its nearby AP, as with terminal 131.

Terminal 131 also wirelessly transmits data. In the case where terminal 131 is located near AP 121, AP 121 wirelessly receives the data from terminal 131. AP 121 transmits the received data to parent station 110.

Terminals 132, 133, . . . , 138 each wirelessly transmit data, as with terminal 131. An AP located near each terminal wirelessly receives the data from the terminal. The AP transmits the data received from the terminal, to parent station 110.

Parent station 110 receives data from each terminal via a corresponding AP. Parent station 110 outputs the received data to the communication device.

2.2 AP 120

APs 121, 122, 123, and 124, for example, have the same structure (same function). APs 121, 122, 123, and 124 are described below, as AP 120 collectively.

Figure 2:
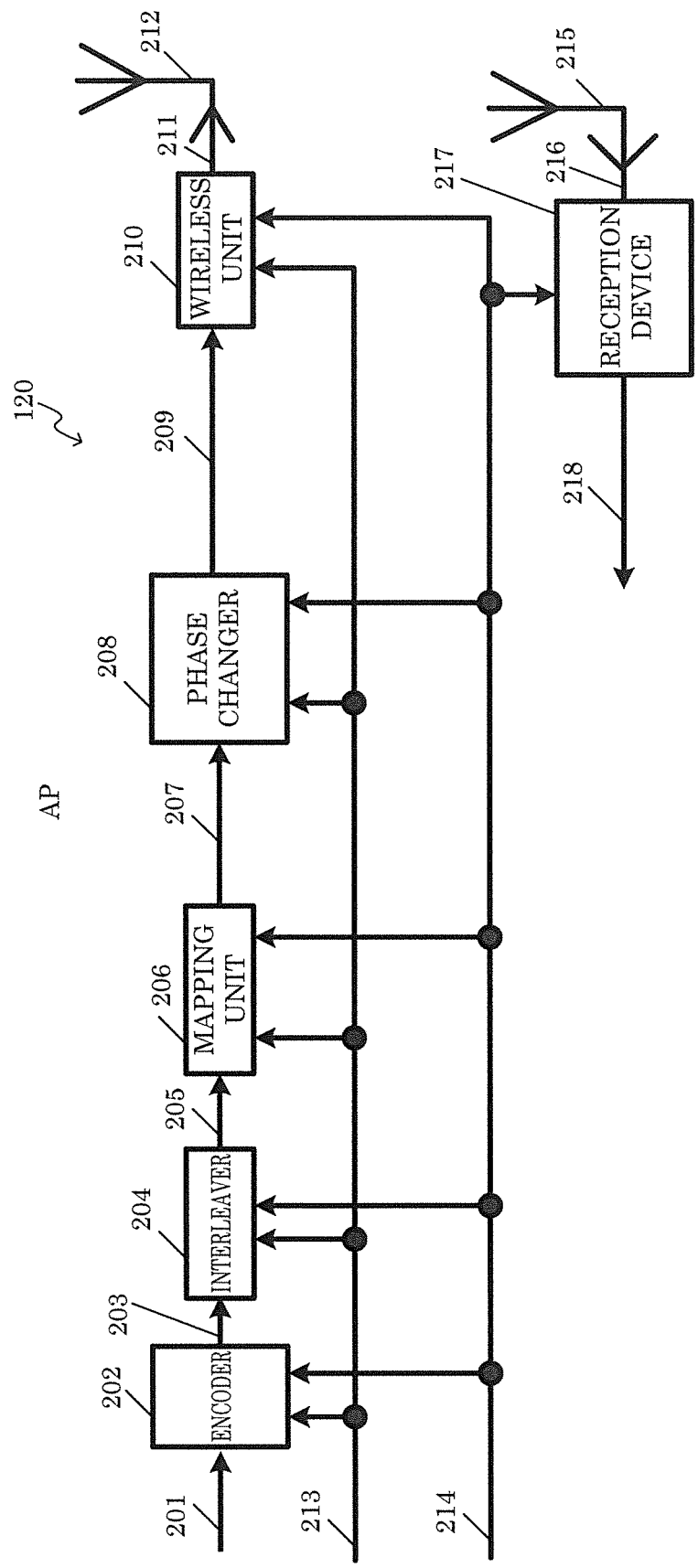
FIG. 2 is a block diagram illustrating the structure of AP 120.

AP 120 includes encoder 202, interleaver 204, mapping unit 206, phase changer 208, wireless unit 210, antenna 212, antenna 215, and reception device 217, as illustrated in FIG. 2.

AP 120 receives control signal 214 from parent station 110. Control signal 214 includes unicast transmission method-related setting or multicast transmission method-related setting, and phase change method setting.

AP 120 performs unicast transmission method-related setting, based on control signal 214 received from parent station 110. AP 120 also performs phase change method setting, based on control signal 214. In the case where multicast transmission is set, the AP is set to use the same frequency (frequency band) as other APs.

In the case where unicast transmission is set, AP 120 operates reception device 217. In the case where multicast transmission is set, AP 120 may stop the operation of reception device 217.

AP 120 performs wireless transmission/reception using the same channel (or the same frequency (frequency band)) in the case of unicast transmission and in the case of multicast transmission. Here, AP 120 may divide one wireless carrier into several time slots, and use each time slot as a communication channel. Alternatively, AP 120 may use each of a plurality of different frequencies in the frequency bandwidth of 60 GHz, as a communication channel.

(1) Encoder 202

Encoder 202 receives data 201 from parent station 110. Encoder 202 also receives control signal 213 from a controller included in AP 120. Control signal 213 includes information such as encoding scheme designation, error correction scheme designation, encoding rate, and block length. Encoder 202 performs error correction encoding, such as convolution encoding, LDPC encoding, or turbo encoding, on data 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 120. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 120. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207 (the modulation scheme is not limited to such). Mapping unit 206 outputs modulated signal 207.

Mapping unit 206 may perform mapping including a phase change process.

(4) Phase Changer 208

Phase changer 208 receives modulated signal 207 from mapping unit 206. Phase changer 208 also receives control signal 214. Control signal 214 includes phase change method setting. Phase changer 208 performs phase change on modulated signal 207 according to the phase change method setting included in control signal 214, to generate phase-changed signal 209. Phase changer 208 outputs phase-changed signal 209.

(5) Wireless Unit 210 and Antenna 212

Wireless unit 210 receives phase-changed signal 209 from phase changer 208. Wireless unit 210 also receives control signal 213 from the controller included in AP 120. Control signal 213 includes designation of frequency conversion, amplification, etc. Wireless unit 210 performs processes such as frequency conversion and amplification on phase-changed signal 209, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 110.

Although antennas 212 and 215 are described separately for convenience's sake, they may be the same entity.

2.3 Parent Station 110

Figure 3:
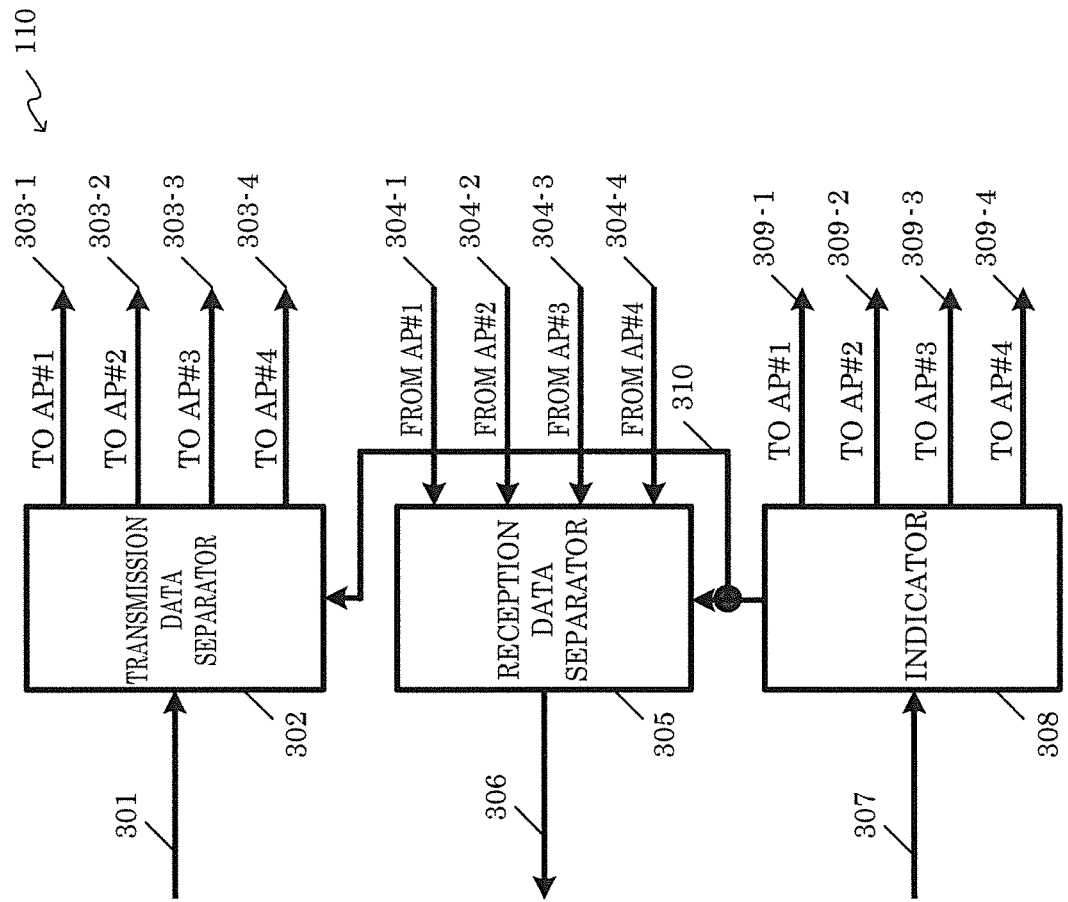
FIG. 3 is a block diagram illustrating the structure of parent station 110.

Parent station 110 includes transmission data separator 302, reception data separator 305, and indicator 308, as illustrated in FIG. 3.

(1) Indicator 308

Indicator 308 is connected to the communication device and APs 121, 122, 123, and 124.

For example, indicator 308 receives a control signal from the communication device. The control signal includes unicast transmission-related setting or multicast transmission-related setting, and phase change method setting. For example, the communication device includes a personal computer (PC) (or a computer, or the like), and the user of the PC inputs the control signal through the PC.

A separate control signal may be set for each AP, or the same control signal may be set for all APs.

Multicast transmission may be set for all APs, or unicast transmission may be set for all APs. Multicast transmission may be set for part of the APs, and unicast transmission for the other APs. Thus, multicast transmission-related setting and unicast-related setting may be mixed for the APs.

For a plurality of APs set for multicast, the modulated signal before phase change is the same signal. In other words, the same data is transmitted. A phase change method is then indicated to each AP.

For a plurality of APs set for unicast, the modulated signal before phase change may be the same signal or a different signal. In other words, the same data may be transmitted, or different data may be transmitted.

Indicator 308 outputs the received control signal to transmission data separator 302, reception data separator 305, and APs 121, 122, 123, and 124.

(2) Transmission Data Separator 302

Transmission data separator 302 is connected to the communication device, indicator 308, and APs 121, 122, 123, and 124.

Transmission data separator 302 receives the control signal from indicator 308. Transmission data separator 302 outputs the received control signal to APs 121, 122, 123, and 124.

Transmission data separator 302 also receives data from the communication device. Transmission data separator 302 separates the received data into data for AP 121, data for AP 122, data for AP 123, and data for AP 124. Transmission data separator 302 outputs the separated data to each of APs 121, 122, 123, and 124.

(3) Reception Data Separator 305

Reception data separator 305 is connected to the communication device, indicator 308, and APs 121, 122, 123, and 124.

Reception data separator 305 receives data from each of APs 121, 122, 123, and 124. Reception data separator 305 outputs the received data to the communication device.

2.4 Example of Transmitted/Received Data

An example of data transmitted/received by parent station 110 and APs 121, 122, 123, and 124 is described below.

(1) In the Case of Setting all APs for Multicast Transmission to Transmit Data

An example of transmitted data in the case of setting all APs 121, 122, 123, and 124 for multicast transmission to transmit data is described below, with reference to FIG. 4.

Figure 4:
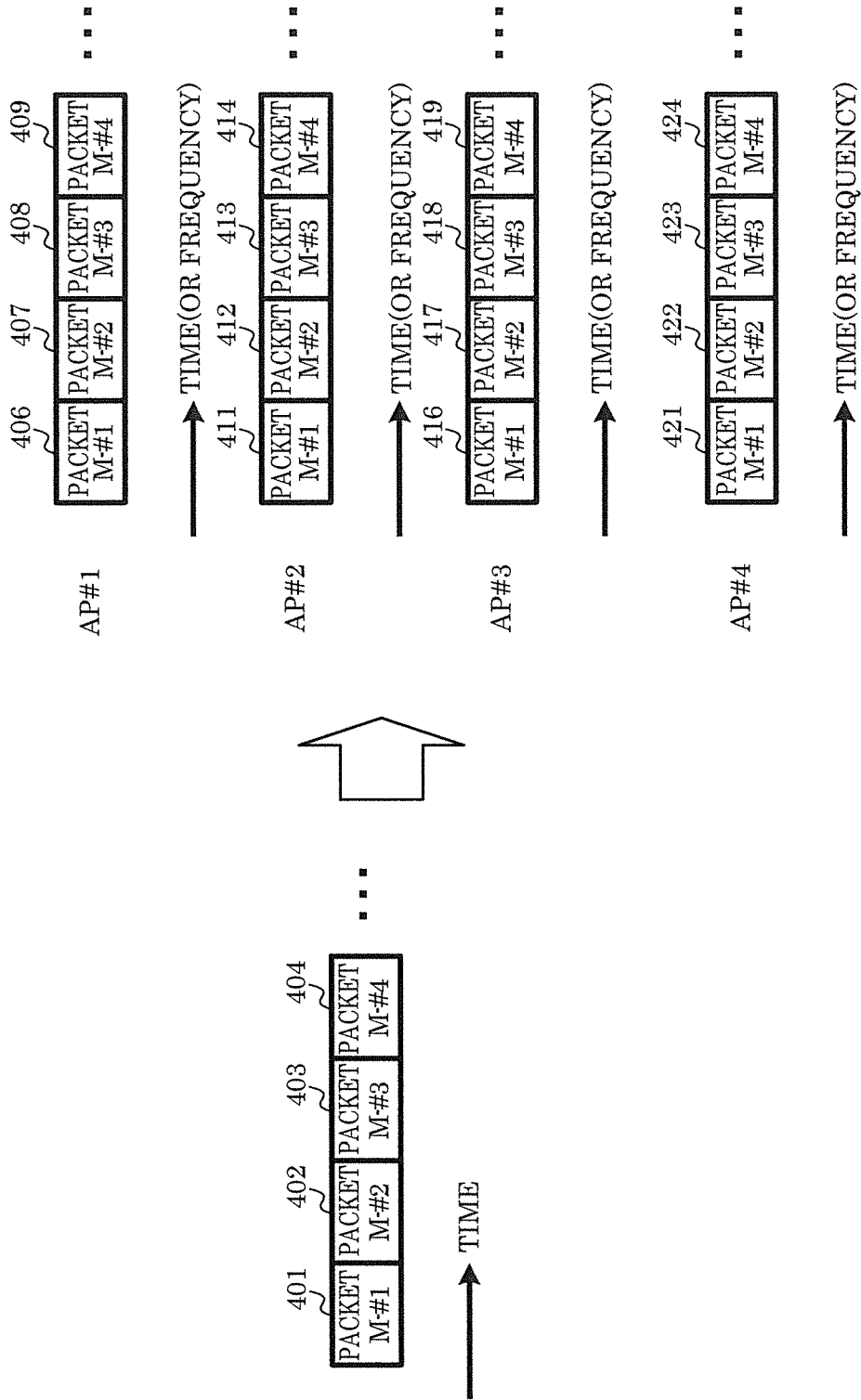
FIG. 4 is a diagram illustrating an example of transmitted data in the case of setting all four APs 121, 122, 123, and 124 for multicast to perform transmission.

Transmission data separator 302 receives packets 401, 402, 403, 404, . . . in this order, as illustrated in FIG. 4. Packets 401, 402, 403, 404, . . . are all multicast packets. Packets 401, 402, 403, 404, . . . are generated from one set of multicast data.

In the case where all APs are set for multicast, transmission data separator 302, upon receiving packet 401, outputs same packet 401 to APs 121, 122, 123, and 124. APs 121, 122, 123, and 124 wirelessly output packets 406, 411, 416, and 421 respectively. Packets 406, 411, 416, and 421 are generated based on and correspond to same packet 401.

Next, upon receiving packet 402, transmission data separator 302 outputs same packet 402 to APs 121, 122, 123, and 124. APs 121, 122, 123, and 124 wirelessly output packets 407, 412, 417, and 422 respectively, in multicast. Packets 407, 412, 417, and 422 are generated based on and correspond to same packet 402.

Next, upon receiving packet 403, transmission data separator 302 outputs same packet 403 to APs 121, 122, 123, and 124. APs 121, 122, 123, and 124 wirelessly output packets 408, 413, 418, and 423 respectively, in multicast. Packets 408, 413, 418, and 423 are generated based on and correspond to same packet 403.

Next, upon receiving packet 404, transmission data separator 302 outputs same packet 404 to APs 121, 122, 123, and 124. APs 121, 122, 123, and 124 wirelessly output packets 409, 414, 419, and 424 respectively, in multicast. Packets 409, 414, 419, and 424 are generated based on and correspond to same packet 404.

In this case, a feature lies in that APs 121, 122, 123, and 124 each perform phase change on the modulated signal (alternatively, any of APs 121, 122, 123, and 124 may perform no phase change).

(The phase change method will be described in detail later.)

This has the advantages of widening the cell range within the reach of a multicast modulated signal, and reducing, by means of phase change, points at which reception is difficult due to modulated signal interference.

(2) In the Case of Setting Two APs for Multicast Transmission to Transmit Data

An example of transmitted data in the case of setting two APs 121 and 122 as multicast data transmission APs and other two APs 123 and 124 as unicast data transmission APs to transmit data is described below, with reference to FIG. 5. In this case. APs 121 and 122 transmit the same data (the modulated signal after mapping and before phase change is the same). Moreover, APs 123 and 124 transmit the same data (the modulated signal after mapping and before phase change is the same).

Figure 5:
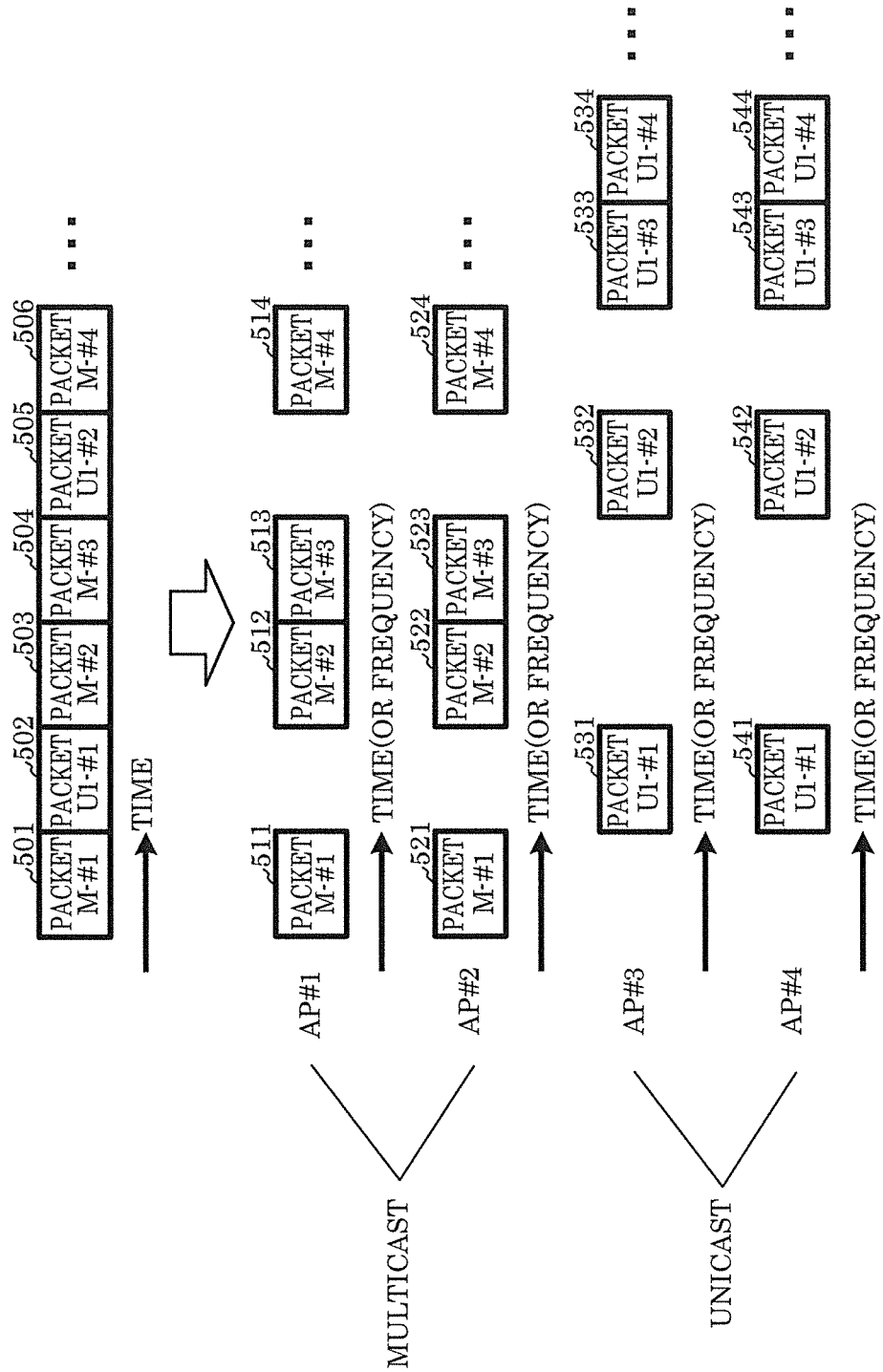
FIG. 5 is a diagram illustrating an example of transmitted data in the case of setting APs 121 and 122 for multicast and APs 123 and 124 for unicast to perform transmission

Transmission data separator 302 receives packets 501, 502, 503, 504, 505, 506, . . . in this order, as illustrated in FIG. 5. Packets 501, 503, 504, 506, . . . are multicast packets. Packets 502 and 505 are unicast packets.

Packets 501, 503, 504, and 506 are generated from one set of multicast data. Packets 502 and 505 are generated from one set of unicast data.

Upon receiving packet 501, transmission data separator 302 outputs same packet 501 to APs 121 and 122. APs 121 and 122 wirelessly output packets 511 and 521 respectively, in multicast transmission. Packets 511 and 521 are generated based on and correspond to same packet 501.

Next, upon receiving packet 502, transmission data separator 302 outputs same packet 502 to APs 123 and 124. APs 123 and 124 wirelessly output packets 531 and 541 respectively, in unicast transmission. Packets 531 and 541 are generated based on and correspond to same packet 502.

Next, upon receiving packet 503, transmission data separator 302 outputs same packet 503 to APs 121 and 122. APs 121 and 122 wirelessly output packets 512 and 522 respectively, in multicast transmission. Packets 512 and 522 are generated based on and correspond to same packet 503.

Next, upon receiving packet 504, transmission data separator 302 outputs same packet 504 to APs 121 and 122. APs 121 and 122 wirelessly output packets 513 and 523 respectively, in multicast transmission. Packets 513 and 523 are generated based on and correspond to same packet 504.

Next, upon receiving packet 505, transmission data separator 302 outputs same packet 505 to APs 123 and 124. APs 123 and 124 wirelessly output packets 532 and 542 respectively, in unicast transmission. Packets 532 and 542 are generated based on and correspond to same packet 505.

Next, upon receiving packet 506, transmission data separator 302 outputs same packet 506 to APs 121 and 122. APs 121 and 122 wirelessly output packets 514 and 524 respectively, in multicast transmission. Packets 514 and 524 are generated based on and correspond to same packet 506.

As described above, in the case of transmitting the modulated signal in unicast transmission, the packets transmitted in APs 123 and 124 are based on the same data. Here, APs 123 and 124 have the same transmission parameter. APs 123 and 124 may perform different phase changes. Alternatively, any of APs 123 and 124 may perform no phase change.

This has the advantages of widening the cell range within the reach of a unicast modulated signal, and reducing, by means of phase change, points at which reception is difficult due to modulated signal interference.

A feature lies in that APs 121 and 122 each perform phase change on the modulated signal. Alternatively any of APs 121 and 122 may perform no phase change. The phase change method will be described in detail later.

This has the advantages of widening the cell range within the reach of a multicast modulated signal, and reducing, by means of phase change, points at which reception is difficult due to modulated signal interference.

(3) In the Case of Setting Two APs for Multicast Transmission to Transmit Data

Figure 6:
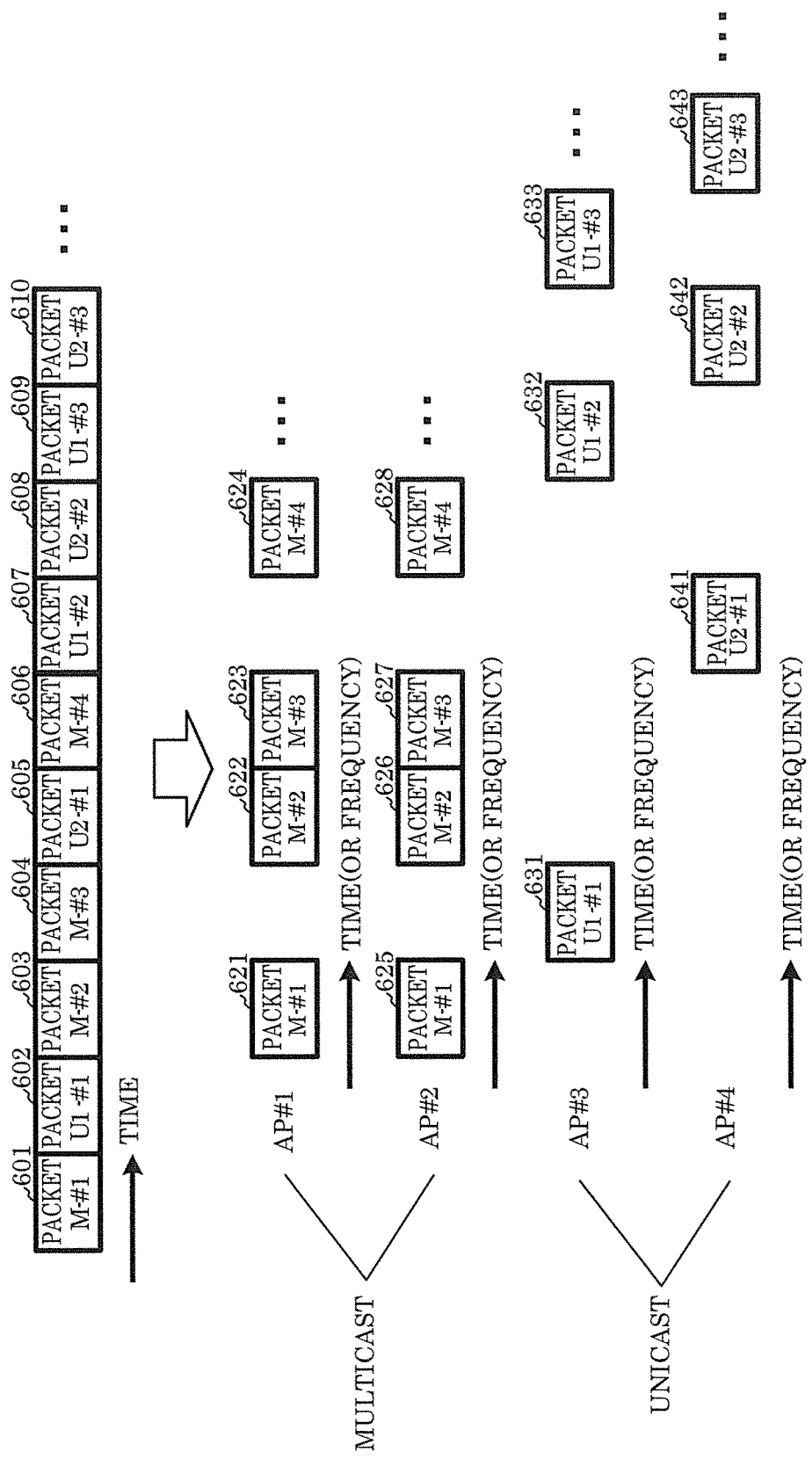
FIG. 6 is a diagram illustrating an example of transmitted data in the case of setting APs 121 and 122 for multicast and APs 123 and 124 for unicast to perform transmission

An example of transmitted data in the case of setting two APs 121 and 122 for multicast transmission to transmit data and setting other two APs 123 and 124 for unicast transmission to transmit data is described below, with reference to FIG. 6. In FIG. 6, APs 123 and 124 transmit different data, unlike in FIG. 5.

Transmission data separator 302 receives packets 601, 602, 603, 604, 605, 606, 607, 608, 609, 610, . . . in this order, as illustrated in FIG. 6. Packets 601, 603, 604, and 606 are multicast packets. Packets 602, 607, and 609 are unicast packets transmitted by AP 123. Packets 605, 608, and 610 are unicast packets transmitted by AP 124.

Packets 601, 603, 604, and 606 are generated from one set of multicast data. Packets 602, 607, and 609 are generated from one set of unicast data. Packets 605, 608, and 610 are generated from another set of unicast data.

Upon receiving packet 601, transmission data separator 302 outputs same packet 601 to APs 121 and 122. APs 121 and 122 wirelessly output packets 621 and 625 respectively, in multicast transmission. Packets 621 and 625 are generated based on and correspond to same packet 601.

Next, upon receiving packet 602, transmission data separator 302 outputs packet 602 to AP 123. AP 123 wirelessly outputs packet 631, in unicast transmission.

Next, upon receiving packet 603, transmission data separator 302 outputs same packet 603 to APs 121 and 122. APs 121 and 122 wirelessly output packets 622 and 626 respectively, in multicast transmission. Packets 622 and 626 are generated based on and correspond to same packet 603.

Next, upon receiving packet 604, transmission data separator 302 outputs same packet 604 to APs 121 and 122. APs 121 and 122 wirelessly output packets 623 and 627 respectively, in multicast transmission. Packets 623 and 627 are generated based on and correspond to same packet 604.

Next, upon receiving packet 605, transmission data separator 302 outputs packet 605 to AP 124. AP 124 wirelessly outputs packet 641, in unicast transmission.

Next, upon receiving packet 606, transmission data separator 302 outputs same packet 606 to APs 121 and 122. APs 121 and 122 wirelessly output packets 624 and 628 respectively, in multicast transmission. Packets 624 and 628 are generated based on and correspond to same packet 606.

Next, upon receiving packet 607, transmission data separator 302 outputs packet 607 to AP 123. AP 123 wirelessly outputs packet 632, in unicast transmission.

Next, upon receiving packet 608, transmission data separator 302 outputs packet 608 to AP 124. AP 124 wirelessly outputs packet 642, in unicast transmission.

Next, upon receiving packet 609, transmission data separator 302 outputs packet 609 to AP 123. AP 123 wirelessly outputs packet 633, in unicast transmission.

Next, upon receiving packet 610, transmission data separator 302 outputs packet 610 to AP 124. AP 124 wirelessly outputs packet 643, in unicast transmission.

A feature lies in that APs 121 and 122 each perform phase change on the modulated signal. Alternatively, any of APs 121 and 122 may perform no phase change. The phase change method will be described in detail later.

This has the advantages of widening the cell range within the reach of a multicast modulated signal, and reducing, by means of phase change, points at which reception is difficult due to modulated signal interference.

Moreover, a flexible system in which APs 123 and 124 can perform unicast communication is realized.

There is thus the advantage of realizing a flexible system by, for example, switching the transmission state among the transmission state in FIG. 4, the transmission state in FIG. 5, and the transmission state in FIG. 6 depending on time (e.g. switching depending on the terminal presence situation).

(4) In the Case of Setting Two APs for Multicast Transmission to Receive Data

Figure 7:
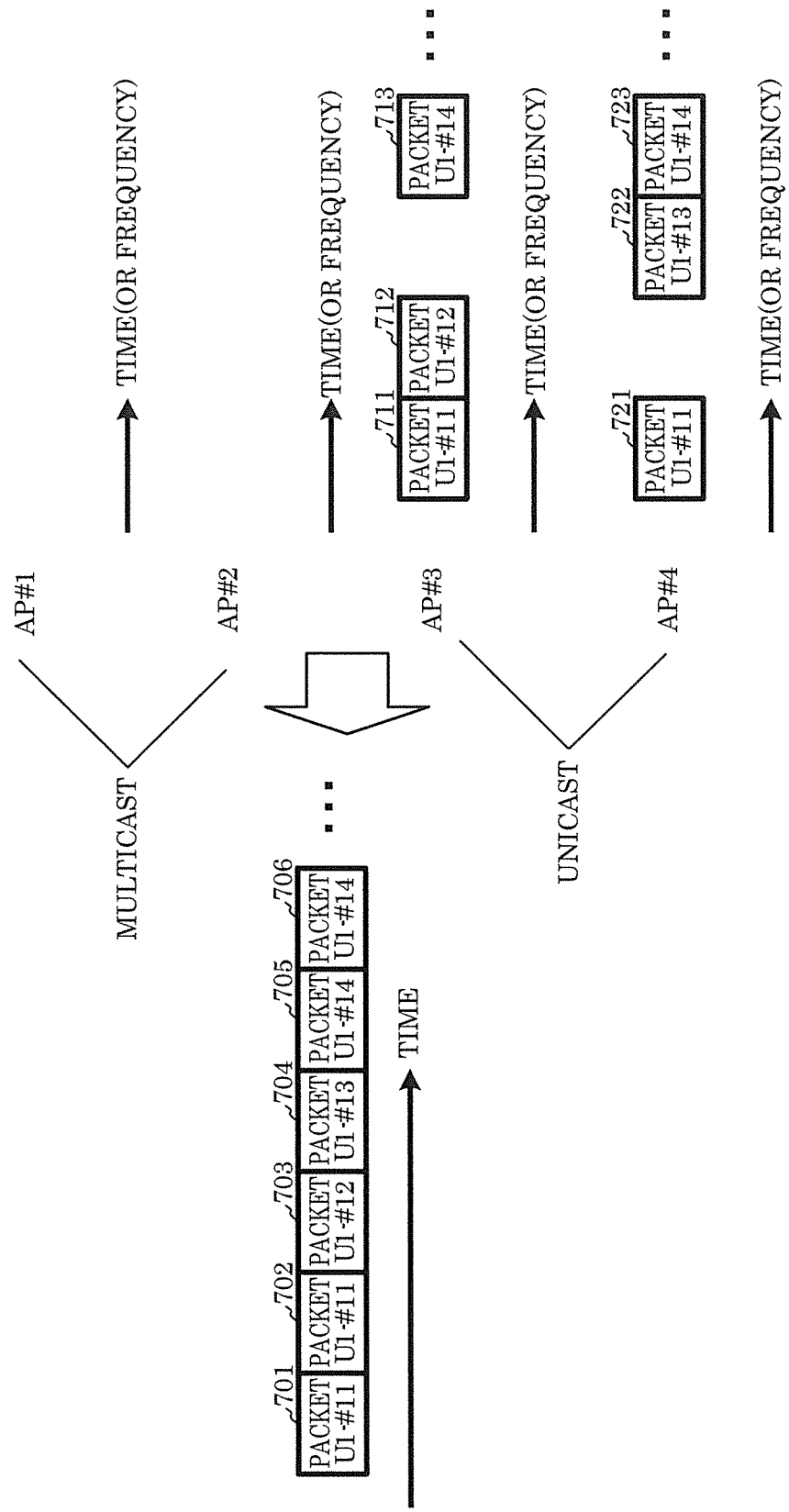
FIG. 7 is a diagram illustrating an example of received data in the case of setting APs 121 and 122 for multicast and APs 123 and 124 for unicast to perform reception.

An example of received data in the case of setting two APs 121 and 122 for multicast transmission and other two APs 123 and 124 for unicast transmission to receive data is described below, with reference to FIG. 7. In this case, APs 121 and 122 do not receive data (because they are multicast transmission APs). Meanwhile, APs 123 and 124 receive signals including the same data.

Reception device 217 in AP 123 receives and obtains packets 711, 712, 713, . . . in this order. Reception device 217 in AP 124 receives and obtains packets 721, 722, 723, . . . in this order. Suppose one packet between packets 712 and 713 received by reception device 217 in AP 123 is not obtained. Also suppose one packet between packets 721 and 722 received by reception device 217 in AP 124 is not obtained.

When reception device 217 in AP 123 receives packet 711, reception data separator 305 receives packet 701. Packets 711 and 702 correspond to each other.

Next, when reception device 217 in AP 124 receives packet 721, reception data separator 305 receives packet 702. Packets 721 and 702 correspond to each other.

Next, when reception device 217 in AP 123 receives packet 712, reception data separator 305 receives packet 703. Packets 712 and 703 correspond to each other.

Next, when reception device 217 in AP 124 receives packet 722, reception data separator 305 receives packet 704. Packets 722 and 704 correspond to each other.

Next, when reception device 217 in AP 123 receives packet 713, reception data separator 305 receives packet 705. Packets 713 and 705 correspond to each other.

Next, when reception device 217 in AP 124 receives packet 723, reception data separator 305 receives packet 706. Packets 723 and 706 correspond to each other.

For example, APs 123 and 124 may perform maximum ratio combining, and then perform demodulation/decoding, to obtain packets.

(5) In the Case of Setting Two APs for Multicast Transmission to Receive Data

Figure 8:
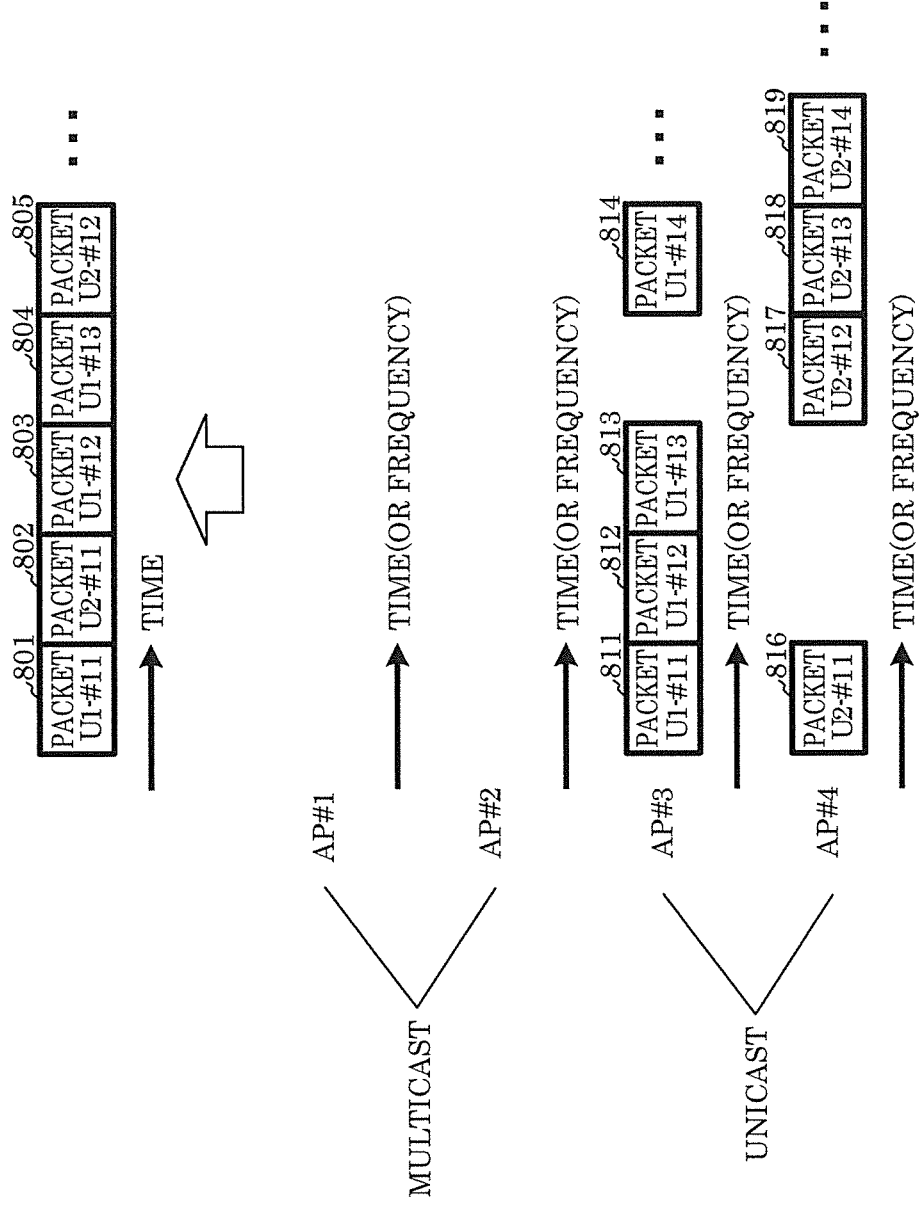
FIG. 8 is a diagram illustrating an example of received data in the case of setting APs 121 and 122 for multicast and APs 123 and 124 for unicast to perform reception.

An example of received data in the case of setting two APs 121 and 122 for multicast transmission and other two APs 123 and 124 for unicast transmission to receive data is described below, with reference to FIG. 8. In this case. APs 121 and 122 do not receive data. Meanwhile, APs 123 and 124 receive different data.

Reception device 217 in AP 123 receives packets 811, 812, 813, 814, . . . in this order, in unicast. Reception device 217 in AP 124 receives packets 816, 817, 818, 819, . . . in this order, in unicast.

Packets 811, 812, 813, 814, . . . are generated from one set of unicast data. Packets 816, 817, 818, 819, . . . are generated from another set of unicast data.

When reception device 217 in AP 123 receives packet 811, reception data separator 305 receives packet 801. Packets 811 and 801 correspond to each other.

When reception device 217 in AP 124 receives packet 816, reception data separator 305 receives packet 802. Packets 816 and 802 correspond to each other.

When reception device 217 in AP 123 receives packet 812, reception data separator 305 receives packet 803. Packets 812 and 803 correspond to each other.

When reception device 217 in AP 123 receives packet 813, reception data separator 305 receives packet 804. Packets 813 and 804 correspond to each other.

When reception device 217 in AP 124 receives packet 817, reception data separator 305 receives packet 805. Packets 817 and 805 correspond to each other.

Figure 9:
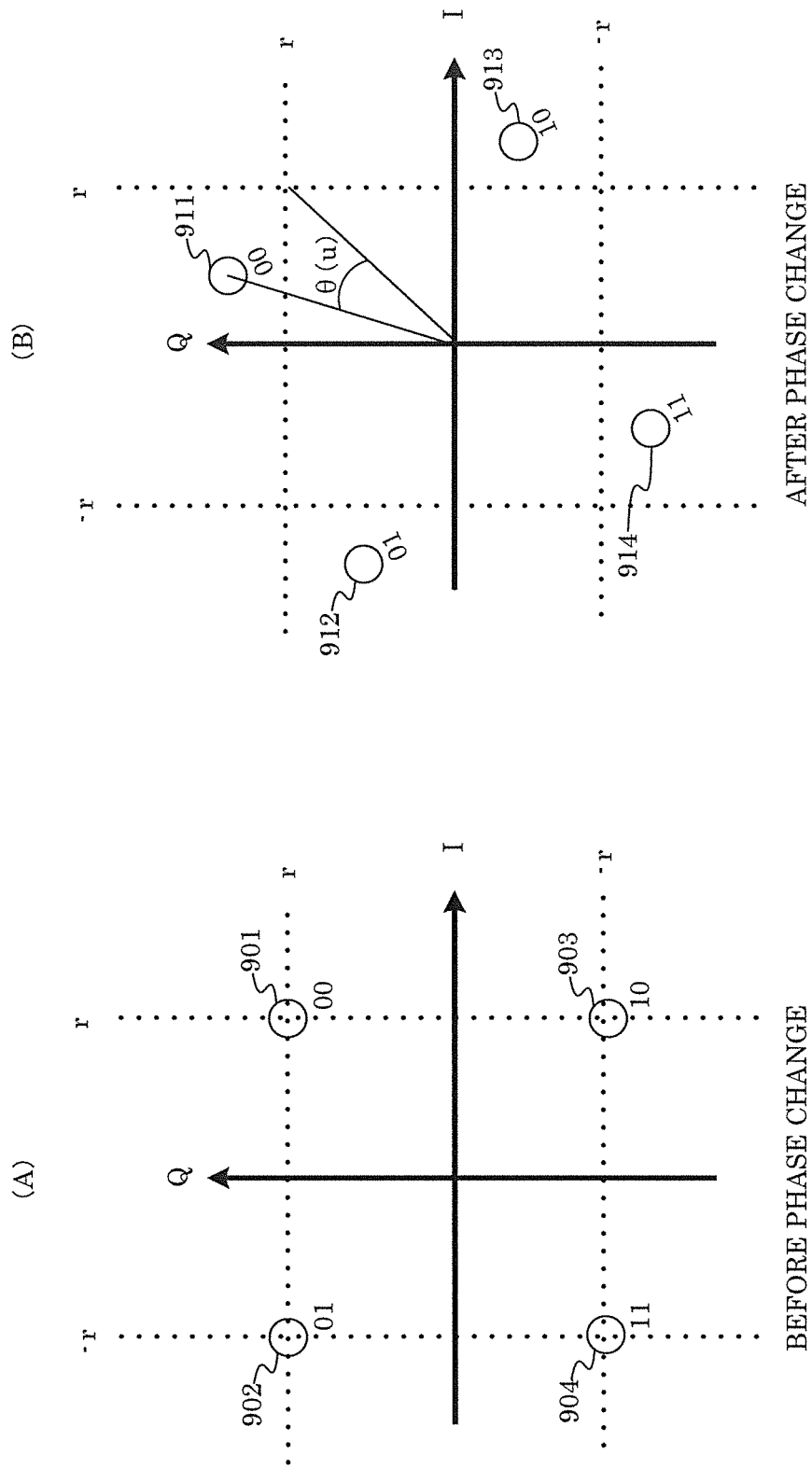
FIG. 9 is a diagram in which (A) illustrates an example of a mapping method in IQ plane of in-phase component I and quadrature component Q that constitute a signal in QPSK modulation, and (B) illustrates an example of a mapping method after phase change.

2.5 Mapping Method and Phase Change (A) in FIG. 9 illustrates an example of a mapping method in IQ plane of in-phase component I and quadrature component Q that constitute a signal in QPSK modulation.

As illustrated in (A) in FIG. 9, for example in the case where input data is "00", mapping unit 206 outputs in-phase component I=r and quadrature component Q=r of a baseband signal. Likewise, in the case where input data is "01", mapping unit 206 outputs in-phase component I=−r and quadrature component Q=r of a baseband signal. In the case where input data is "10", mapping unit 206 outputs in-phase component I=r and quadrature component Q=−r of a baseband signal. Likewise, in the case where input data is "11", mapping unit 206 outputs in-phase component I=−r and quadrature component Q=−r of a baseband signal. Signal points 901, 902, 903, and 904 illustrated in (A) in FIG. 9 are thus obtained. (B) in FIG. 9 illustrates an example of a mapping method after phase change.

Rotating signal points 901, 902, 903, and 904 in (A) in FIG. 9 by θ(u) about the origin point (where u is a symbol number) yields signal points 911, 912, 913, and 914 in (B) in FIG. 9. The phase change value is a function of symbol number u, and so is denoted as θ(u).

2.6 Phase Changer

Figure 10:
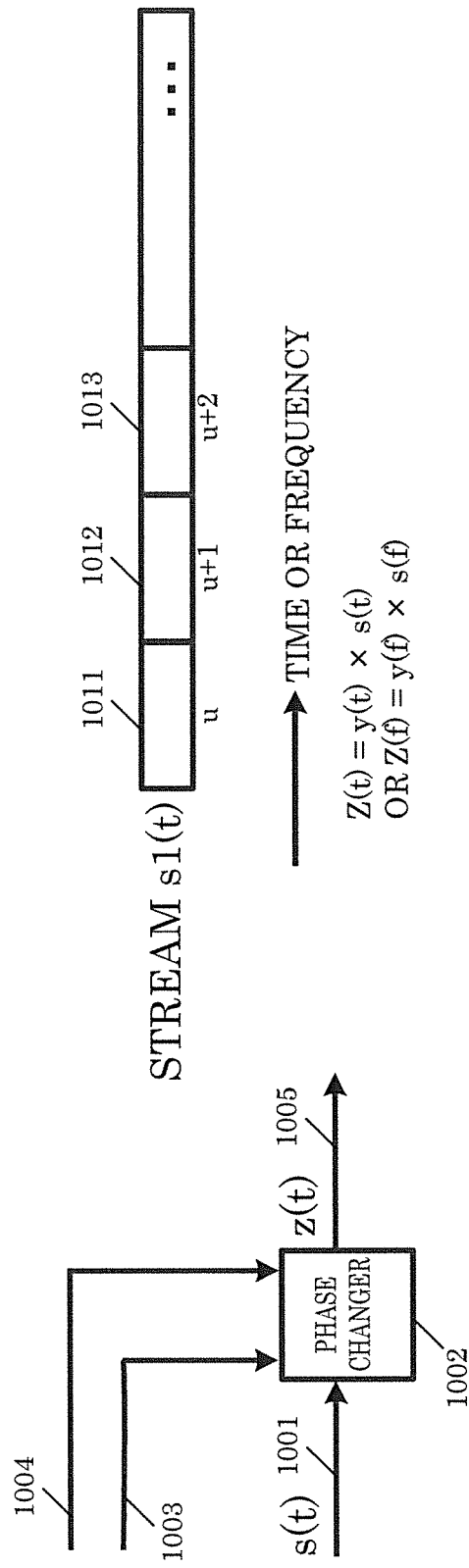
FIG. 10 is a diagram illustrating phase change by phase changer 1002.

AP 120 in wireless communication system 100 may include phase changer 1002 illustrated in FIG. 10, instead of phase changer 208 illustrated in FIG. 2.

Phase changer 1002 receives modulated baseband signal s(t)(1001).

Phase changer 1002 calculates phase-changed signal z(t), according to the following Expression (1).

[Math. 1]

$$z(t)=y(t)\times s(t) \text{ (where } t \text{ is time)} \quad \text{Expression (1).}$$

Phase changer 1002 outputs phase-changed signal z(t) (1005).

Here, y(t) may be set as follows.

[Math. 2]

$$y(u) = e^{j0} \quad \text{(at time } u\text{)}$$
$$y(u+1) = e^{j\frac{\pi}{2}} \quad \text{(at time } u+1\text{)}$$
$$y(u+2) = e^{j\pi} \quad \text{(at time } u+2\text{)}$$
$$y(u+3) = e^{j\frac{3\pi}{2}} \quad \text{(at time } u+3\text{)}$$
$$\vdots$$
$$y(u+k) = e^{j\frac{k\pi}{2}} \quad \text{(at time } u+k\text{)}$$
$$\vdots$$

Phase changer 1002 may calculate phase-changed signal z(f) according to Expression (3), instead of z(t).

[Math. 3]

$$z(f)=y(f)\times s(f) \text{ (where } f \text{ is frequency)} \quad \text{Expression (3).}$$

In this case, phase changer 1002 outputs phase-changed signal z(f).

Wireless communication system 100 may hold a plurality of phase change patterns. Each AP is then assigned one phase change pattern.

For example, wireless communication system 100 holds four phase change patterns of cycles N1, N2, N3, and N4. A phase change pattern of cycle N1 (the phase change value is denoted as y1($i$), where y1($i$) is a function of symbol number i) is assigned to AP 121. A phase change pattern of cycle N2 (the phase change value is denoted as y2($i$), where y2($i$) is a function of symbol number i) is assigned to AP 122. A phase change pattern of cycle N3 (the phase change value is denoted as y3($i$), where y3($i$) is a function of symbol number i) is assigned to AP 123. A phase change pattern of cycle N4 (the phase change value is denoted as y4($i$), where y4($i$) is a function of symbol number i) is assigned to AP 124.

Phase changer 1002 in AP 121 calculates phase-changed signal z(i) according to the following Expression (4).

[Math. 4]

$$z(i)=y1(k)\times s(i) \quad \text{Expression (4).}$$

Here, k=i mod N1, where N1 is an integer greater than or equal to 2, and i is, for example, an integer greater than or equal to 0. i mod N1 denotes the remainder after division of i by N1 (mod: modulo).

Phase changer 1002 in AP 122 calculates phase-changed signal z(i), according to the following Expression (5).

[Math. 5]

$$z(i)=y2(k)\times s(i) \quad \text{Expression (5).}$$

Here, k=i mod N2, where N2 is an integer greater than or equal to 2, and i is, for example, an integer greater than or equal to 0. i mod N2 denotes the remainder after division of i by N2 (mod: modulo).

Phase changer 1002 in AP 123 calculates phase-changed signal z(i), according to the following Expression (6).

[Math. 6]

$$z(i)=y3(k)\times s(i) \quad \text{Expression (6).}$$

Here, k=i mod N3, where N3 is an integer greater than or equal to 2, and i is, for example, an integer greater than or equal to 0. i mod N3 denotes the remainder after division of i by N3 (mod: modulo).

Phase changer 1002 in AP 124 calculates phase-changed signal z(i), according to the following Expression (7).

[Math. 7]

$$z(i)=y4(k)\times s(i) \quad \text{Expression(7).}$$

Here, k=i mod N4, where N4 is an integer greater than or equal to 2, and i is, for example, an integer greater than or equal to 0. i mod N4 denotes the remainder after division of i by N4 (mod: modulo).

If possible, different phase change patterns are preferably used. In the case where a first AP and a second AP are near each other, the phase change pattern assigned to the first AP and the phase change pattern assigned to the second AP may be different.

Alternatively, the phase change pattern assigned to the first AP and the phase change pattern assigned to the second AP may be the same.

Any of APs 121, 122, 123, and 124 may perform no phase change.

2.7 Operation in Wireless Communication System 100

Operation in wireless communication system 100 is described below.

(1) Packet Transmission Operation

Figure 11:
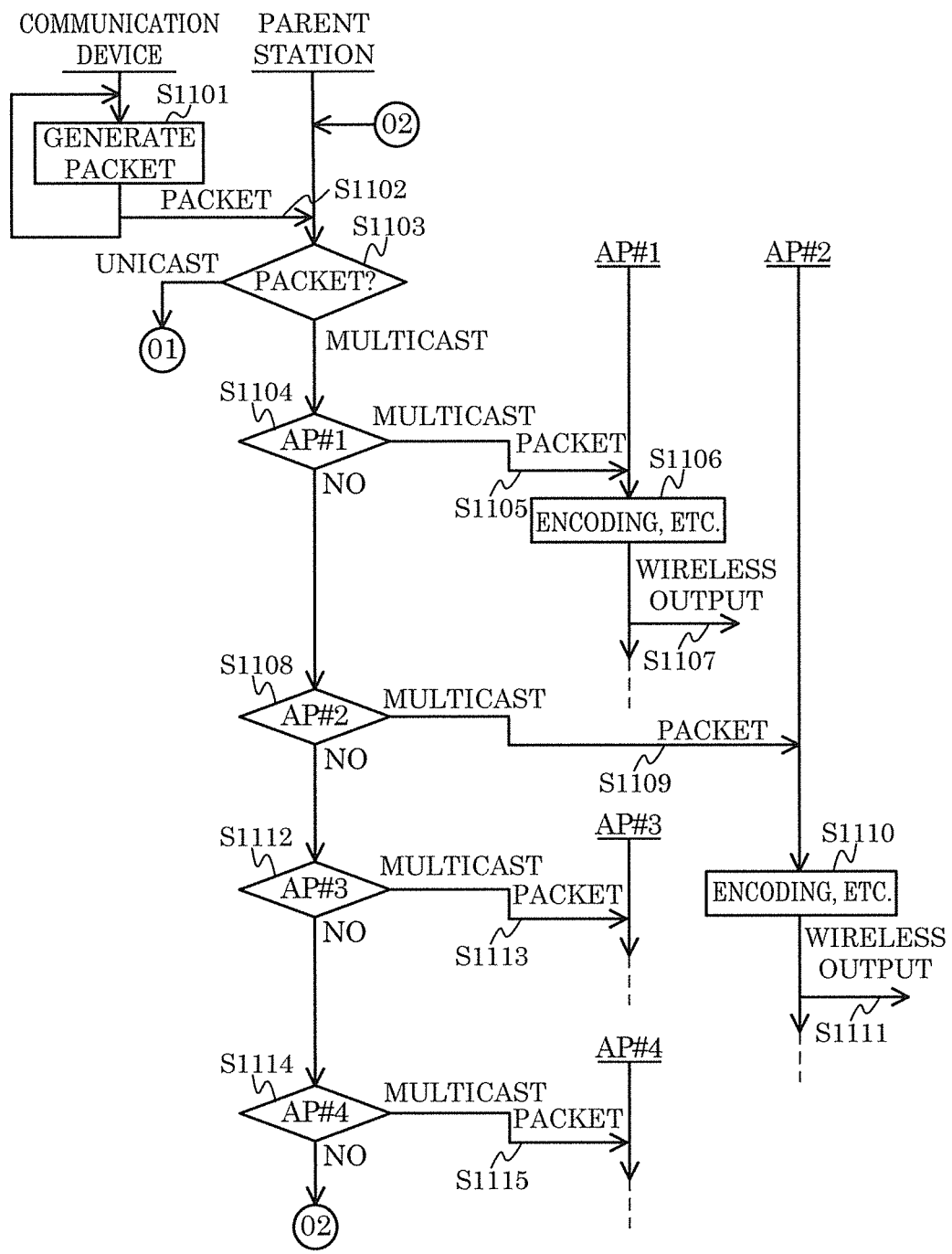
FIG. 11 is a (first) sequence diagram illustrating packet transmission operation in parent station 110 and APs 121, 122, 123, and 124 in wireless communication system 100, followed by FIG. 12.
Figure 12:
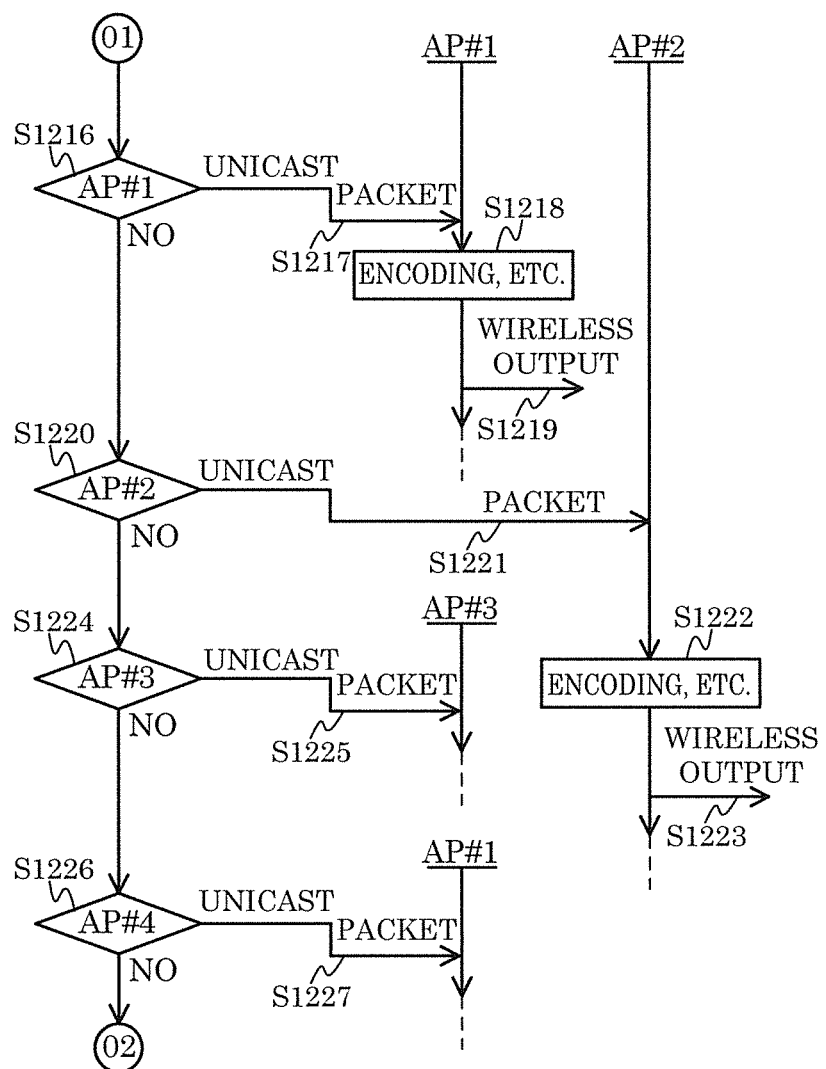
FIG. 12 is a (second) sequence diagram illustrating packet transmission operation in parent station 110 and APs 121, 122, 123, and 124 in wireless communication system 100.

Packet transmission operation in parent station 110 and APs 121, 122, 123, and 124 in wireless communication system 100 is described below, with reference to sequence diagrams in FIGS. 11 to 12.

The communication device generates a packet (Step S1101), and transmits the generated packet to parent station 110 (Step S1102). The communication device returns to Step S1101, and repeats packet generation and packet transmission.

Transmission data separator 302 receives the packet from the communication device (Step S1102). Transmission data separator 302 determines whether the received packet is for multicast or for unicast (Step S1103). In the case where the received packet is for unicast (Step S1103: "unicast"), transmission data separator 302 transfers control to Step S1216.

In the case where the received packet is for multicast (Step S1103: "multicast"), transmission data separator 302 determines whether or not AP 121 is set for multicast (Step S1104). In the case where AP 121 is set for multicast (Step S1104: "multicast"), transmission data separator 302 outputs the received packet to AP 121 (Step S1105). AP 121 receives the packet (Step S1105). AP 121 performs processes such as encoding, interleaving, mapping, and phase change (Step S1106). AP 121 then wirelessly outputs a signal (Step S1107).

In the case where AP 121 is not set for multicast (Step S1104: "No"), transmission data separator 302 determines whether or not AP 122 is set for multicast (Step S1108). In the case where AP 122 is set for multicast (Step S1108: "multicast"), transmission data separator 302 outputs the received packet to AP 122 (Step S1109). AP 122 receives the packet (Step S1109). AP 122 performs processes such as encoding, interleaving, mapping, and phase change (Step S1110). AP 122 then wirelessly outputs a signal (Step S1111).

In the case where AP 122 is not set for multicast (Step S1108: "No"), transmission data separator 302 determines whether or not AP 123 is set for multicast (Step S1112). In the case where AP 123 is set for multicast (Step S1112: "multicast"), transmission data separator 302 outputs the received packet to AP 123 (Step S1113). AP 123 receives the packet (Step S1113). AP 123 performs processes such as encoding, interleaving, mapping, and phase change, and wirelessly outputs a signal.

In the case where AP 123 is not set for multicast (Step S1112: "No"), transmission data separator 302 determines whether or not AP 124 is set for multicast (Step S1114). In the case where AP 124 is set for multicast (Step S1114: "multicast"), transmission data separator 302 outputs the received packet to AP 124 (Step S1115). AP 124 receives the packet (Step S1115). AP 124 performs processes such as encoding, interleaving, mapping, and phase change, and wirelessly outputs a signal.

In the case where AP 124 is not set for multicast (Step S1114: "No"), transmission data separator 302 returns control to Step S1102.

In the case where the received packet is for unicast (Step S1103: "unicast"), transmission data separator 302 determines whether or not AP 121 is set for unicast (Step S1216). In the case where AP 121 is set for unicast (Step S1216: "unicast"), transmission data separator 302 outputs the received packet to AP 121 (Step S1217). AP 121 receives the packet (Step S1217). AP 121 performs processes such as encoding, interleaving, mapping, and phase change (Step S1218). AP 121 then wirelessly outputs a signal (Step S1219).

In the case where AP 121 is not set for unicast (Step S1216: "No"), transmission data separator 302 determines whether or not AP 122 is set for unicast (Step S1220). In the case where AP 122 is set for unicast (Step S1220: "unicast"), transmission data separator 302 outputs the received packet to AP 122 (Step S1221). AP 122 receives the packet (Step S1221). AP 122 performs processes such as encoding, interleaving, mapping, and phase change (Step S1222). AP 122 then wirelessly outputs a signal (Step S1223).

In the case where AP 122 is not set for unicast (Step S1220: "No"), transmission data separator 302 determines whether or not AP 123 is set for unicast (Step S1224). In the case where AP 123 is set for unicast (Step S1224: "unicast"), transmission data separator 302 outputs the received packet to AP 123 (Step S1225). AP 123 receives the packet (Step S1225). AP 123 performs processes such as encoding, interleaving, mapping, and phase change, and wirelessly outputs a signal.

In the case where AP 123 is not set for unicast (Step S1224: "No"), transmission data separator 302 determines whether or not AP 124 is set for unicast (Step S1226). In the case where AP 124 is set for unicast (Step S1226: "unicast"), transmission data separator 302 outputs the received packet to AP 124 (Step S1227). AP 124 receives the packet (Step S1227). AP 124 performs processes such as encoding, interleaving, mapping, and phase change, and wirelessly outputs a signal.

In the case where AP 124 is not set for unicast (Step S1226: "No"), transmission data separator 302 returns control to Step S1102.

(2) Packet Reception Operation

Figure 13:
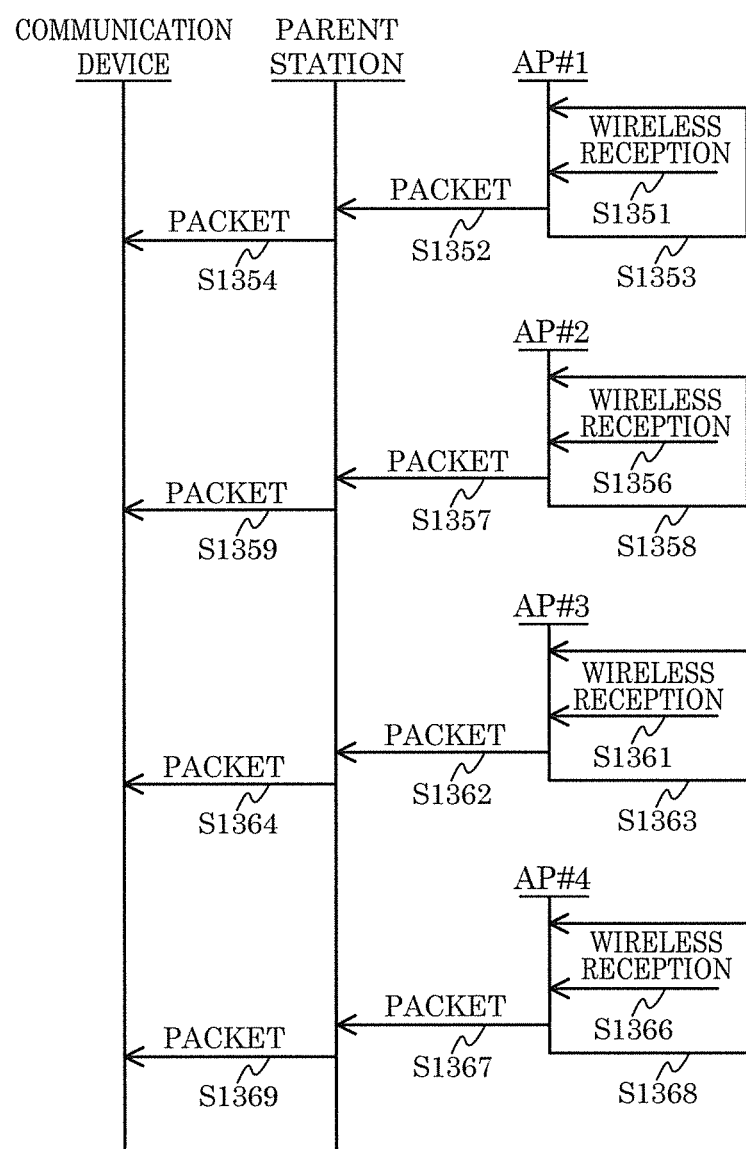
FIG. 13 is a sequence diagram illustrating packet reception operation in parent station 110 and APs 121, 122, 123, and 124 in wireless communication system 100.

Packet reception operation in parent station 110 and APs 121, 122, 123, and 124 in wireless communication system 100 is described below, with reference to a sequence diagram in FIG. 13.

Reception device 217 in AP 121 wirelessly receives a signal (Step S1351). Reception device 217 then outputs a packet to parent station 110 (Step S1352). Reception device 217 returns control to Step S1351 (Step S1353), and repeats wireless reception and packet output.

Reception data separator 305 receives the packet from reception device 217 in AP 121 (Step S1352). Reception data separator 305 outputs the received packet to the communication device (Step S1354).

Reception device 217 in AP 122 wirelessly receives a signal (Step S1356). Reception device 217 then outputs a packet to parent station 110 (Step S1357). Reception device 217 returns control to Step S1356 (Step S1358), and repeats wireless reception and packet output.

Reception data separator 305 receives the packet from reception device 217 in AP 122 (Step S1357). Reception data separator 305 outputs the received packet to the communication device (Step S1359).

Reception device 217 in AP 123 wirelessly receives a signal (Step S1361). Reception device 217 then outputs a packet to parent station 110 (Step S1362). Reception device 217 returns control to Step S1361 (Step S1363), and repeats wireless reception and packet output.

Reception data separator 305 receives the packet from reception device 217 in AP 123 (Step S1362). Reception data separator 305 outputs the received packet to the communication device (Step S1364).

Reception device 217 in AP 124 wirelessly receives a signal (Step S1366). Reception device 217 then outputs a packet to parent station 110 (Step S1367). Reception device 217 returns control to Step S1366 (Step S1368), and repeats wireless reception and packet output.

Reception data separator 305 receives the packet from reception device 217 in AP 124 (Step S1367). Reception data separator 305 outputs the received packet to the communication device (Step S1369).

2.8 Variation (1)

Wireless communication system 1400 as a variation of wireless communication system 100 is described below.

In wireless communication system 100, parent station 110 is wiredly connected to each of APs 121, 122, 123, and 124 (or may be wirelessly connected to each of APs 121, 122, 123, and 124). In other words, parent station 110 and APs 121, 122, 123, and 124 are wiredly (or wirelessly) connected in parallel. However, this is not a limitation.

Wireless communication system 1400 has a structure similar to that of wireless communication system 100. The differences from wireless communication system 100 are mainly described below.

Figure 14:
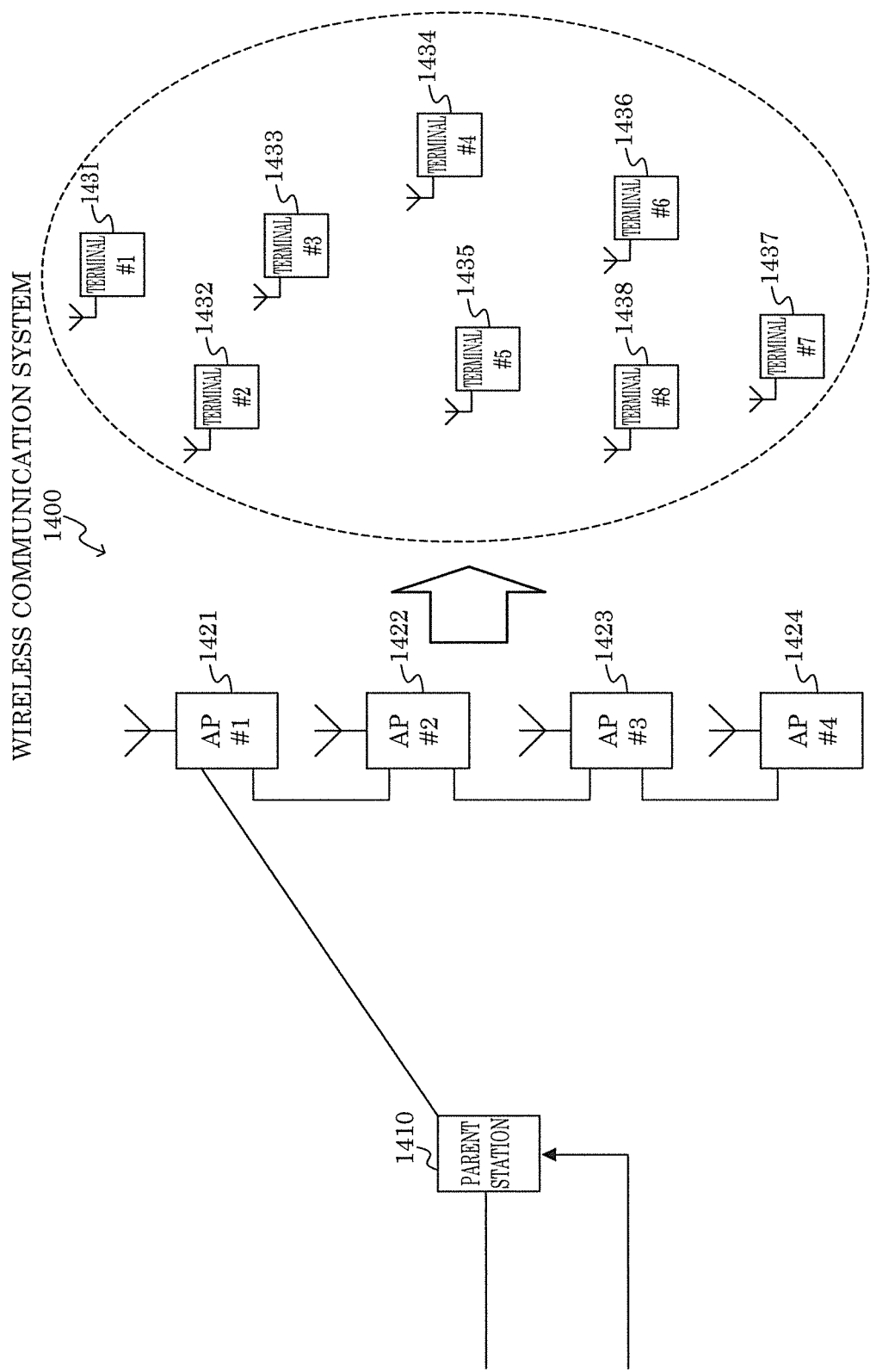
FIG. 14 is a block diagram illustrating the structure of wireless communication system 1400 according to Variation (1).

Wireless communication system 1400 includes parent station 1410, APs 1421, 1422, 1423, and 1424, and terminals 1431, 1432, ..., 1438, as illustrated in FIG. 14.

In wireless communication system 1400, parent station 1410 is wiredly (or wirelessly) connected to AP 1421. AP 1421 is wiredly (or wirelessly) connected to AP 1422, AP 1422 is wiredly (or wirelessly) connected to AP 1423, and AP 1423 is wiredly (or wirelessly) connected to AP 1424. In other words, parent station 1410 and APs 1421, 1422, 1423, and 1424 are wiredly (or wirelessly) connected in series.

(Packet Transmission in Direction from Parent Station 1410 to Terminal)

Parent station 1410 transmits a packet for AP 1421, a packet for AP 1422, a packet for AP 1423, and a packet for AP 1424, to AP 1421.

AP 1421 receives the packet for AP 1421, the packet for AP 1422, the packet for AP 1423, and the packet for AP 1424, from parent station 1410.

Upon receiving the packet for AP 1421, AP 1421 performs processes such as encoding on the packet, and wirelessly outputs it.

Upon obtaining the packet for AP 1422, the packet for AP 1423, and the packet for AP 1424, AP 1421 transmits the packet for AP 1422, the packet for AP 1423, and the packet for AP 1424, to AP 1422.

AP 1422 receives the packet for AP 1422, the packet for AP 1423, and the packet for AP 1424, from AP 1421.

Upon receiving the packet for AP 1422, AP 1422 performs processes such as encoding on the packet, and wirelessly outputs it.

Upon obtaining the packet for AP 1423 and the packet for AP 1424, AP 1422 transmits the received packet for AP 1423 and packet for AP 1424, to AP 1423.

AP 1423 receives the packet for AP 1423 and the packet for AP 1424, from AP 1422.

Upon receiving the packet for AP 1423, AP 1423 performs processes such as encoding on the packet, and wirelessly outputs it.

Upon obtaining the packet for AP 1424, AP 1423 transmits the received packet for AP 1424, to AP 1424.

AP 1424 receives the packet for AP 1424, from AP 1423.

Upon receiving the packet for AP 1424, AP 1424 performs processes such as encoding on the packet, and wirelessly outputs it.

(Packet Transmission in Direction from Terminal to Parent Station 1410)

Terminals 1431, 1432, ..., 1438 each wirelessly transmit a packet.

AP 1424 receives a packet transmitted from any of the terminals. Upon receiving the packet, AP 1424 transmits the received packet to AP 1423.

AP 1423 receives a packet transmitted from any of the terminals. AP 1423 also receives the packet (the packet wirelessly received by AP 1424 from a terminal), from AP 1424. Upon receiving the packet from the terminal and the packet from AP 1424, AP 1423 transmits the packet from the terminal and the packet from AP 1424, to AP 1422.

AP 1422 receives a packet transmitted from any of the terminals. AP 1422 also receives the packets (the packet wirelessly received by AP 1424 from a terminal and the packet wirelessly received by AP 1423 from a terminal), from AP 1423. Upon receiving the packet from the terminal and the packets from AP 1423, AP 1422 transmits the packet from the terminal and the packets from AP 1423, to AP 1421.

AP 1421 receives a packet transmitted from any of the terminals. AP 1421 also receives the packets (the packet wirelessly received by AP 1424 from a terminal, the packet wirelessly received by AP 1423 from a terminal, and the packet wirelessly received by AP 1422 from a terminal), from AP 1422. Upon receiving the packet from the terminal and the packets from AP 1422, AP 1421 transmits the packet from the terminal and the packets from AP 1422, to parent station 1410.

2.9 Variation (2)

Wireless communication system 1500 as a variation of wireless communication system 100 is described below.

Figure 15:
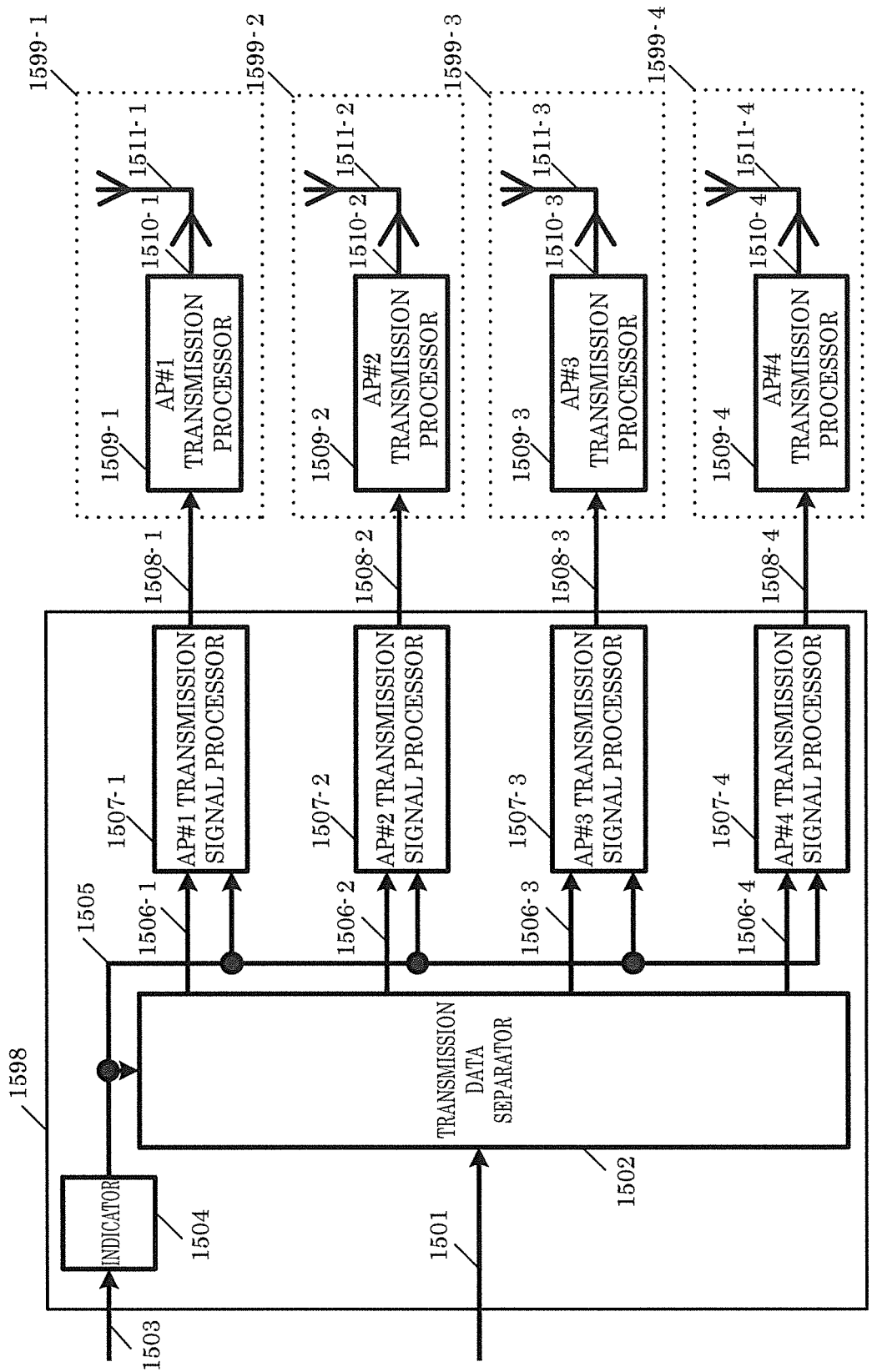
FIG. 15 is a block diagram illustrating the structures of parent station 1598 and APs 1599-1, 1599-2, 1599-3, and 1599-4 in wireless communication system 1500 according to Variation (2).

Wireless communication system 1500 has a structure similar to that of wireless communication system 100. Wireless communication system 1500 includes parent station 1598 and APs 1599-1, 1599-2, 1599-3, and 1599-4 instead of parent station 110 and APs 121, 122, 123, and 124 in wireless communication system 100, as illustrated in FIG. 15. The differences from wireless communication system 100 are mainly described below.

Parent station 1598 and APs 1599-1, 1599-2, 1599-3, and 1599-4 respectively correspond to parent station 110 and APs 121, 122, 123, and 124 in wireless communication system 100.

Parent station 1598 includes indicator 1504, transmission data separator 1502, AP #1 transmission signal processor 1507-1, AP #2 transmission signal processor 1507-2, AP #3 transmission signal processor 1507-3, AP #4 transmission signal processor 1507-4 and reception data separator 305 (not illustrated).

AP 1599-1 includes AP #1 transmission processor 1509-1 and antenna 1511-1. AP 1599-2 includes AP #2 transmission processor 1509-2 and antenna 1511-2. AP 1599-3 includes AP #3 transmission processor 1509-3 and antenna 1511-3. AP 1599-4 includes AP #4 transmission processor 1509-4 and antenna 1511-4.

APs 1599-1, 1599-2, 1599-3, and 1599-4 do not perform at least the processes of error correction encoding, interleaving, mapping, and phase change.

AP #1 transmission signal processor 1507-1, AP #2 transmission signal processor 1507-2, AP #3 transmission signal processor 1507-3, and AP #4 transmission signal processor 1507-4 perform the processes of error correction encoding, interleaving, mapping, and phase change, respectively for APs 1599-1, 1599-2, 1599-3, and 1599-4.

In particular, a feature lies in that AP #1 transmission signal processor 1507-1, AP #2 transmission signal processor 1507-2, AP #3 transmission signal processor 1507-3, and AP #4 transmission signal processor 1507-4 each perform the phase change process.

AP #1 transmission processor 1509-1, AP #2 transmission processor 1509-2, AP #3 transmission processor 1509-3, and AP #4 transmission processor 1509-4 each perform processes such as frequency conversion and power amplification.

The processes by indicator 1504 and the processes by transmission data separator 1502 are respectively the same as the processes by indicator 308 and the processes by transmission data separator 302 in wireless communication system 100.

An example of the processes by transmission data separator 1502 is as described with reference to FIGS. 4 to 6.

2.10 Variation (3)

Wireless communication system 1600 as a variation of wireless communication system 100 is described below.

Figure 16:
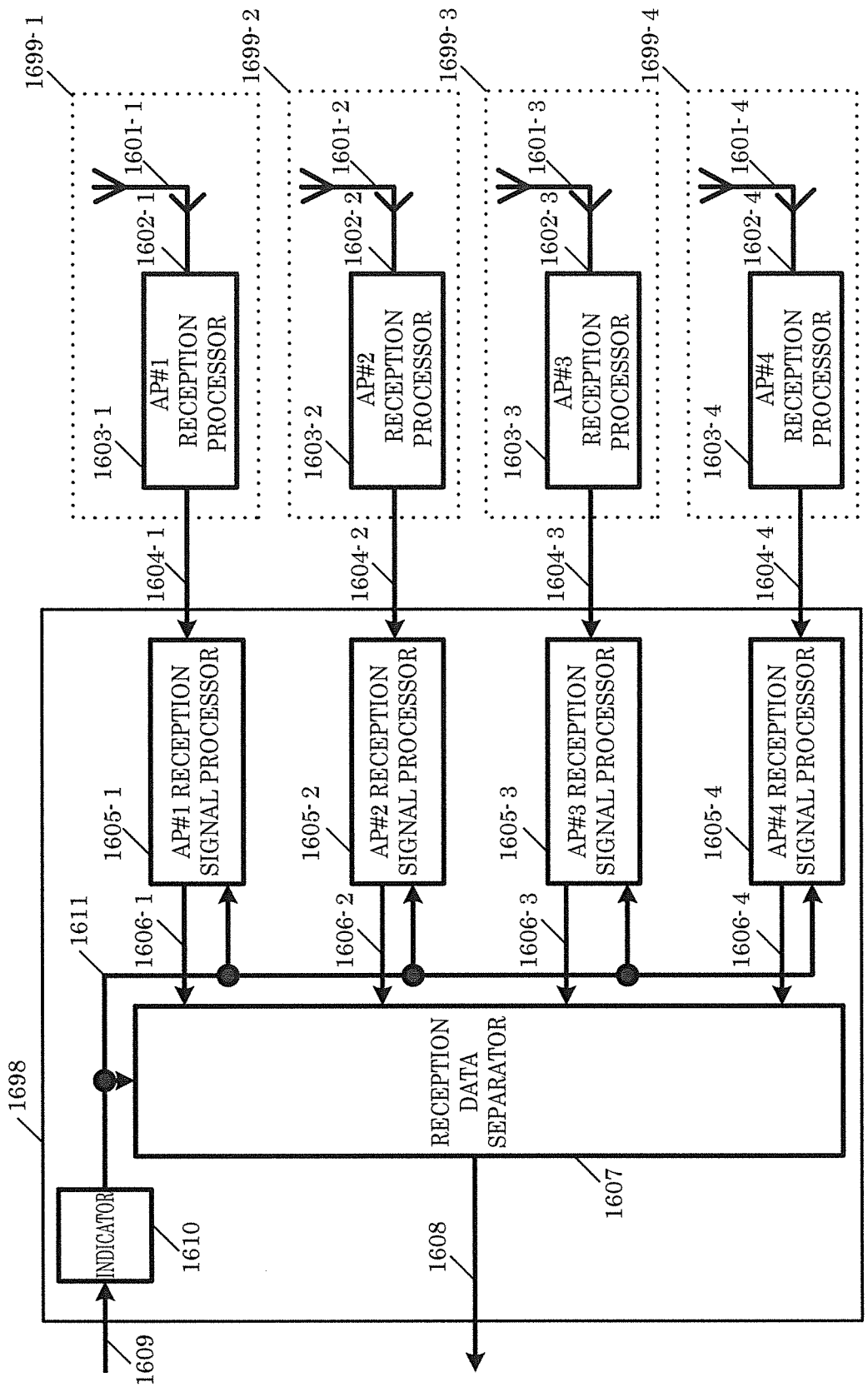
FIG. 16 is a block diagram illustrating the structures of parent station 1698 and APs 1699-1, 1699-2, 1699-3, and 1699-4 in wireless communication system 1600 according to Variation (3).

Wireless communication system 1600 has a structure similar to that of wireless communication system 100. Wireless communication system 1600 includes parent station 1698 and APs 1699-1, 1699-2, 1699-3, and 1699-4 instead of parent station 110 and APs 121, 122, 123, and 124 in wireless communication system 100, as illustrated in FIG. 16. The differences from wireless communication system 100 are mainly described below.

The major difference from wireless communication system 100 is that the function of the reception process (demodulation, decoding) is shared between parent station 1698 and APs 1699-1, 1699-2, 1699-3, and 1699-4.

Parent station 1698 and APs 1699-1, 1699-2, 1699-3, and 1699-4 respectively correspond to parent station 110 and APs 121, 122, 123, and 124 in wireless communication system 100.

Parent station 1698 includes indicator 1610, reception data separator 1607, AP #1 reception signal processor 1605-1, AP #2 reception signal processor 1605-2, AP #3 reception signal processor 1605-3, AP #4 reception signal processor 1605-4, and transmission data separator 302 (not illustrated).

AP 1699-1 includes AP #1 reception processor 1603-1 and antenna 1601-1. AP 1699-2 includes AP #2 reception processor 1603-2 and antenna 1601-2. AP 1699-3 includes AP #3 reception processor 1603-3 and antenna 1601-3. AP 1699-4 includes AP #4 reception processor 1603-4 and antenna 1601-4.

AP #1 reception processor 1603-1, AP #2 reception processor 1603-2, AP #3 reception processor 1603-3, and AP #4 reception processor 1603-4 each perform processes such as frequency conversion.

The processes by indicator 1610 and the processes by reception data separator 1607 are respectively the same as the processes by indicator 308 and the processes by reception data separator 305 in wireless communication system 100.

An example of the processes by reception data separator 1607 is as described with reference to FIGS. 7 and 8.

1.11 Operation in the Case where Parent Station Places AP Under Control

Figure 17:
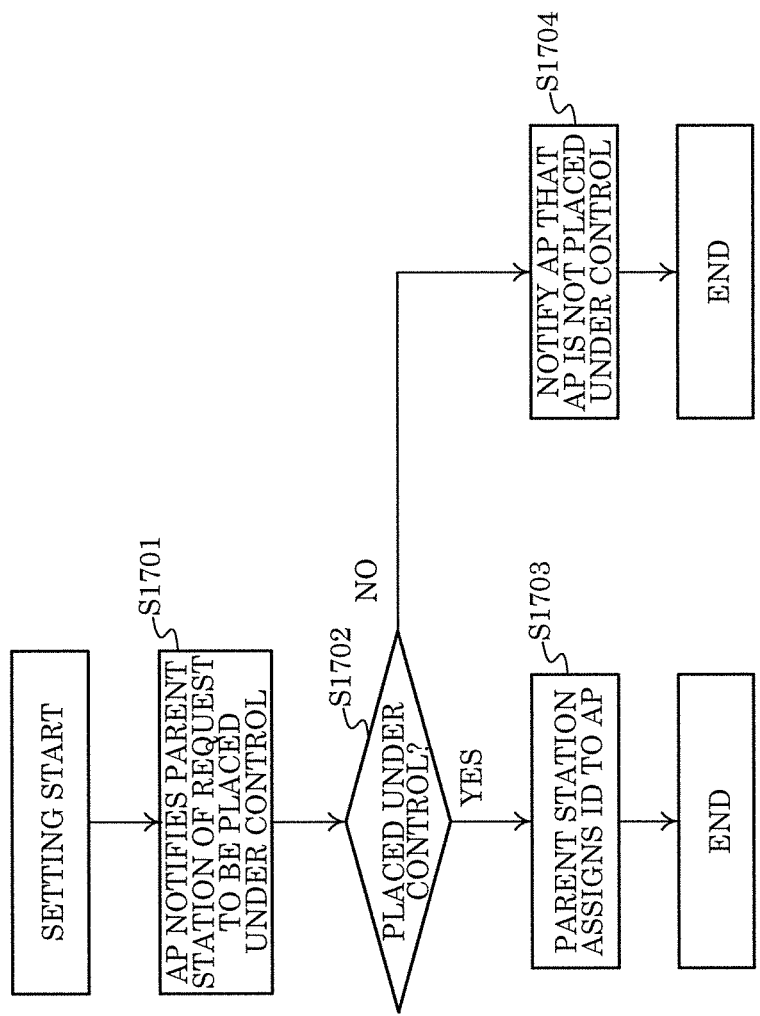
FIG. 17 is a flowchart illustrating operation in the case where parent station 110 newly places an AP under control in wireless communication system 100.

Operation in the case where parent station 110 newly places an AP under control in wireless communication system 100 is described below, with reference to a flowchart in FIG. 17.

Suppose four APs 121, 122, 123, and 124 are under control of parent station 110, and then a new AP is to be added. At this point, the phase change patterns (and IDs) have already been set for four APs 121, 122, 123, and 124.

An AP that intends to be newly placed under control of parent station 110 notifies parent station 110 of a request to be placed under control of parent station 110. Parent station 110 receives the request from the new AP (Step S1701).

Parent station 110 determines whether or not to place the new AP under its control (Step S1702). In the case of determining to place the new AP under its control (Step S1702: "Yes"), parent station 110 assigns an ID to the new AP. Here, the ID is associated with a phase change pattern. The new AP sets the phase change pattern from the assigned ID (Step S1703). This completes the operation in the case of newly placing an AP under control.

In the case of determining not to place the new AP under its control (Step S1702: "No"), parent station 110 notifies the new AP that the AP is not to be placed under its control (Step S1704). This completes the operation in the case of newly placing an AP under control.

Step S1703 may be performed as follows.

Parent station 110 transmits information indicating the phase change pattern to be set by the new AP, to the new AP. The new AP receives the information indicating the phase change pattern, and sets the phase change pattern in the AP based on the received information indicating the phase change pattern. Here, parent station 110 may or may not assign the ID to the new AP. Assigning the ID here has the advantage that, in the case where parent station 110 designates the AP newly placed under its control as a unicast AP or a multicast AP, the ID and unicast or multicast can be easily designated for the AP by transmitting information "ID and unicast or multicast" to the AP.

The above describes the case where four APs 121, 122, 123, and 124 are under control of parent station 110 and then a new AP is to be added. However, this is not a limitation. There may be no AP under control of parent station 110 in an initial state. In such a case, APs may be placed under control of parent station 110 one by one, as described above.

In Step S1702, parent station 110 may determine whether or not to place the new AP under its control, depending on a limit to the number of APs placed under its control. Parent station 110 stores a maximum value of the number of APs placed under its control. When there is a request from one AP to be newly placed under its control, parent station 110 adds "1" to the number of APs currently under its control, and compares the obtained value with the maximum value. In the case where the obtained value is not greater than the maximum value, parent station 110 permits the AP to be under its control. In the case where the obtained value is greater than the maximum value, parent station 110 does not permit the AP to be under its control.

In Step S1702, parent station 110 may determine whether or not to place the new AP under its control, depending on the position of the new AP and the phase change pattern.

For example, when the new AP is away from each AP already under its control, parent station 110 permits the new AP to be under its control.

For example, when the new AP is near any AP already under its control, if there is a phase change pattern to be assigned to the new AP, parent station 110 permits the new AP to be under its control.

For example, when the new AP is near any AP already under its control, if there is no phase change pattern to be assigned to the new AP, parent station 110 does not permit the new AP to be under its control.

2.11 Conclusion

According to this embodiment, large-capacity transmission of Gbps level can be achieved. Moreover, the number of terminals accommodated in the case of implementing multicast can be increased. Furthermore, unicast communication can be realized simultaneously with multicast. A flexible system can thus be provided.

3. Embodiment 2

Wireless communication system 1800 according to Embodiment 2 as another embodiment of the present disclosure is described below.

3.1 Wireless Communication System 1800

Figure 18:
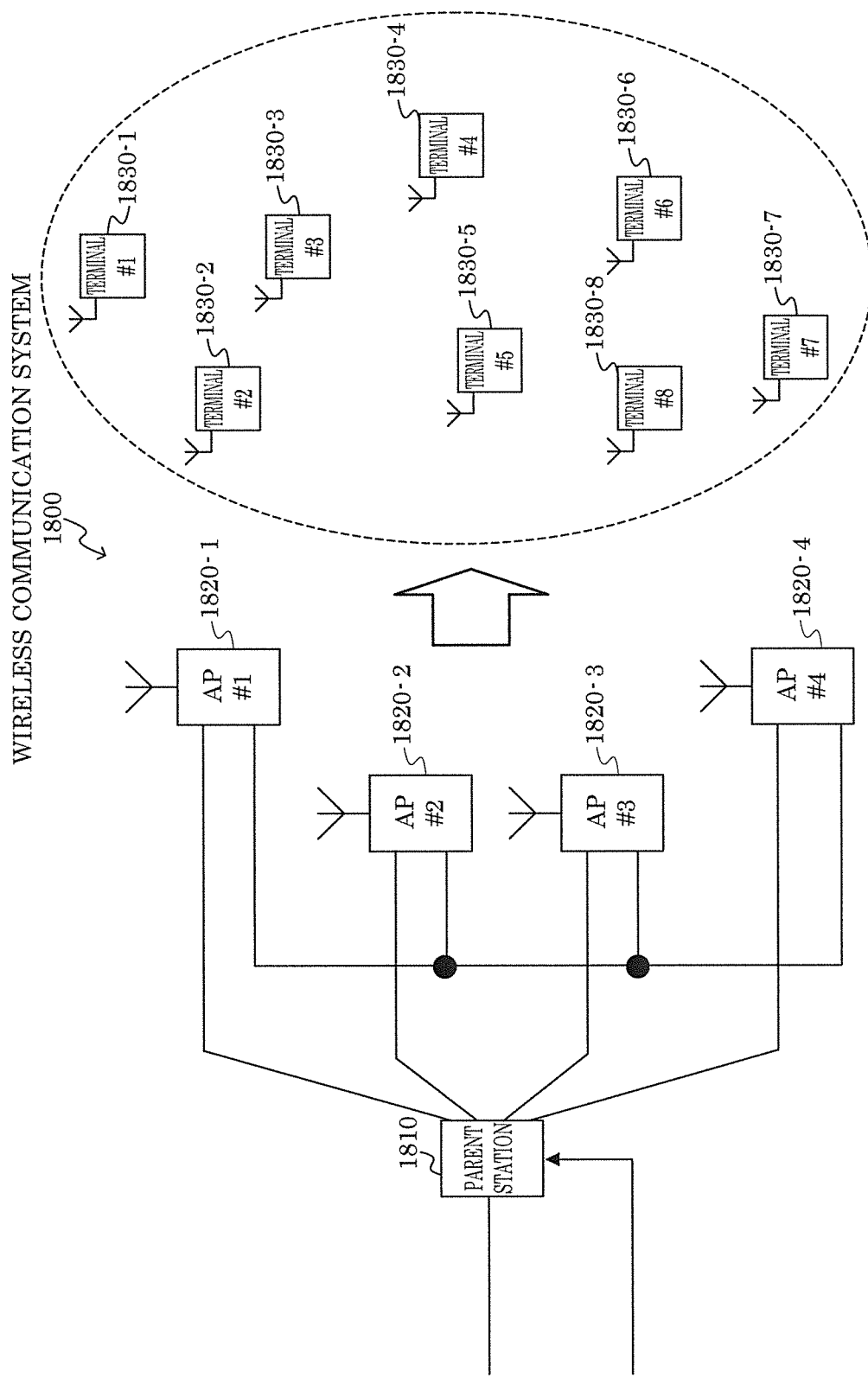
FIG. 18 is a block diagram illustrating the structure of wireless communication system 1800 according to Embodiment 2.

Wireless communication system 1800 includes parent station 1810, APs 1820-1, 1820-2, 1820-3, and 1820-4, and terminals 1830-1, 1830-2, ..., 1830-8, as illustrated in FIG. 18.

Parent station 1810 is connected to a communication device (not illustrated) directly, or indirectly via a communication line. The communication device is, for example, a broadcast device for broadcasting data or a distribution system or a server for transmitting data. The communication device transmits a control signal and data. The control signal includes unicast transmission-related setting or multicast transmission-related setting, and phase change method setting. The communication device may include a plurality of communication devices. In this case, a first communication device may transmit the control signal, and a second communication device may transmit the data. Parent station 1810 is wiredly (or wirelessly) connected to APs 1820-1, 1820-2, 1820-3, and 1820-4. AP 1820-1 is wiredly (or wirelessly) connected to APs 1820-2, 1820-3, and 1820-4.

Parent station 1810 receives the control signal and the data from the communication device. Parent station 1810 transmits the control signal to AP 1820-1. Parent station 1810 transmits the data to each of APs 1820-1, 1820-2, 1820-3, and 1820-4. APs 1820-1, 1820-2, 1820-3, and 1820-4 wirelessly transmit the data obtained from parent station 1810.

Terminals 1830-1, 1830-2, ..., 1830-8 are each a mobile phone, a smartphone, a tablet, or a personal computer (PC) that has a wireless communication function using a frequency bandwidth of 6 GHz or more such as millimeter wave, e.g. a frequency bandwidth of 60 GHz. Terminal 1830-1, for example, wirelessly receives data from AP 1820-1 in the case where terminal 1830-1 is located near AP 1820-1. Terminals 1830-2, ..., 1830-8 each wirelessly receive data from its nearby AP, as with terminal 1830-1.

Terminal 1830-1 also wirelessly transmits data. In the case where terminal 1830-1 is located near AP 1820-1, AP 1820-1 wirelessly receives the data from terminal 1830-1. AP 1820-1 transmits the received data to parent station 1810.

Terminals 1830-2, 1830-3, ..., 1830-8 each wirelessly transmit data, as with terminal 1830-1. An AP located near each terminal wirelessly receives the data from the terminal. The AP transmits the data received from the terminal, to parent station 1810.

Parent station 1810 obtains the data transmitted from each terminal, via the corresponding AP. Parent station 1810 outputs the received data to the communication device.

The control signal transmitted from parent station 1810 to AP 1820-1 includes unicast transmission-related setting or multicast transmission-related setting in each AP, and phase change method setting in each AP. Parent station 1810 does not perform unicast transmission-related setting and multicast transmission-related setting for APs 1820-2, 1820-3, and 1820-4. Parent station 1810 does not perform phase change method setting for APs 1820-2, 1820-3, and 1820-4.

AP 1820-1 performs unicast transmission-related setting or multicast transmission-related setting for APs 1820-2, 1820-3, and 1820-4. AP 1820-1 also performs phase change method setting for APs 1820-2, 1820-3, and 1820-4.

AP 1820-1 is called "master AP". APs 1820-2, 1820-3, and 1820-4 are called "non-master AP".

3.2 AP 1820-1 as Master AP

Figure 19:
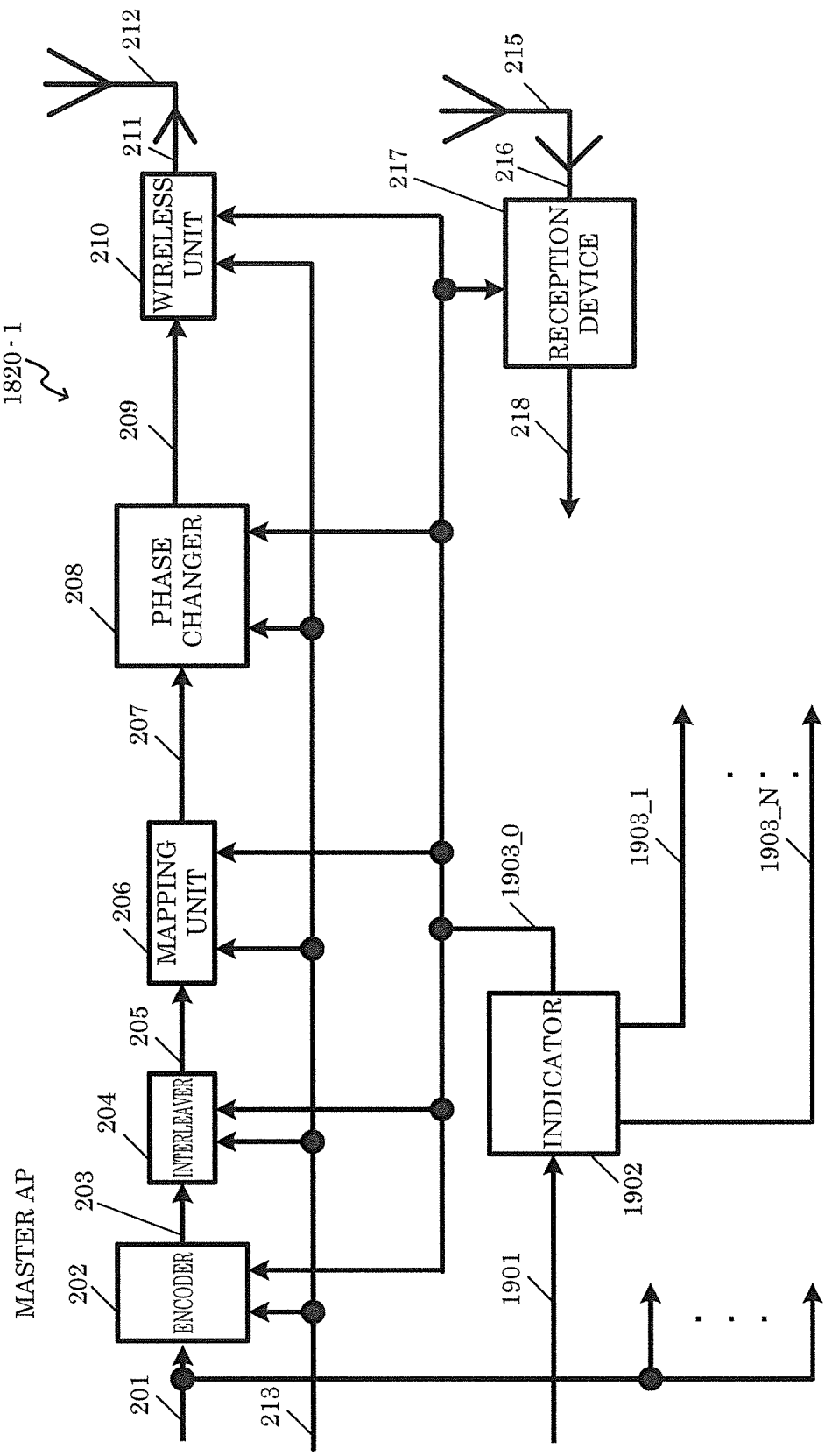
FIG. 19 is a block diagram illustrating the structure of AP 1820-1 which is a master AP.

AP 1820-1 as a master AP includes encoder 202, interleaver 204, mapping unit 206, phase changer 208, wireless unit 210, antenna 212, antenna 215, reception device 217, and indicator 1902, as illustrated in FIG. 19.

AP 1820-1 receives control signal 1901 from parent station 1810. Control signal 1901 includes unicast transmission-related setting or multicast transmission-related setting, and phase change method setting.

AP 1820-1 performs unicast transmission-related setting or multicast transmission-related setting, based on control signal 1901 received from parent station 1810. AP 1820-1 also performs phase change method setting, based on control signal 1901. In the case where multicast transmission-related setting is performed, the AP is set to use the same frequency (frequency band) as other APs.

In the case of performing unicast transmission-related setting, AP 1820-1 operates reception device 217. In the case of performing multicast transmission-related setting, AP 1820-1 may stop the operation of reception device 217.

AP 1820-1 performs wireless transmission/reception using the same channel in the case of unicast and in the case of multicast. Here, AP 1820-1 may divide one wireless carrier into several time slots, and use each time slot as a communication channel. Alternatively, AP 1820-1 may use each of a plurality of different frequencies in the frequency bandwidth of 60 GHz, as a communication channel.

(1) Encoder 202

Encoder 202 receives data 201 from parent station 1810. Encoder 202 also receives control signal 213 from a controller included in AP 1820-1. Control signal 213 includes information such as encoding scheme designation, error correction scheme designation, encoding rate, and block length. Encoder 202 performs error correction encoding, such as convolution encoding, LDPC encoding, or turbo encoding, on data 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 1820-1. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 1820-1. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a phase change process.

(4) Phase Changer 208

Phase changer 208 receives modulated signal 207 from mapping unit 206. Phase changer 208 also receives control signal 1903_0. Control signal 1903_0 includes phase change method setting. Phase changer 208 performs phase change on modulated signal 207 according to the phase change method setting included in control signal 1903_0, to generate phase-changed signal 209. Phase changer 208 outputs phase-changed signal 209.

(5) Wireless Unit 210 and Antenna 212

Wireless unit 210 receives phase-changed signal 209 from phase changer 208. Wireless unit 210 also receives control signal 213 from the controller included in AP 1820-1. Control signal 213 includes designation of frequency conversion, amplification, etc. Wireless unit 210 performs processes such as frequency conversion and amplification on phase-changed signal 209, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 1810.

Although antennas 212 and 215 are described separately for convenience's sake, they may be the same entity.

(7) Indicator 1902

Indicator 1902 is connected to parent station 1810.

Indicator 1902 receives control signal 1901 from parent station 1810. Control signal 1901 includes unicast transmission-related setting or multicast transmission-related setting, and phase change method setting.

Separate control signal 1901 may be set for each AP, or same control signal 1901 may be set for all APs.

Indicator 1902 performs multicast transmission-related setting or unicast transmission-related setting for all APs including AP 1820-1, using control signals 1903_0, 1903_1, ..., 1903_N.

Here, indicator 1902 may perform multicast transmission-related setting for all APs, or perform unicast transmission-related setting for all APs. Indicator 1902 may perform multicast transmission-related setting for part of the APs, and unicast transmission-related setting for the other APs.

For a plurality of APs subjected to multicast transmission-related setting, the modulated signal before phase change is the same signal. In other words, the same data is transmitted.

Indicator 1902 also indicates a phase change method to each AP, using control signals 1903_1, ..., 1903_N.

For a plurality of APs subjected to unicast transmission-related setting, the modulated signal before phase change may be the same signal or a different signal. In other words, the same data may be transmitted, or different data may be transmitted.

Thus, indicator 1902 generates control signals 1903_0, 1903_1, ..., 1903_N for the respective APs, from received control signal 1901. Each control signal includes multicast transmission-related setting or unicast transmission-related setting, and phase change method setting. Indicator 1902 outputs control signals 1903_0, 1903_1, ..., 1903_N to itself and APs 1820-2, 1820-3, and 1820-4.

In the case of designating unicast transmission for AP 1820-1, indicator 1902 operates reception device 217. In the case of designating multicast transmission for AP 1820-1, indicator 1902 may stop the operation of reception device 217.

3.3 Non-Master AP 2000

APs 1820-2, 1820-3, and 1820-4 are each a non-master AP. APs 1820-2, 1820-3, and 1820-4 are described below, as AP 2000 collectively.

Figure 20:
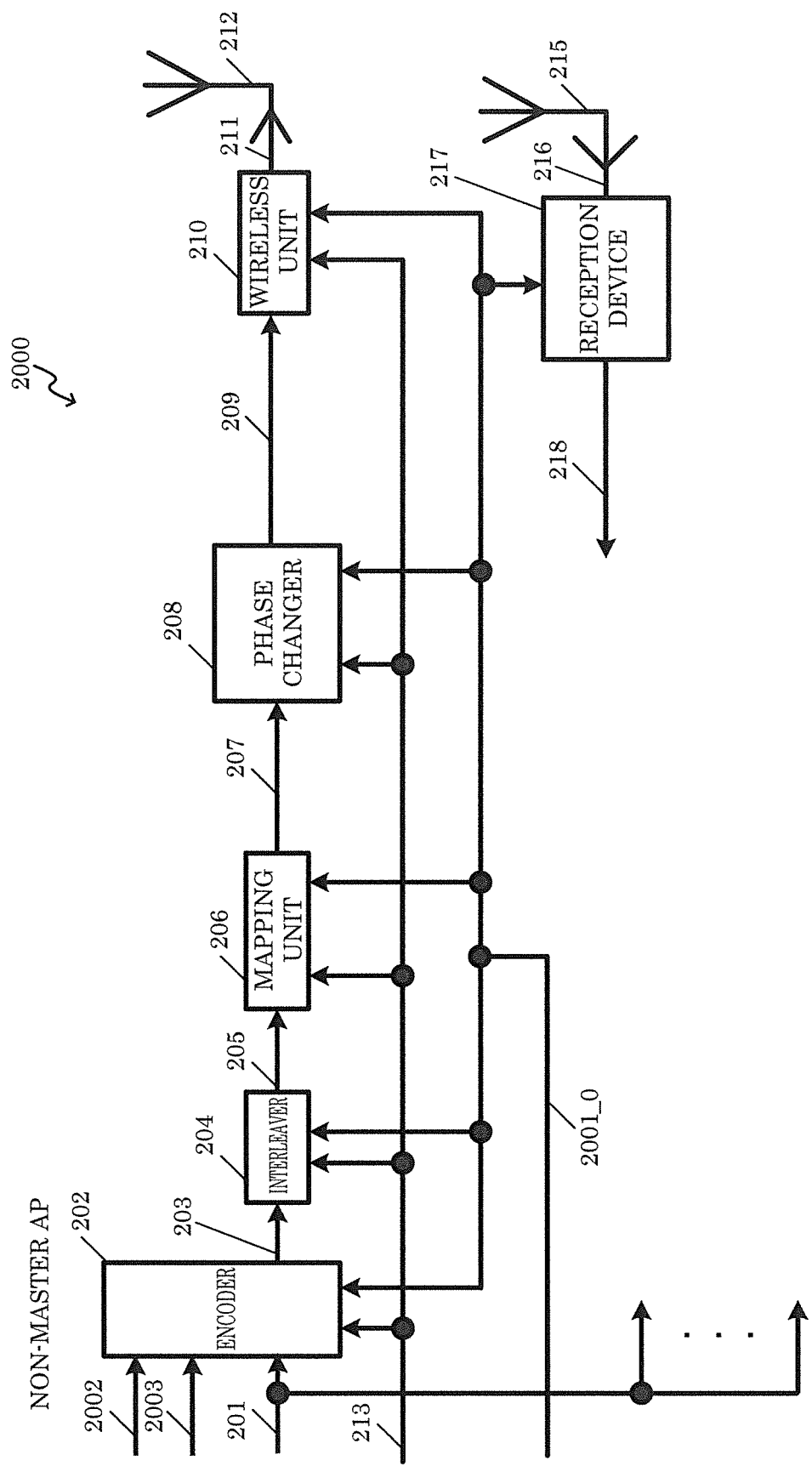
FIG. 20 is a block diagram illustrating the structure of AP 2000 which is not a master AP.

Non-master AP 2000 includes encoder 202, interleaver 204, mapping unit 206, phase changer 208, wireless unit 210, antenna 212, antenna 215, and reception device 217, as illustrated in FIG. 20.

AP 2000 receives control signal 2001_0 from AP 1820-1 which is a master AP. Control signal 2001_0 includes unicast transmission-related setting or multicast transmission-related setting, and phase change method setting. AP 2000 also receives data 2002 from AP 1820-1 which is a master AP. In the case of performing AP cooperation, AP 2000 may receive data 2003 from another non-master AP. In the case of operating singly in unicast transmission, AP 2000 may receive data 201 from parent station 1810.

AP 2000 performs unicast transmission-related setting or multicast transmission-related setting, based on control signal 2001_0. AP 2000 also performs phase change method setting, based on control signal 2001_0. In the case where multicast transmission is set, the AP is set to use the same frequency (frequency band) as other APs.

In the case where unicast transmission is set, AP 2000 operates reception device 217. In the case where multicast transmission is set, AP 2000 may stop the operation of reception device 217.

AP 2000 performs wireless transmission/reception using the same channel (or the same frequency) in the case of unicast transmission and in the case of multicast transmission. Here, A P 2000 may divide one wireless carrier into several time slots, and use each time slot as a communication channel. Alternatively, A P 2000 may use each of a plurality of different frequencies in the frequency bandwidth of 60 GHz, as a communication channel.

(1) Encoder 202

Encoder 202 receives data 2002, 2003, or 201. Encoder 202 also receives control signal 213 from a controller included in AP 2000. Control signal 213 includes information such as encoding scheme designation, error correction scheme designation, encoding rate, and block length. Encoder 202 performs error correction encoding, such as convolution encoding, LDPC encoding, or turbo encoding, on data 2002, 2003, or 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 2000. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 2000. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a phase change process.

(4) Phase Changer 208

Phase changer 208 receives modulated signal 207 from mapping unit 206. Phase changer 208 also receives control signal 2001_0. Control signal 2001_0 includes phase change method setting. Phase changer 208 performs phase change on modulated signal 207 according to the phase change method setting included in control signal 2001_0, to generate phase-changed signal 209. Phase changer 208 outputs phase-changed signal 209.

(5) Wireless Unit 210 and Antenna 212

Wireless unit 210 receives phase-changed signal 209 from phase changer 208. Wireless unit 210 also receives control signal 213 from the controller included in AP 2000. Control signal 213 includes designation of frequency conversion, amplification, etc. Wireless unit 210 performs processes such as frequency conversion and amplification on phase-changed data 209, to generate transmission data 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives data 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 1810.

Although antennas 212 and 215 are described separately for convenience's sake, they may be the same entity.

3.4 Example of Transmitted Data

An example of data transmitted by parent station 1810 and APs 1820-1, 1820-2, 1820-3, and 1820-4 is described below.

(1) In the Case of Setting all APs for Multicast to Transmit Data

An example of transmitted data in the case of setting all APs 1820-1, 1820-2, 1820-3, and 1820-4 for multicast to transmit data is described below, with reference to FIG. 21.

Figure 21:
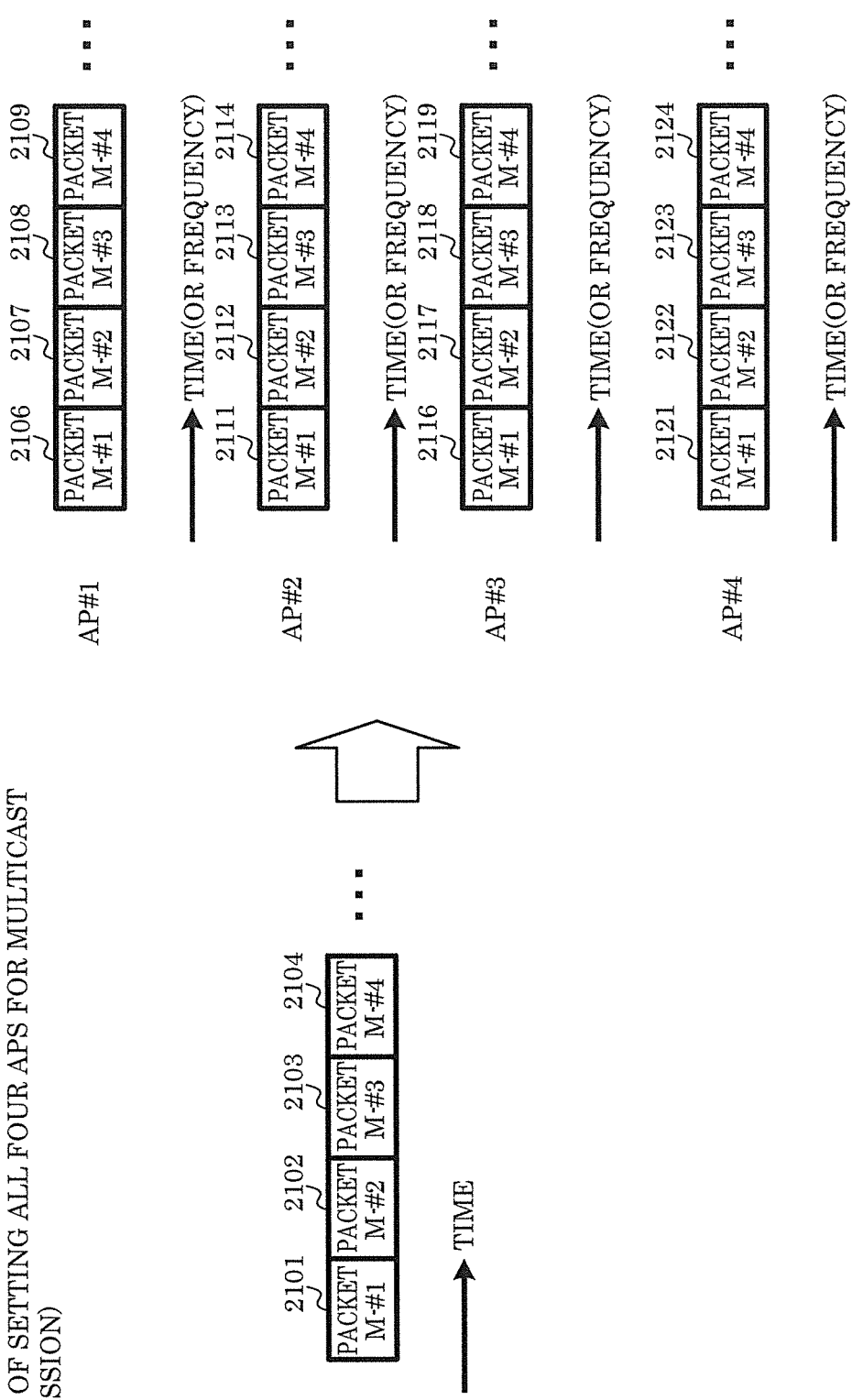
FIG. 21 is a diagram illustrating an example of transmitted data in the case of setting all APs 1820-1, 1820-2, 1820-3, and 1820-4 for multicast to perform transmission

Parent station 1810 receives packets 2101, 2102, 2103, 2104, . . . in this order, as illustrated in FIG. 21. Packets 2101, 2102, 2103, 2104, . . . are all multicast packets. Packets 2101, 2102, 2103, 2104, . . . are generated from one set of multicast data. Parent station 1810 transmits packets 2101, 2102, 2103, 2104, . . . in this order, to AP 1820-1.

AP 1820-1 receives packets 2101, 2102, 2103, 2104, . . . in this order. AP 1820-1 then transmits packets 2101, 2102, 2103, 2104, . . . in this order, to APs 1820-2, 1820-3, and 1820-4.

AP 1820-1 receives packets 2101, 2102, 2103, 2104, . . . in this order. Upon receiving packets 2101, 2102, 2103, 2104, . . . in this order, AP 1820-1 wirelessly outputs packets 2106, 2107, 2108, 2109, . . . in this order, in multicast transmission. Packets 2101, 2102, 2103, 2104, . . . respectively correspond to packets 2106, 2107, 2108, 2109.

Upon receiving packets 2101, 2102, 2103, 2104, . . . in this order, AP 1820-2 wirelessly outputs packets 2111, 2112, 2113, 2114, . . . in this order, in multicast transmission. Packets 2101, 2102, 2103, 2104, . . . respectively correspond to packets 2111, 2112, 2113, 2114.

Upon receiving packets 2101, 2102, 2103, 2104, . . . in this order, AP 1820-3 wirelessly outputs packets 2116, 2117, 2118, 2119, . . . in this order, in multicast transmission. Packets 2101, 2102, 2103, 2104, . . . respectively correspond to packets 2116, 2117, 2118, 2119.

Upon receiving packets 2101, 2102, 2103, 2104, . . . in this order, AP 1820-4 wirelessly outputs packets 2121, 2122, 2123, 2124, . . . in this order, in multicast transmission. Packets 2101, 2102, 2103, 2104, . . . respectively correspond to packets 2121, 2122, 2123, 2124.

In this case, a feature lies in that APs 1820-1, 1820-2, 1820-3, and 1820-4 each perform phase change on the modulated signal (alternatively, any of APs 1820-1, 1820-2, 1820-3, and 1820-4 may perform no phase change).

This has the advantages of widening the cell range within the reach of a multicast modulated signal, and reducing, by means of phase change, points at which reception is difficult due to modulated signal interference.

(2) In the Case of Setting Two APs for Multicast to Transmit Data

An example of transmitted data in the case of setting two APs 1820-1 and 1820-2 for multicast transmission and other two APs 1820-3 and 1820-4 for unicast transmission to transmit data is described below, with reference to FIG. 22. In this case, APs 1820-1 and 1820-2 transmit the same data (the modulated signal after mapping and before phase change is the same). Moreover. APs 1820-3 and 1820-4 transmit the same data (the modulated signal after mapping and before phase change is the same).

Figure 22:
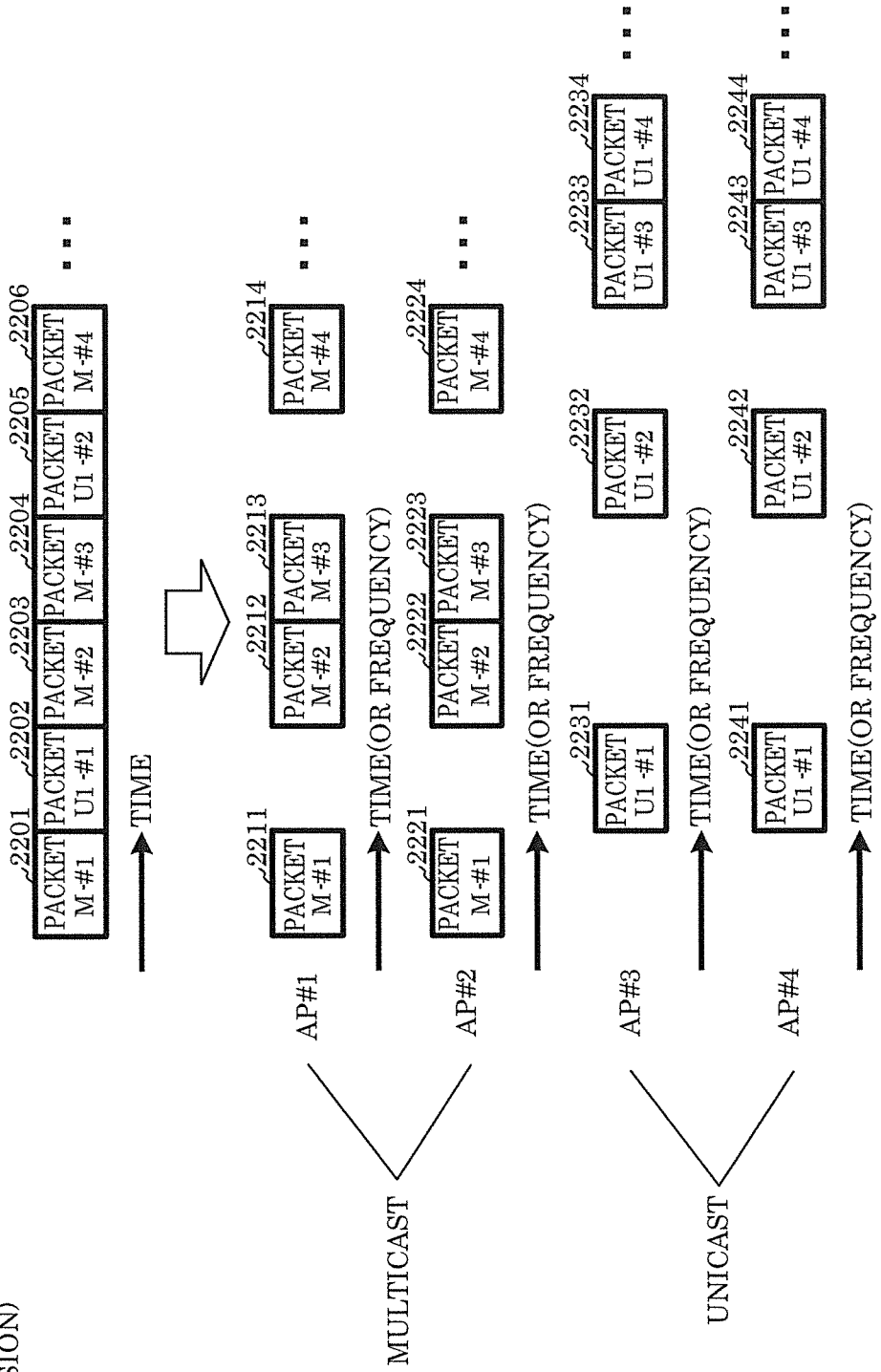
FIG. 22 is a diagram illustrating an example of transmitted data in the case of setting APs 1820-1 and 1820-2 for multicast and APs 1820-3 and 1820-4 for unicast to perform transmission

Parent station 1810 receives packets 2201, 2202, 2203, 2204, 2205, 2206, ... in this order, as illustrated in FIG. 22. Packets 2201, 2203, 2204, and 2206 are multicast packets. Packets 2202 and 2205 are unicast packets. Packets 2201, 2203, 2204, and 2206 are generated from one set of multicast data. Packets 2202 and 2205 are generated from one set of unicast data.

Upon receiving packets 2201, 2202, 2203, 2204, 2205, 2206, ... in this order, parent station 1810 transmits packets 2201, 2202, 2203, 2204, 2205, 2206, ... in this order, to AP 1820-1.

Upon receiving packets 2201, 2202, 2203, 2204, 2205, 2206, .... AP 1820-1 transmits multicast packets 2201, 2203, 2204, 2206, ... to its encoder 202, and multicast packets 2201, 2203, 2204, 2206, ... to AP 1820-2. AP 1820-1 transmits unicast packets 2202, 2205, ... to APs 1820-3 and 1820-4.

Upon receiving packets 2201, 2203, 2204, and 2206, AP 1820-1 wirelessly outputs packets 2211, 2212, 2213, and 2214, in multicast transmission. Packets 2201, 2203, 2204, and 2206 respectively correspond to packets 2211, 2212, 2213, and 2214.

Upon receiving packets 2201, 2203, 2204, and 2206, AP 1820-2 wirelessly outputs packets 2221, 2222, 2223, and 2224, in multicast transmission. Packets 2201, 2203, 2204, and 2206 respectively correspond to packets 2221, 2222, 2223, and 2224.

Upon receiving packets 2202 and 2205, AP 1820-3 wirelessly outputs packets 2231 and 2232, in unicast transmission. Packets 2202 and 2205 respectively correspond to packets 2231 and 2232.

Upon receiving packets 2202 and 2205, AP 1820-4 wirelessly outputs packets 2241 and 2242, in unicast transmission. Packets 2202 and 2205 respectively correspond to packets 2241 and 2242.

As described above, in the case of transmitting the modulated signal in unicast transmission, the packets transmitted in APs 1820-3 and 1820-4 are based on the same data. Here, APs 1820-3 and 1820-4 have the same transmission parameter. APs 1820-3 and 1820-4 may perform different phase changes (alternatively, any of APs 1820-3 and 1820-4 may perform no phase change).

This has the advantages of widening the cell range within the reach of a unicast modulated signal, and reducing, by means of phase change, points at which reception is difficult due to modulated signal interference.

A feature lies in that APs 1820-1 and 1820-2 each perform phase change on the modulated signal (alternatively, any of APs 1820-1 and 1820-2 may perform no phase change). (The phase change method will be described in detail later.)

This has the advantages of widening the cell range within the reach of a multicast modulated signal, and reducing, by means of phase change, points at which reception is difficult due to modulated signal interference.

(3) In the Case of Setting Two APs for Multicast to Transmit Data

Figure 23:
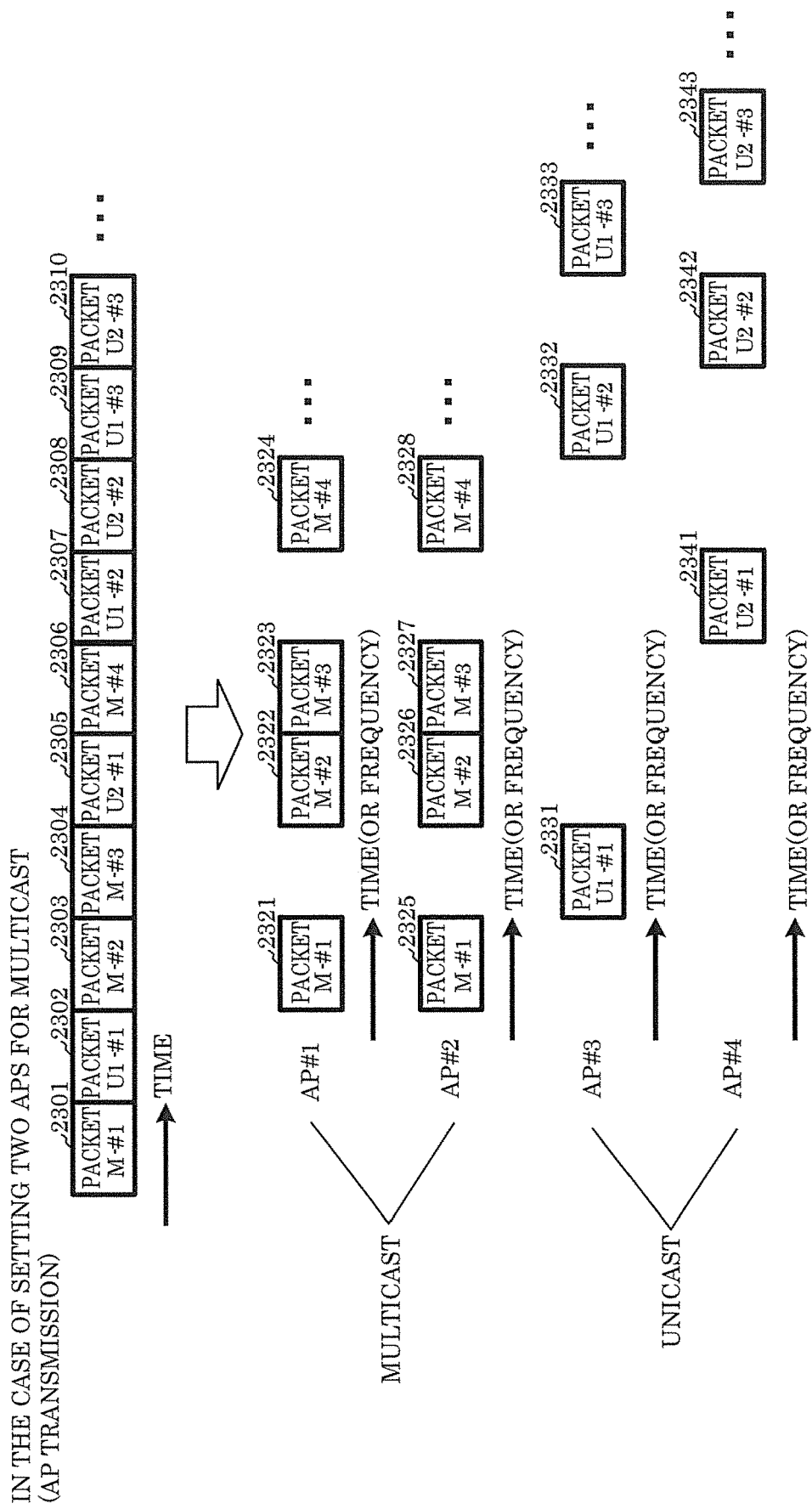
FIG. 23 is a diagram illustrating an example of transmitted data in the case of setting APs 1820-1 and 1820-2 for multicast and APs 1820-3 and 1820-4 for unicast to perform transmission

An example of transmitted data in the case of setting two APs 1820-1 and 1820-2 for multicast transmission and other two APs 1820-3 and 1820-4 for unicast transmission to transmit data is described below, with reference to FIG. 23. In FIG. 23, APs 1820-3 and 1820-4 transmit different data.

Parent station 1810 receives packets 2301, 2302, 2303, 2304, 2305, 2306, 2307, 2308, 2309, 2310, ... in this order, as illustrated in FIG. 23. Packets 2301, 2303, 2304, and 2306 are multicast packets. Packets 2302, 2307, and 2309 are unicast packets transmitted by AP 1820-3. Packets 2305, 2308, and 2310 are unicast packets transmitted by AP 1820-4.

Packets 2301, 2303, 2304, and 2306 are generated from one set of multicast data. Packets 2302, 2307, and 2309 are generated from one set of unicast data. Packets 2305, 2308, and 2310 are generated from another set of unicast data.

Upon receiving packets 2301, 2302, 2303, 2304, 2305, 2306, 2307, 2308, 2309, 2310, ... in this order, parent station 1810 transmits multicast packets 2301, 2303, 2304, and 2306 to APs 1820-1 and 1820-2.

Upon receiving packets 2301, 2303, 2304, and 2306, AP 1820-1 wirelessly outputs packets 2321, 2322, 2323, and 2324, in multicast transmission. Packets 2301, 2303, 2304, and 2306 respectively correspond to packets 2321, 2322, 2323, and 2324.

Upon receiving packets 2301, 2303, 2304, and 2306, AP 1820-2 wirelessly outputs packets 2325, 2326, 2327, and 2328, in multicast transmission. Packets 2301, 2303, 2304, and 2306 respectively correspond to packets 2325, 2326, 2327, and 2328.

Upon receiving packets 2301, 2302, 2303, 2304, 2305, 2306, 2307, 2308, 2309, 2310, ... in this order, parent station 1810 transmits unicast packets 2302, 2307, and 2309 to AP 1820-3.

Upon receiving packets 2302, 2307, and 2309, AP 1820-3 wirelessly outputs packets 2331, 2332, and 2333, in unicast transmission. Packets 2302, 2307, and 2309 respectively correspond to packets 2331, 2332, and 2333.

Upon receiving packets 2301, 2302, 2303, 2304, 2305, 2306, 2307, 2308, 2309, 2310, ... in this order, parent station 1810 transmits unicast packets 2305, 2308, and 2310 to AP 1820-4.

Upon receiving packets 2305, 2308, and 2310, AP 1820-4 wirelessly outputs packets 2341, 2342, and 2343, in unicast transmission. Packets 2305, 2308, and 2310 respectively correspond to packets 2341, 2342, and 2343.

A feature lies in that APs 1820-1 and 1820-2 each perform phase change on the modulated signal (alternatively, any of APs 1820-1 and 1820-2 may perform no phase change).

This has the advantages of widening the cell range within the reach of a multicast modulated signal, and reducing, by means of phase change, points at which reception is difficult due to modulated signal interference.

Moreover, a flexible system in which APs 1820-3 and 1820-4 can perform unicast communication is realized.

There is thus the advantage of realizing a flexible system by, for example, switching the transmission state among the transmission state in FIG. 21, the transmission state in FIG. 22, and the transmission state in FIG. 23 depending on time (e.g. switching depending on the terminal presence situation).

3.5 Operation in the Case where Master AP Newly Places AP Under Control

Figure 24:
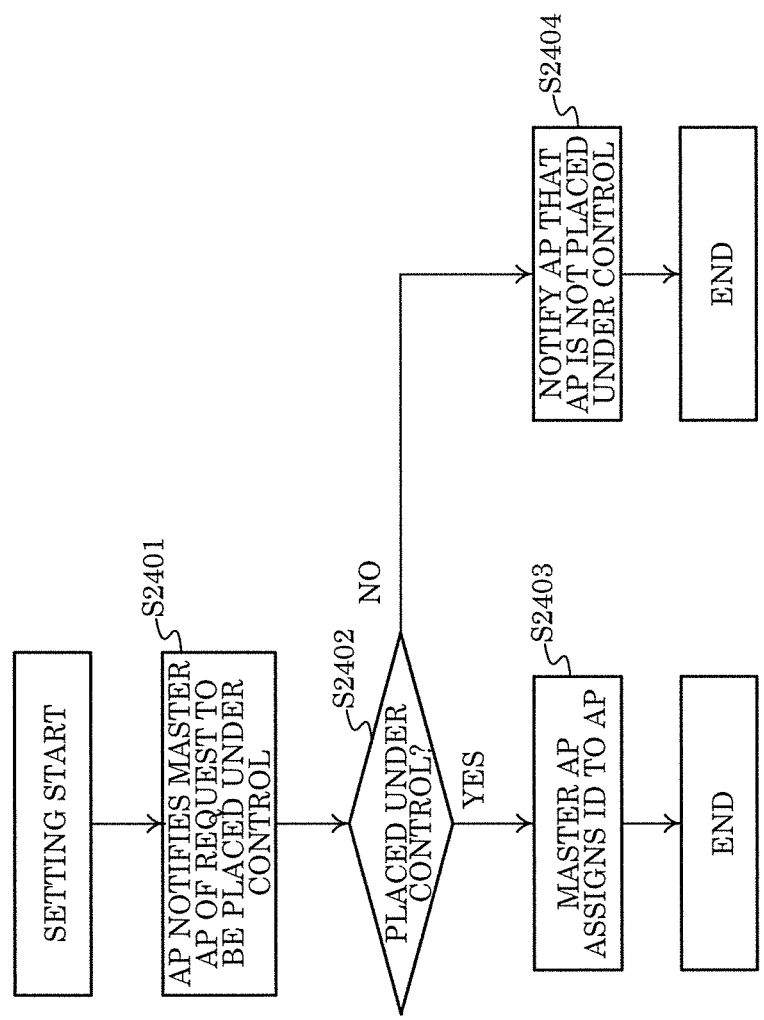
FIG. 24 is a flowchart illustrating operation in the case where AP 1820-1 which is a master AP newly places an AP under control in wireless communication system 1800.

Operation in the case where AP 1820-1 which is a master AP newly places an AP under control in wireless communication system 1800 is described below, with reference to a flowchart in FIG. 24.

Suppose three APs 1820-2, 1820-3, and 1820-4 are under control of AP 1820-1 which is a master AP, and then a new AP is to be added. At this point, the phase change patterns (and (AP) IDs (identification)) have already been set for four APs 1820-1, 1820-2, 1820-3, and 1820-4.

An AP that intends to be newly placed under control of AP 1820-1 notifies AP 1820-1 of a request to be placed under control of parent station 110. AP 1820-1 receives the request from the new AP (Step S2401).

AP 1820-1 determines whether or not to place the new AP under its control (Step S2402). In the case of determining to place the new AP under its control (Step S2402: "Yes"), AP 1820-1 assigns an ID to the new AP. Here, the ID is associated with a phase change pattern. The new AP sets the phase change pattern from the assigned ID (Step S2403). This completes the operation in the case of newly placing an AP under control.

In the case of determining not to place the new AP under its control (Step S2402: "No"), AP 1820-1 notifies the new AP that the AP is not to be placed under its control (Step S2404). This completes the operation in the case of newly placing an AP under control.

Step S2403 may be performed as follows.

AP 1820-1 which is a master AP transmits information indicating the phase change pattern to be set by the new AP, to the new AP. The new AP receives the information indicating the phase change pattern, and sets the phase change pattern in the AP based on the received information indicating the phase change pattern. Here, AP 1820-1 which is a master AP may or may not assign the ID to the new AP. Assigning the ID here has the advantage that, in the case where AP 1820-1 which is a master AP designates the AP newly placed under its control as a unicast transmission AP or a multicast transmission AP, the ID and unicast transmission or multicast transmission can be easily designated for the AP by transmitting information "ID and unicast or multicast" to the AP.

The above describes the case where three APs 1820-2, 1820-3, and 1820-4 are under control of AP 1820-1 which is a master AP and then a new AP is to be added. However, this is not a limitation.

There may be no AP under control of AP 1820-1 which is a master AP in an initial state. In such a case, APs may be placed under control of AP 1820-1 which is a master AP one by one, as described above.

In Step S2402, AP 1820-1 which is a master AP may determine whether or not to place the new AP under its control, depending on a limit to the number of APs placed under its control. AP 1820-1 stores a maximum value of the number of APs placed under its control. When there is a request from one AP to be newly placed under its control, AP 1820-1 adds "1" to the number of APs currently under its control, and compares the obtained value with the maximum value. In the case where the obtained value is not greater than the maximum value, AP 1820-1 permits the AP to be under its control. In the case where the obtained value is greater than the maximum value, AP 1820-1 does not permit the AP to be under its control.

In Step S2402, AP 1820-1 may determine whether or not to place the new AP under its control, depending on the position of the new AP and the phase change pattern.

For example, when the new AP is away from AP 1820-1 and each AP already under its control, AP 1820-1 permits the new AP to be under its control.

For example, when the new AP is near AP 1820-1 or any AP already under its control, if there is a phase change pattern to be assigned to the new AP, AP 1820-1 permits the new AP to be under its control.

For example, when the new AP is near AP 1820-1 or any AP already under its control, if there is no phase change pattern to be assigned to the new AP, AP 1820-1 does not permit the new AP to be under its control.

3.6 Conclusion

According to this embodiment, large-capacity transmission of Gbps level can be achieved. Moreover, the number of terminals accommodated in the case of implementing multicast can be increased. Furthermore, unicast communication can be realized simultaneously with multicast. A flexible system can thus be provided.

4. Embodiment 3

Wireless communication system 2500 according to Embodiment 3 of the present disclosure is described below.

4.1 Wireless Communication System 2500

Figure 25:
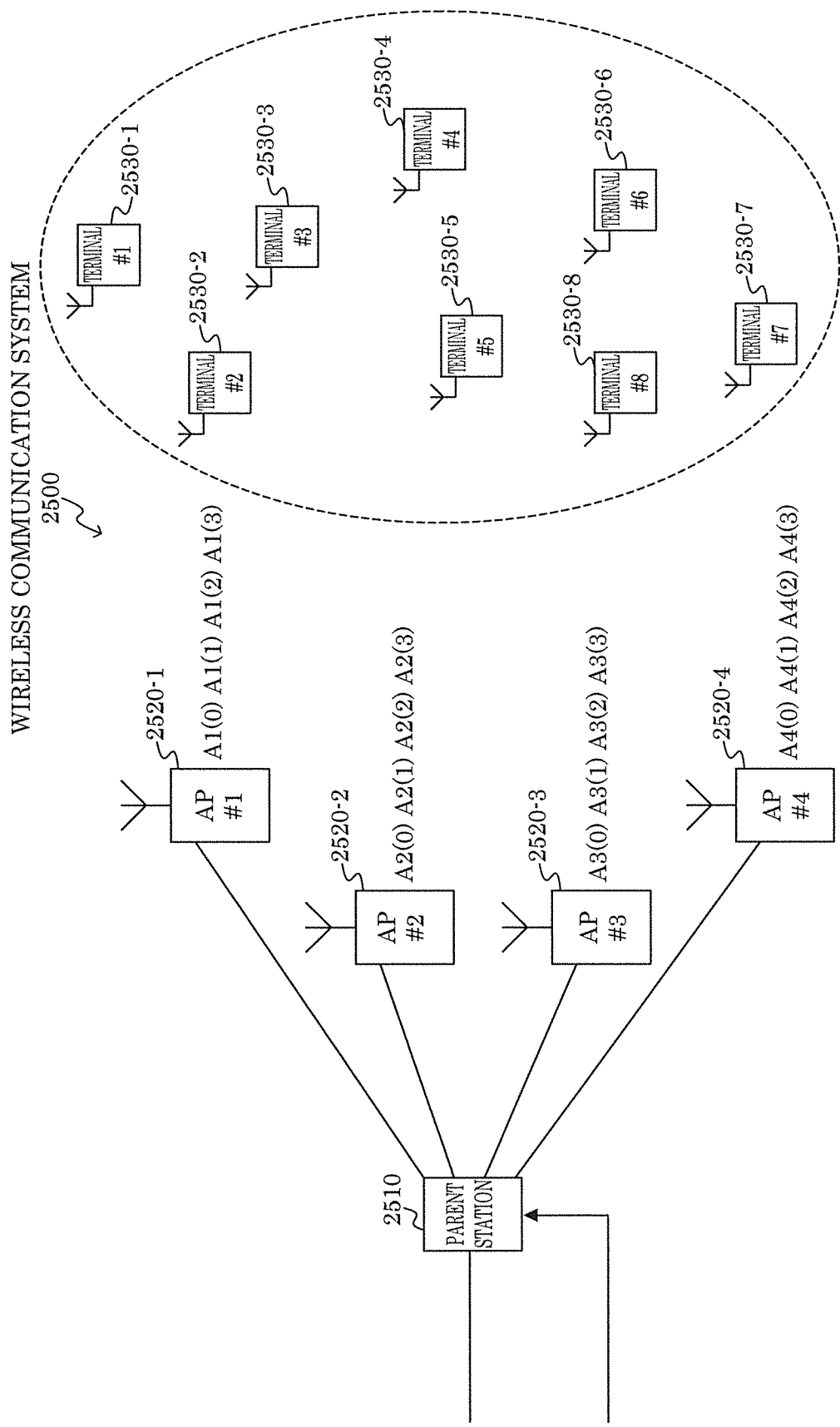
FIG. 25 is a block diagram illustrating the structure of wireless communication system 2500 according to Embodiment 3.

Wireless communication system 2500 includes parent station 2510, APs 2520-1, 2520-2, 2520-3, and 2520-4, and terminals 2530-1, 2530-2, ..., 2530-8, as illustrated in FIG. 25.

Parent station 2510 is connected to a communication device (not illustrated) directly, or indirectly via a communication line. The communication device is, for example, a broadcast device for broadcasting data or a distribution system or a server for transmitting data. The communication device transmits a control signal and data. The control signal includes unicast transmission method-related setting or multicast transmission method-related setting, and weighting method setting. The communication device may include a plurality of communication devices. In this case, a first communication device may transmit the control signal, and a second communication device may transmit the data. Parent station 2510 is wiredly (or wirelessly) connected to APs 2520-1, 2520-2, 2520-3, and 2520-4.

Parent station 2510 receives the control signal and the data from the communication device. Parent station 2510 transmits the control signal and the data to each of APs 2520-1, 2520-2, 2520-3, and 2520-4. APs 2520-1, 2520-2, 2520-3, and 2520-4 wirelessly transmit the data obtained from parent station 2510.

Terminals 2530-1, 2530-2, ..., 2530-8 are each a mobile phone, a smartphone, a tablet, or a personal computer (PC) that has a wireless communication function using a frequency bandwidth of 6 GHz or more such as millimeter wave, e.g. a frequency bandwidth of 60 GHz.

Terminal 2530-1, for example, wirelessly receives data from AP 2520-1 in the case where terminal 2530-1 is located near AP 2520-1. Terminals 2530-2, ..., 2530-8 each wirelessly receive data from its nearby AP, as with terminal 2530-1.

Terminal 2530-1 also wirelessly transmits data. In the case where terminal 2530-1 is located near AP 2520-1, AP 2520-1 wirelessly receives the data from terminal 2530-1. AP 2520-1 transmits the received data to parent station 2510.

Terminals 2530-2, 2530-3, . . . 2530-8 each wirelessly transmit data, as with terminal 2530-1. An AP located near each terminal wirelessly receives the data from the terminal. The AP transmits the data received from the terminal, to parent station 2510.

Parent station 2510 receives data from each terminal via a corresponding AP Parent station 2510 outputs the received data to the communication device.

The control signal transmitted from parent station 2510 to APs 2520-1, 2520-2, 2520-3, and 2520-4 includes unicast transmission-related setting or multicast transmission-related setting in each AP, and weighting method setting in each AP.

4.2 AP 2520

APs 2520-1, 2520-2, 2520-3, and 2520-4, for example, have the same structure (same function). APs 2520-1, 2520-2, 2520-3, and 2520-4 are described below, as AP 2520 collectively.

Figure 26:
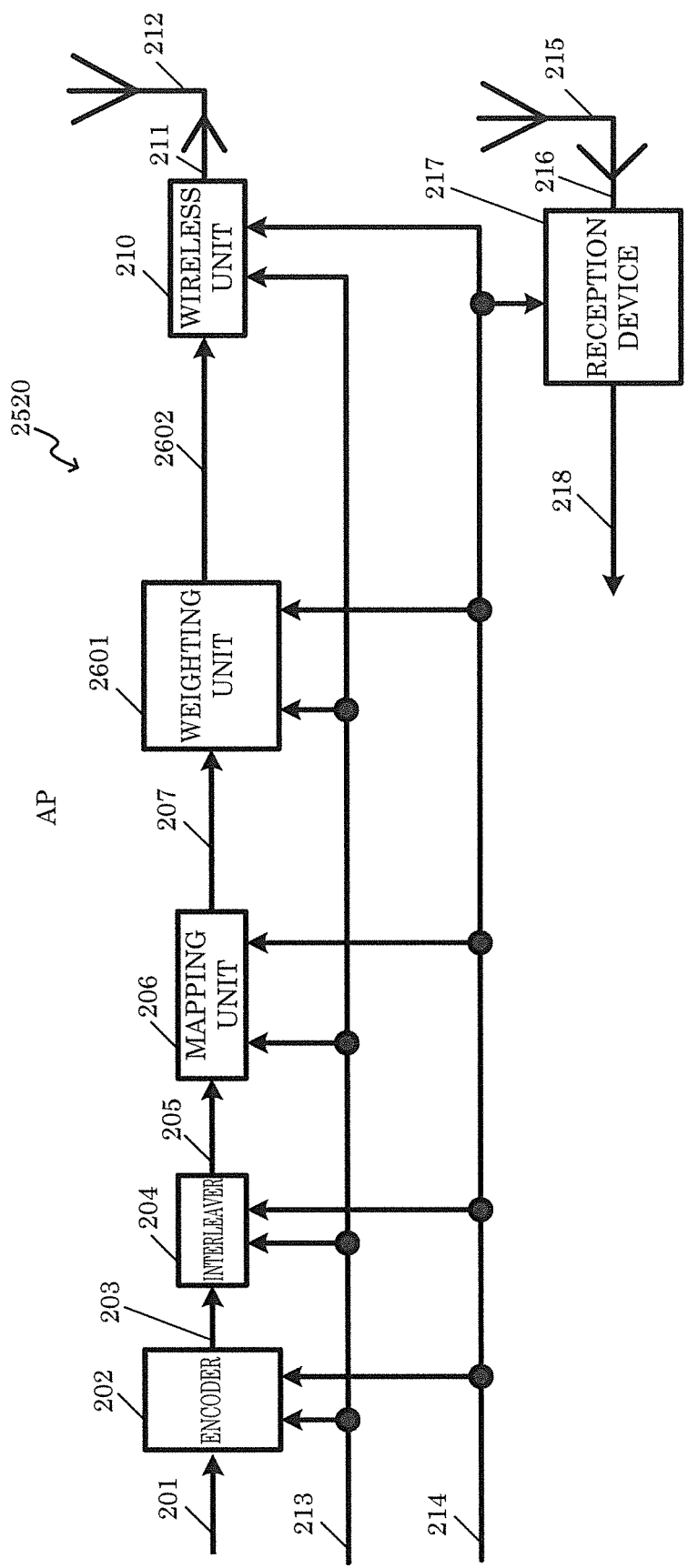
FIG. 26 is a block diagram illustrating the structure of AP 2520.

AP 2520 includes encoder 202, interleaver 204, mapping unit 206, weighting unit 2601, wireless unit 210, antenna 212, antenna 215, and reception device 217, as illustrated in FIG. 26.

AP 2520 receives control signal 214 from parent station 2510. Control signal 214 includes unicast transmission method-related setting or multicast transmission method-related setting, and weighting method setting.

AP 2520 performs unicast transmission method-related setting or multicast transmission-related setting, based on control signal 214 received from parent station 2510. AP 2520 also performs weighting method setting, based on control signal 214. In the case where multicast transmission is set, the AP is set to use the same frequency (frequency band) as other APs.

In the case where unicast transmission is set, AP 2520 operates reception device 217. In the case where multicast transmission is set, AP 2520 may stop the operation of reception device 217.

AP 2520 performs wireless transmission/reception using the same channel (or the same frequency (frequency band)) in the case of unicast transmission and in the case of multicast transmission. Here, AP 2520 may divide one wireless carrier into several time slots, and use each time slot as a communication channel. Alternatively, AP 2520 may use each of a plurality of different frequencies in the frequency bandwidth of 60 GHz, as a communication channel.

(1) Encoder 202

Encoder 202 receives data 201 from parent station 2510. Encoder 202 also receives control signal 213 from a controller included in AP 2520. Control signal 213 includes information such as encoding scheme designation, error correction scheme designation, encoding rate, and block length. Encoder 202 performs error correction encoding, such as convolution encoding, LDPC encoding, or turbo encoding, on data 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 2520. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 2520. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a weighting process.

(4) Weighting Unit 2601

Weighting unit 2601 receives modulated signal 207 from mapping unit 206. Weighting unit 2601 also receives control signal 214. Control signal 214 includes weighting method setting. Weighting unit 2601 performs weighting on modulated signal 207 according to the weighting method setting included in control signal 214, to generate weighted signal 2602. Weighting unit 2601 outputs weighted signal 2602.

(5) Wireless Unit 210 and Antenna 212

Wireless unit 210 receives weighted data 2602 from weighting unit 2601. Wireless unit 210 also receives control signal 213 from the controller included in AP 2520. Control signal 213 includes designation of frequency conversion, amplification, etc. Wireless unit 210 performs processes such as frequency conversion and amplification on weighted signal 2602, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 2510.

Although antennas 212 and 215 are described separately for convenience's sake, they may be the same entity.

4.3 Parent Station 2510

Figure 27:
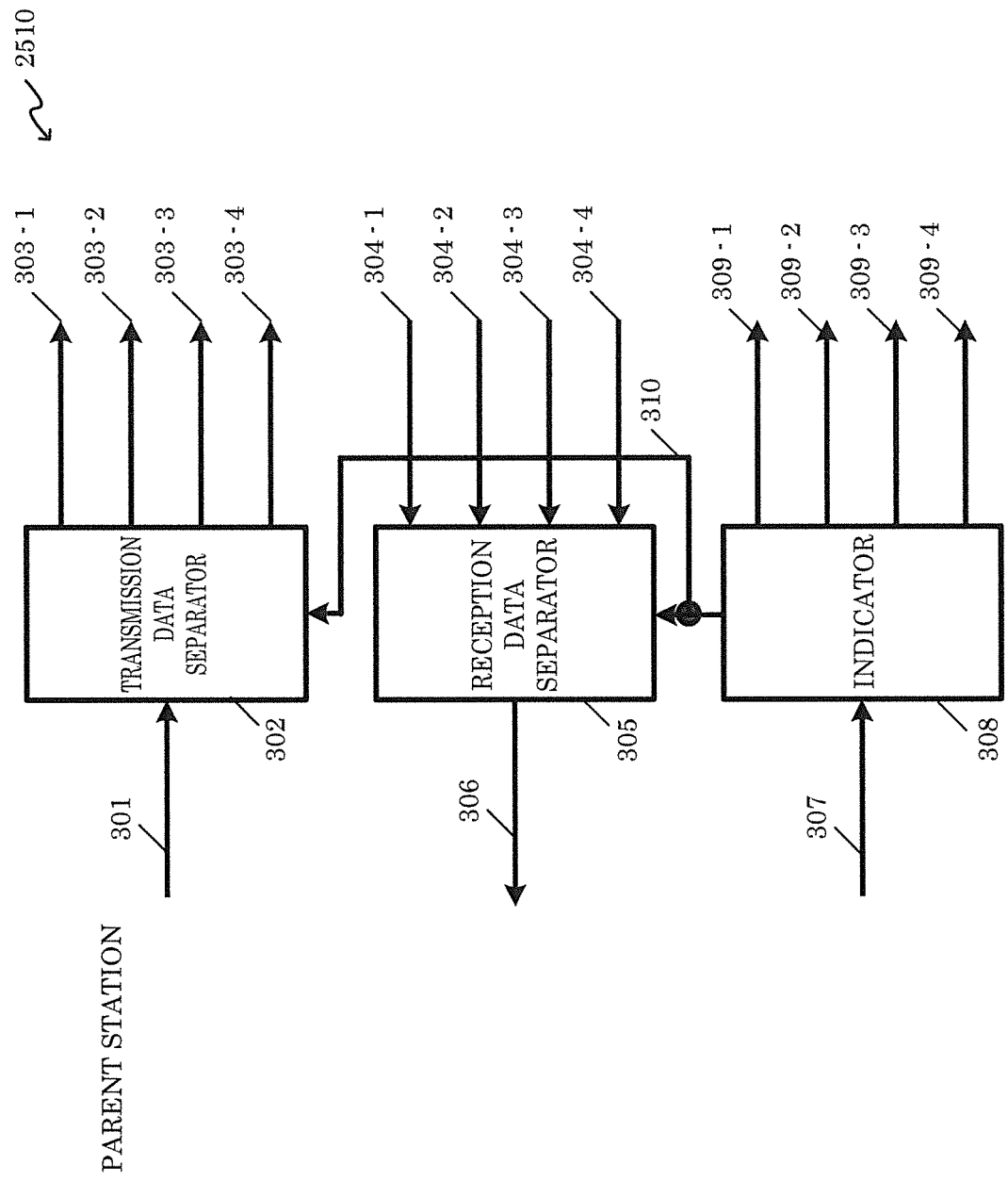
FIG. 27 is a block diagram illustrating the structure of parent station 2510.

Parent station 2510 includes transmission data separator 302, reception data separator 305, and indicator 308, as illustrated in FIG. 27.

(1) Indicator 308

Indicator 308 is connected to the communication device and APs 2520-1, 2520-2, 2520-3, and 2520-4.

Indicator 308 receives control signal 307. Control signal 307 includes unicast transmission-related setting or multicast transmission-related setting, and weighting method setting. For example, the communication device includes a PC, and the user of the PC inputs the control signal through the PC.

Separate control signal 307 may be set for each AP, or same control signal 307 may be set for all APs.

Multicast transmission may be set for all APs, or unicast transmission may be set for all APs. Multicast transmission may be set for part of the APs, and unicast transmission for the other APs. Thus, multicast transmission-related setting and unicast-related setting may be mixed for the APs.

For a plurality of APs set for multicast, the modulated signal before weighting is the same signal. In other words, the same data is transmitted.

Indicator 308 also indicates a weighting method to each AP.

For a plurality of APs set for unicast, the modulated signal before weighting may be the same signal or a different signal. In other words, the same data may be transmitted, or different data may be transmitted.

Indicator 308 outputs received control signal 307 to transmission data separator 302, reception data separator 305, and APs 2520-1, 2520-2, 2520-3, and 2520-4.

(2) Transmission Data Separator 302

Transmission data separator 302 is connected to the communication device, indicator 308, and APs 2520-1, 2520-2, 2520-3, and 2520-4.

Transmission data separator 302 receives control signal 310 from indicator 308. Transmission data separator 302 outputs received control signal 310 to APs 2520-1, 2520-2, 2520-3, and 2520-4.

Transmission data separator 302 also receives data 301 from the communication device. Transmission data separator 302 separates the received data into data for AP 2520-1, data for AP 2520-2, data for AP 2520-3, and data for AP 2520-4. Transmission data separator 302 outputs the separated data to each of APs 2520-1, 2520-2, 2520-3, and 2520-4.

(3) Reception Data Separator 305

Reception data separator 305 is connected to the communication device, indicator 308, and APs 2520-1, 2520-2, 2520-3, and 2520-4.

Reception data separator 305 receives data 304-1, 304-2, 304-3, and 304-4 respectively from APs 2520-1, 2520-2, 2520-3, and 2520-4. Reception data separator 305 outputs received data 304-1, 304-2, 304-3, and 304-4 to the communication device.

4.4 Example of Transmitted Data

An example of data transmitted by parent station 2510 and APs 2520-1, 2520-2, 2520-3, and 2520-4 is described below.

(1) In the Case of Setting all APs for Multicast Transmission to Transmit Data

An example of transmitted data in the case of setting all APs 2520-1, 2520-2, 2520-3, and 2520-4 for multicast transmission to transmit data is described below with reference to FIGS. 28 and 29.

Figure 28:
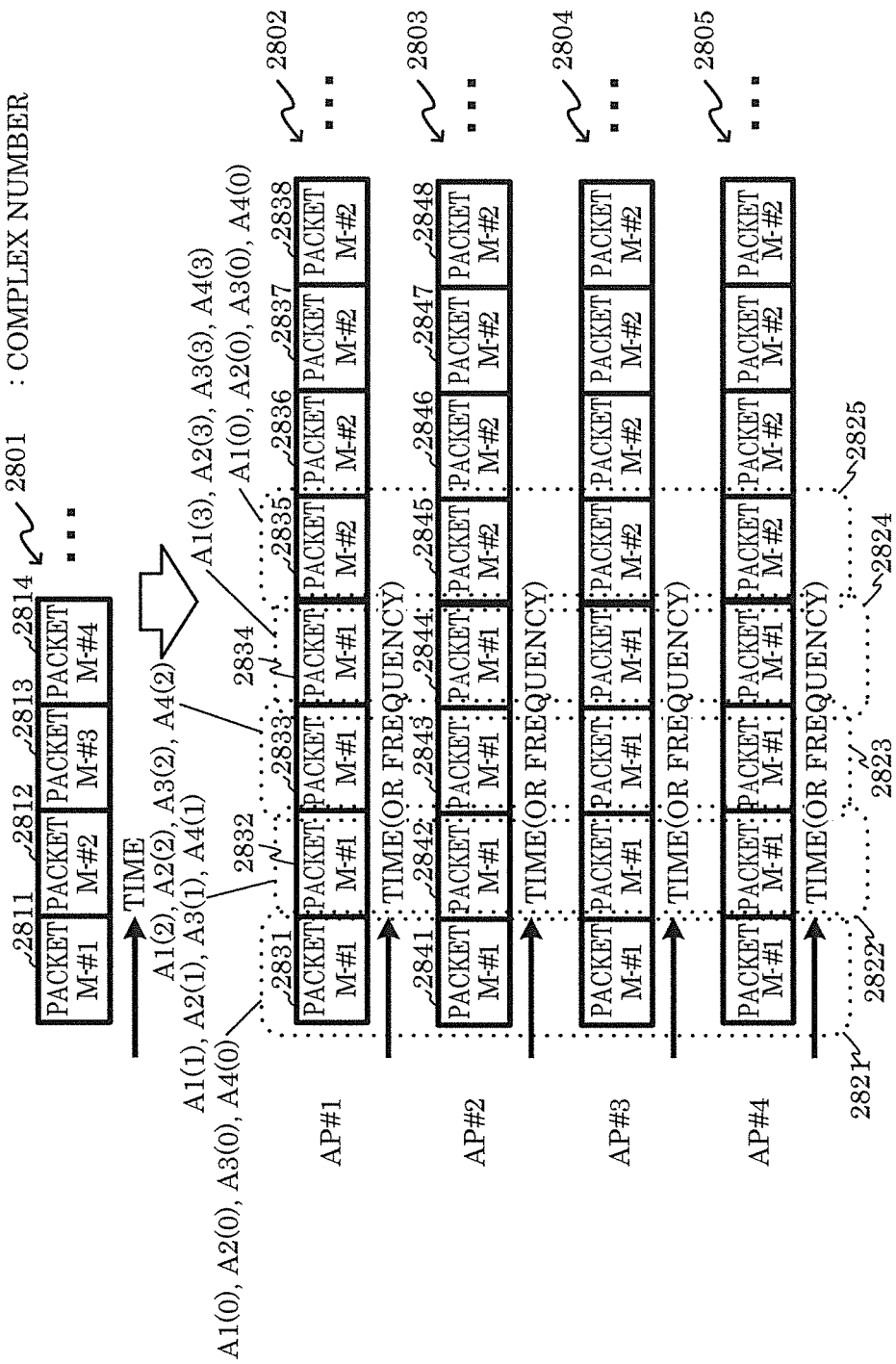
FIG. 28 is a diagram illustrating an example of transmitted data in the case of setting all APs 2520-1, 2520-2, 2520-3, and 2520-4 for multicast to perform transmission

Transmission data separator 302 receives packets 2811, 2812, 2813, 2814, . . . in this order, as illustrated in FIG. 28. Packets 2811, 2812, 2813, 2814, . . . are all multicast packets. Packets 2811, 2812, 2813, 2814, . . . are generated from one set of multicast data.

Transmission data separator 302 outputs packets 2811, 2812, 2813, 2814, . . . in this order, to each of APs 2520-1, 2520-2, 2520-3, and 2520-4.

(a) Process 1 of Each AP

As illustrated in FIGS. 25 and 28, AP 2520-1 prepares A1(0), A1(1), A1(2), A1(3), . . . as weights. Likewise, AP 2520-2 prepares A2(0), A2(1), A2(2), A2(3), . . . as weights.

AP 2520-3 prepares A3(0), A3(1), A3(2), A3(3), . . . as weights. AP 2520-4 prepares A4(0), A4(1), A4(2), A4(3), . . . as weights.

(b) Process 2 of Each AP

The process of each AP is described below, with reference to FIG. 29.

(Process of AP 2520-1)

Figure 29:
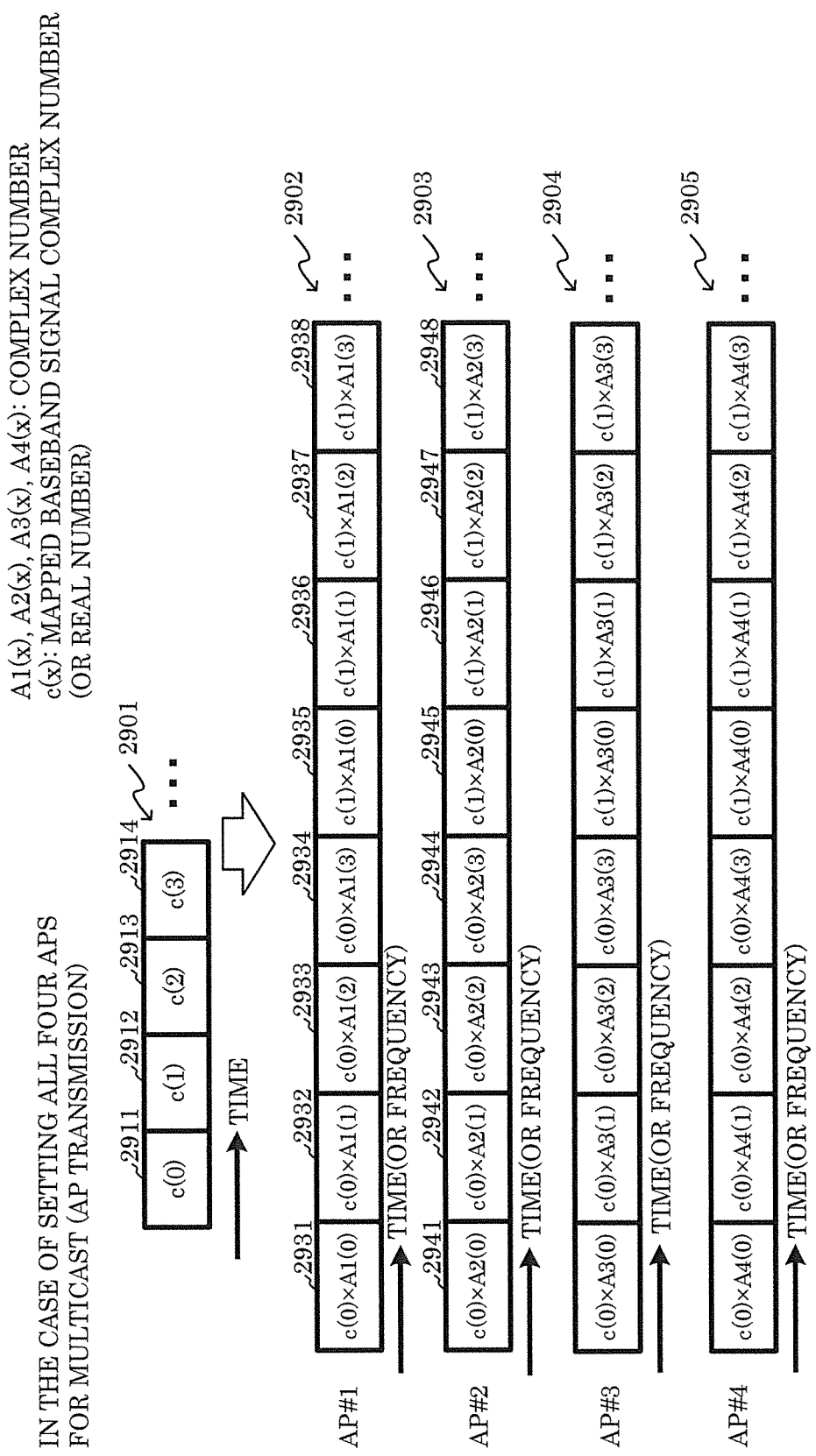
FIG. 29 is a diagram illustrating another example of transmitted data in the case of setting all APs 2520-1, 2520-2, 2520-3, and 2520-4 for multicast to perform transmission

Mapping unit 206 in AP 2520-1 generates mapped baseband signal complex numbers (which may be real numbers) 2911 "c(0)", 2912 "c(1)", 2913 "c(2)", 2914 "c(3)", . . . , as illustrated in FIG. 29.

c(0) is a mapped baseband signal related to packet 2811, c(1) is a mapped baseband signal related to packet 2812, c(2) is a mapped baseband signal related to packet 2813, c(3) is a mapped baseband signal related to packet 2814, . . . .

After mapped baseband signal complex number 2911 "c(0)" is generated, weighting unit 2601 in AP 2520-1 calculates c(0)×A1(0) (2931), c(0)×A1(1) (2932), c(0)×A1(2) (2933), and c(0)×A1(3) (2934), using complex numbers A1(0), A1(1), A1(2), and A1(3).

AP 2520-1 wirelessly outputs c(0)×A1(0) (2931), c(0)×A1(1) (2932), c(0)×A1(2) (2933), and c(0)×A1(3) (2934).

After mapped baseband signal complex number 2912 "c(1)" is generated, weighting unit 2601 in AP 2520-1 calculates c(1)×A1(0) (2935), c(1)×A1(1) (2936), c(1)×A1(2) (2937), and c(1)×A1(3) (2938), using complex numbers A1(0), A1(1). A1(2), and A1(3).

AP 2520-1 wirelessly outputs c(1)×A1(0) (2935), c(1)×A1(1) (2936), c(1)×A1(2) (2937), and c(1)×A1(3) (2938).

In the case where mapped baseband signal complex numbers 2913 "c(2)", 2914 "c(3)", . . . are generated, AP 2520-1 operates in the same way as above.

(Process of AP 2520-2)

Mapping unit 206 in AP 2520-2 generates mapped baseband signal complex numbers 2911 "c(0)", 2912 "c(1)", 2913 "c(2)", 2914 "c(3)", . . . , as illustrated in FIG. 29.

c(0) is a mapped baseband signal related to packet 2811, c(1) is a mapped baseband signal related to packet 2812, c(2) is a mapped baseband signal related to packet 2813, c(3) is a mapped baseband signal related to packet 2814, . . . .

After mapped baseband signal complex number 2911 "c(0)" is generated, weighting unit 2601 in AP 2520-2 calculates c(0)×A2(0) (2941), c(0)×A2(1) (2942), c(0)×A2(2) (2943), and c(0)×A2(3) (2944), using complex numbers A2(0), A2(1), A2(2), and A2(3).

AP 2520-2 wirelessly outputs c(0)×A2(0) (2941), c(0)×A2(1) (2942), c(0)×A2(2) (2943), and c(0)×A2(3) (2944).

After mapped baseband signal complex number 2912 "c(1)" is generated, weighting unit 2601 in AP 2520-2 calculates c(1)×A2(0) (2945), c(1)×A2(1) (2946), c(1)×A2(2) (2947), and c(1)×A2(3) (2948), using complex numbers A2(0), A2(1), A2(2), and A2(3).

AP 2520-2 wirelessly outputs c(1)×A2(0) (2945), c(1)×A2(1) (2946), c(1)×A2(2) (2947), and c(1)×A2(3) (2948).

In the case where mapped baseband signal complex numbers 2913 "c(2)", 2914 "c(3)", . . . are generated, AP 2520-2 operates in the same way as above.

(Process of APs 2520-3 and 2520-4)

APs 2520-3 and 2520-4 operate in the same way as above.

Here, weighting unit 2601 in AP 2520-3 performs weighting using complex numbers A3(0), A3(1), A3(2), and A3(3).

Moreover, weighting unit 2601 in AP 2520-4 performs weighting using complex numbers A4(0), A4(1), A4(2), and A4(3).

Thus, features lie in that each packet is subjected to different weighting and transmitted a plurality of times, and that each packet is transmitted a plurality of times from a plurality of APs.

Transmission using a plurality of APs has the advantageous effect of widening the cell area. In addition, transmitting each packet a plurality of times with different weighting has the advantageous effect of maintaining more uniform reception quality in the cell area because the packet is transmitted a plurality of times with different directivity.

For example, weighting coefficients A1($i$), A2($i$), A3($i$), and A4($i$) have the following properties.

Suppose a modulated signal of packet A is transmitted N times (N is an integer greater than or equal to 2). Let A1($u$) be a weighting coefficient used to transmit the u-th modulated signal of packet A, and A1($v$) be a weighting coefficient used to transmit the v-th modulated signal of packet A. u and v are each an integer greater than or equal to 1 and less than or equal to N, where u≠v. For all u and v that are each an integer greater than or equal to 1 and less than or equal to N where u≠v, A1($u$)≠A1($v$) holds.

Equally suppose a modulated signal of packet A is transmitted N times (N is an integer greater than or equal to 2). Let Ak(u) be a weighting coefficient used to transmit the u-th modulated signal of packet A, and Ak(v) be a weighting coefficient used to transmit the v-th modulated signal of packet A. u and v are each an integer greater than or equal to 1 and less than or equal to N, where u≠v. For all u and v that are each an integer greater than or equal to 1 and less than or equal to N where u≠v, Ak(u)≠Ak(v) holds (k is an integer greater than or equal to 1).

Weighting coefficient Ak(i) may have a cycle. When the cycle is denoted by M (M is an integer greater than or equal to 2), the following Expression (8) holds.

[Math. 8]

$$Ak(i) = Ak(i \bmod M) \quad \text{Expression (8)}.$$

i mod M is the remainder after division of i by M.

(2) In the Case of Setting APs 2520-1 and 2520-2 for Multicast Transmission and APs 2520-3 and 2520-4 for Unicast Transmission to Transmit Data An example of transmitted data in the case of setting APs 2520-1 and 2520-2 for multicast transmission and APs 2520-3 and 2520-4 for unicast transmission to transmit data is described below, with reference to FIGS. 30 and 31. In this case, APs 2520-1 and 2520-2 transmit the same data (the modulated signal after mapping and before phase change is the same). Moreover, APs 2520-3 and 2520-4 transmit the same data (the modulated signal after mapping is the same).

Figure 30:
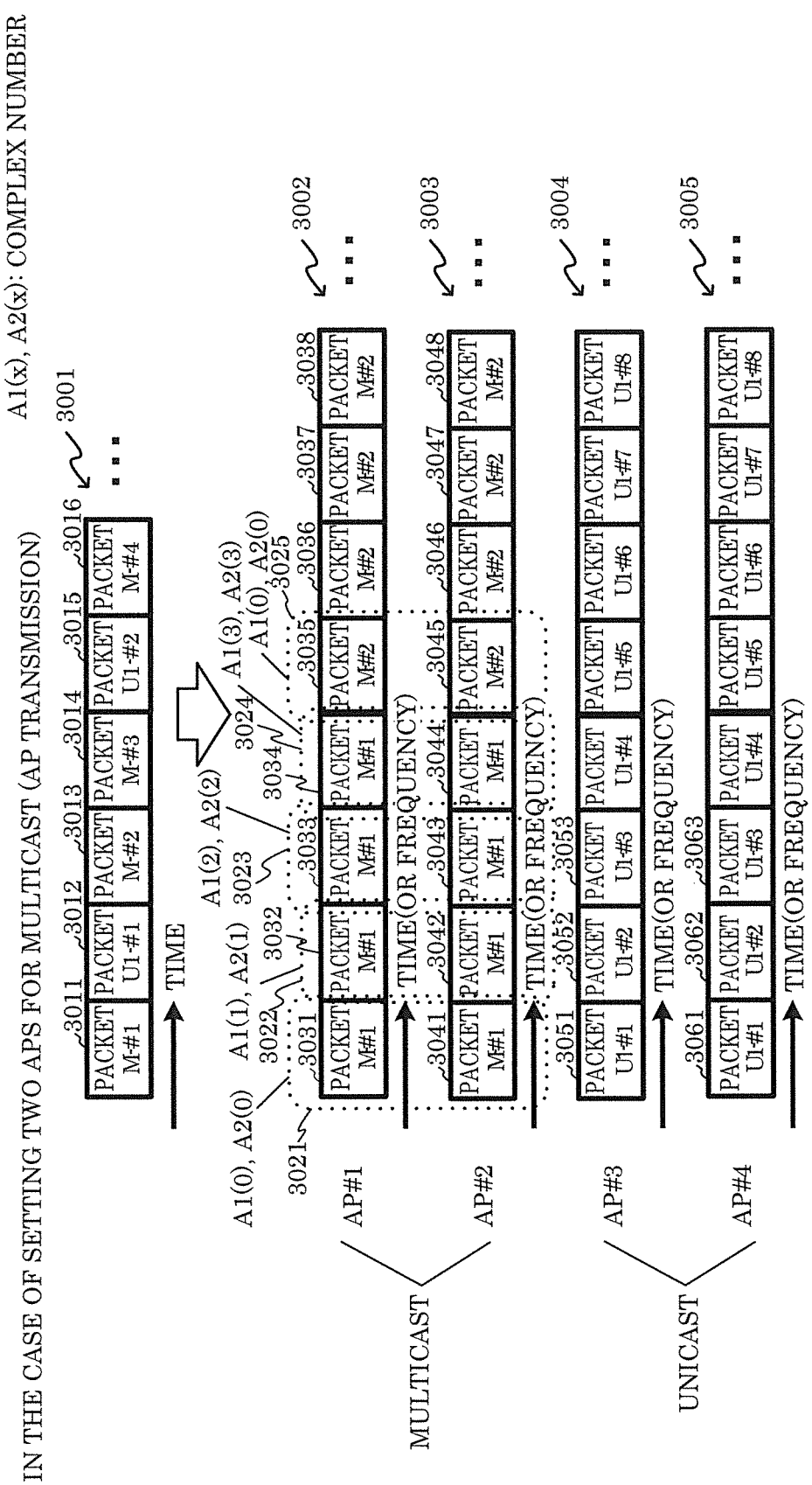
FIG. 30 is a diagram illustrating an example of transmitted data in the case of setting APs 2520-1 and 2520-2 for multicast and APs 2520-3 and 2520-4 for unicast to perform transmission

Transmission data separator 302 receives packets 3011, 3012, 3013, 3014, . . . in this order, as illustrated in FIG. 30. Packets 3011, 3013, 3014, 3016, . . . are multicast packets. Packets 3011, 3013, 3014, 3016, . . . are generated from one set of multicast data. Packets 3012, 3015, . . . are unicast packets. Packets 3012, 3015, . . . are generated from one set of unicast data.

Transmission data separator 302 outputs multicast packets 3011, 3013, 3014, 3016, . . . in this order, to each of APs 2520-1 and 2520-2. Transmission data separator 302 also outputs unicast packets 3012, 3015, . . . in this order, to each of APs 2520-3 and 2520-4.

(a) Process 1 of Each AP

As illustrated in FIGS. 25 and 30, AP 2520-1 prepares A1(0), A1(1), A1(2), A1(3), . . . as weights. Likewise, AP 2520-2 prepares A2(0), A2(1), A2(2), A2(3), . . . as weights.

(b) Process 2 of Each AP

Another example of the process of each AP is described below, with reference to FIG. 31.

(Process of AP 2520-1)

Figure 31:
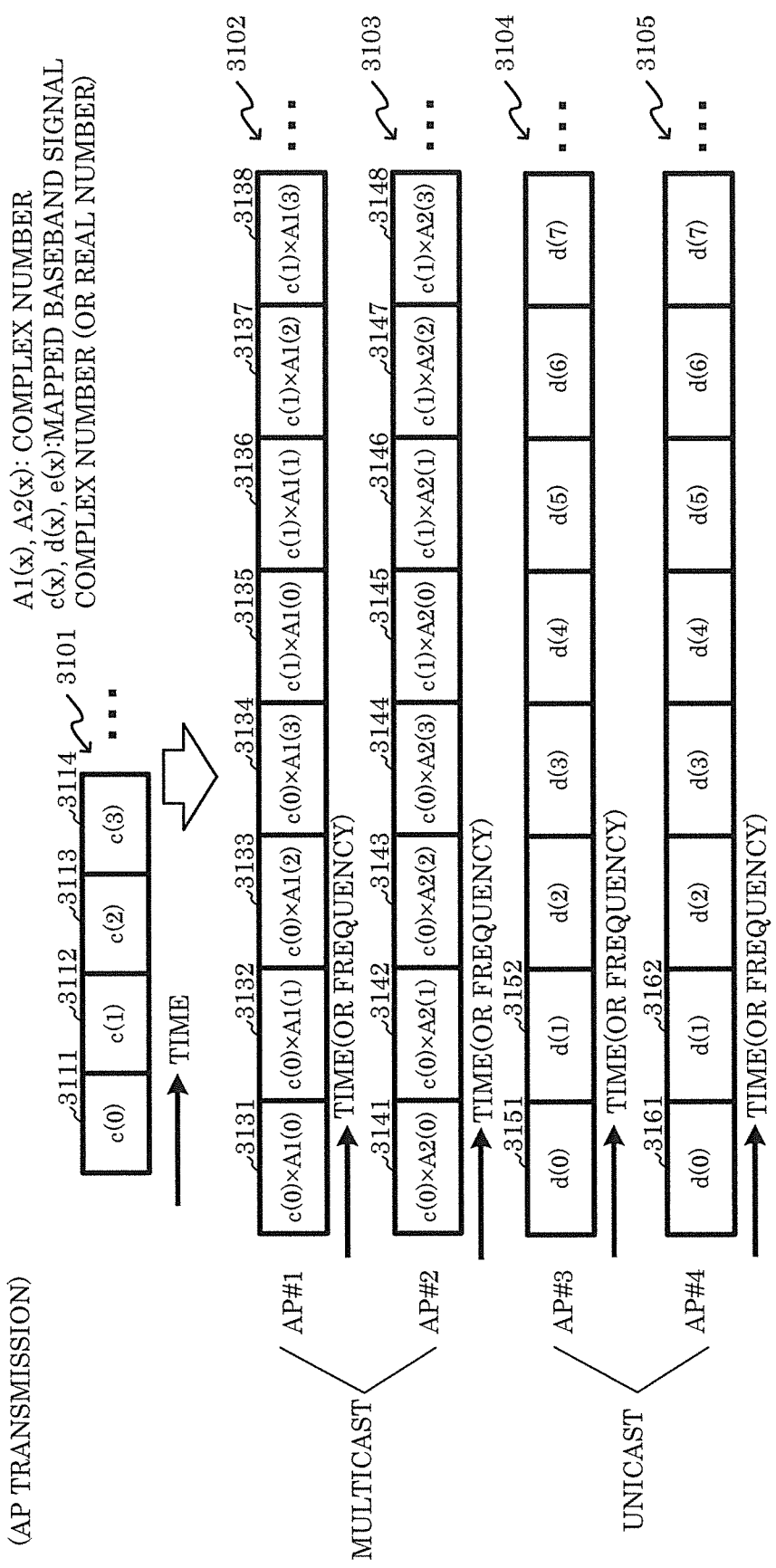
FIG. 31 is a diagram illustrating another example of transmitted data in the case of setting APs 2520-1 and 2520-2 for multicast and APs 2520-3 and 2520-4 for unicast to perform transmission

Mapping unit 206 in AP 2520-1 generates mapped baseband signal complex numbers 3111 "c(0)", 3112 "c(1)", 3113 "c(2)", 3114 "c(3)", . . . , as illustrated in FIG. 31.

c(0) is a mapped baseband signal related to packet 3011, c(1) is a mapped baseband signal related to packet 3013, c(2) is a mapped baseband signal related to packet 3014, c(3) is a mapped baseband signal related to packet 3016, . . . .

After mapped baseband signal complex number 3111 "c(0)" is generated, weighting unit 2601 in AP 2520-1 calculates c(0)×A1(0) (3131), c(0)×A1(1) (3132), c(0)×A1(2) (3133), and c(0)×A1(3) (3134), using complex numbers A1(0), A1(1), A1(2), and A1(3).

AP 2520-1 wirelessly outputs c(0)×A1(0) (3131), c(0)×A1(1) (3132), c(0)×A1(2) (3133), and c(0)×A1(3) (3134).

After mapped baseband signal complex number 3112 "c(1)" is generated, weighting unit 2601 in AP 2520-1 calculates c(1)×A1(0) (3135), c(1)×A1(1) (3136), c(1)×A1(2) (3137), and c(1)×A1(3) (3138), using complex numbers A1(0), A1(1), A1(2), and A1(3).

AP 2520-1 wirelessly outputs c(1)×A1(0) (3135), c(1)×A1(1) (3136), c(1)×A1(2) (3137), and c(1)×A1(3) (3138).

In the case where mapped baseband signal complex numbers 3113 "c(2)", 3114 "c(3)", . . . are generated, AP 2520-1 operates in the same way as above.

(Process of AP 2520-2)

Mapping unit 206 in AP 2520-2 generates mapped baseband signal complex numbers 3111 "c(0)", 3112 "c(1)", 3113 "c(2)", 3114 "c(3)", . . . , as illustrated in FIG. 31.

c(0) is a mapped baseband signal related to packet 3011, c(1) is a mapped baseband signal related to packet 3013, c(2) is a mapped baseband signal related to packet 3014, c(3) is a mapped baseband signal related to packet 3016, . . . .

After mapped baseband signal complex number 3111 "c(0)" is generated, weighting unit 2601 in AP 2520-2 calculates c(0)×A2(0) (3141), c(0)×A2(1) (3142), c(0)×A2(2) (3143), and c(0)×A2(3) (3144), using complex numbers A2(0), A2(1), A2(2), and A2(3).

AP 2520-2 wirelessly outputs c(0)×A2(0) (3141), c(0)×A2(1) (3142), c(0)×A2(2) (3143), and c(0)×A2(3) (3144).

After mapped baseband signal complex number 3112 "c(1)" is generated, weighting unit 2601 in AP 2520-2 calculates c(1)×A2(0) (3145), c(1)×A2(1) (3146), c(1)×A2(2) (3147), and c(1)×A2(3) (3148), using complex numbers A2(0), A2(1), A2(2), and A2(3).

AP 2520-2 wirelessly outputs c(1)×A2(0) (3145), c(1)×A2(1) (3146), c(1)×A2(2) (3147), and c(1)×A2(3) (3148).

In the case where mapped baseband signal complex numbers 3113 "c(2)", 3114 "c(3)", . . . are generated, AP 2520-2 operates in the same way as above.

(Process of AP 2520-3)

Mapping unit 206 in AP 2520-3 generates mapped baseband signal complex numbers "d(0)", "d(1)", "d(2)", . . . .

d(0) is a mapped baseband signal related to packet 3051, d(1) is a mapped baseband signal related to packet 3052, d(2) is a mapped baseband signal related to packet 3053, . . . .

After mapped baseband signal complex number "d(0)" is generated, AP 2520-3 wirelessly outputs mapped baseband signal complex number "d(0)" (3151), as illustrated in FIG. 31.

After mapped baseband signal complex number "d(1)" is generated, AP 2520-3 wirelessly outputs mapped baseband signal complex number "d(1)" (3152), as illustrated in FIG. 31.

Likewise, AP 2520-3 generates mapped baseband signal complex numbers "d(2)", "d(3)", "d(4)", ..., "d(7)", ..., and wirelessly outputs generated "d(2)", "d(3)", "d(4)", ..., "d(7)", ..., as illustrated in FIG. 31.

(Process of AP 2520-4)

Mapping unit 206 in AP 2520-4 generates mapped baseband signal complex numbers "d(0)", "d(1)", "d(2)", ....

d(0) is a mapped baseband signal related to packet 3061, d(1) is a mapped baseband signal related to packet 3062, d(2) is a mapped baseband signal related to packet 3063, ....

After mapped baseband signal complex number "d(0)" is generated, AP 2520-4 wirelessly outputs mapped baseband signal complex number "d(0)" (3161), as illustrated in FIG. 31.

After mapped baseband signal complex number "d(1)" is generated, AP 2520-4 wirelessly outputs mapped baseband signal complex number "d(1)" (3162), as illustrated in FIG. 31.

Likewise, AP 2520-4 generates mapped baseband signal complex numbers "d(2)", "d(3)", "d(4)", ..., "d(7)", ..., and wirelessly outputs generated "d(2)", "d(3)", "d(4)", ..., "d(7)", ..., as illustrated in FIG. 31.

Thus, features lie in that each multicast packet is subjected to different weighting and transmitted a plurality of times, and that each multicast packet is transmitted a plurality of times from a plurality of APs.

Transmission using a plurality of APs has the advantageous effect of widening the cell area. In addition, transmitting each multicast packet a plurality of times with different weighting has the advantageous effect of maintaining more uniform reception quality in the cell area because the packet is transmitted a plurality of times with different directivity.

In APs 2520-3 and 2520-4, phase change may be performed or weighting may be changed with respect to time or frequency. This has the advantageous effect of improving unicast packet reception quality.

(3) in the Case of Setting APs 2520-1 and 2520-2 for Multicast and APs 2520-3 and 2520-4 for Unicast to Transmit Data An example of transmitted data in the case of setting APs 2520-1 and 2520-2 for multicast transmission and APs 2520-3 and 2520-4 for unicast transmission to transmit data is described below, with reference to FIGS. 32 and 33. In this case, APs 2520-3 and 2520-4 transmit different data.

Figure 32:
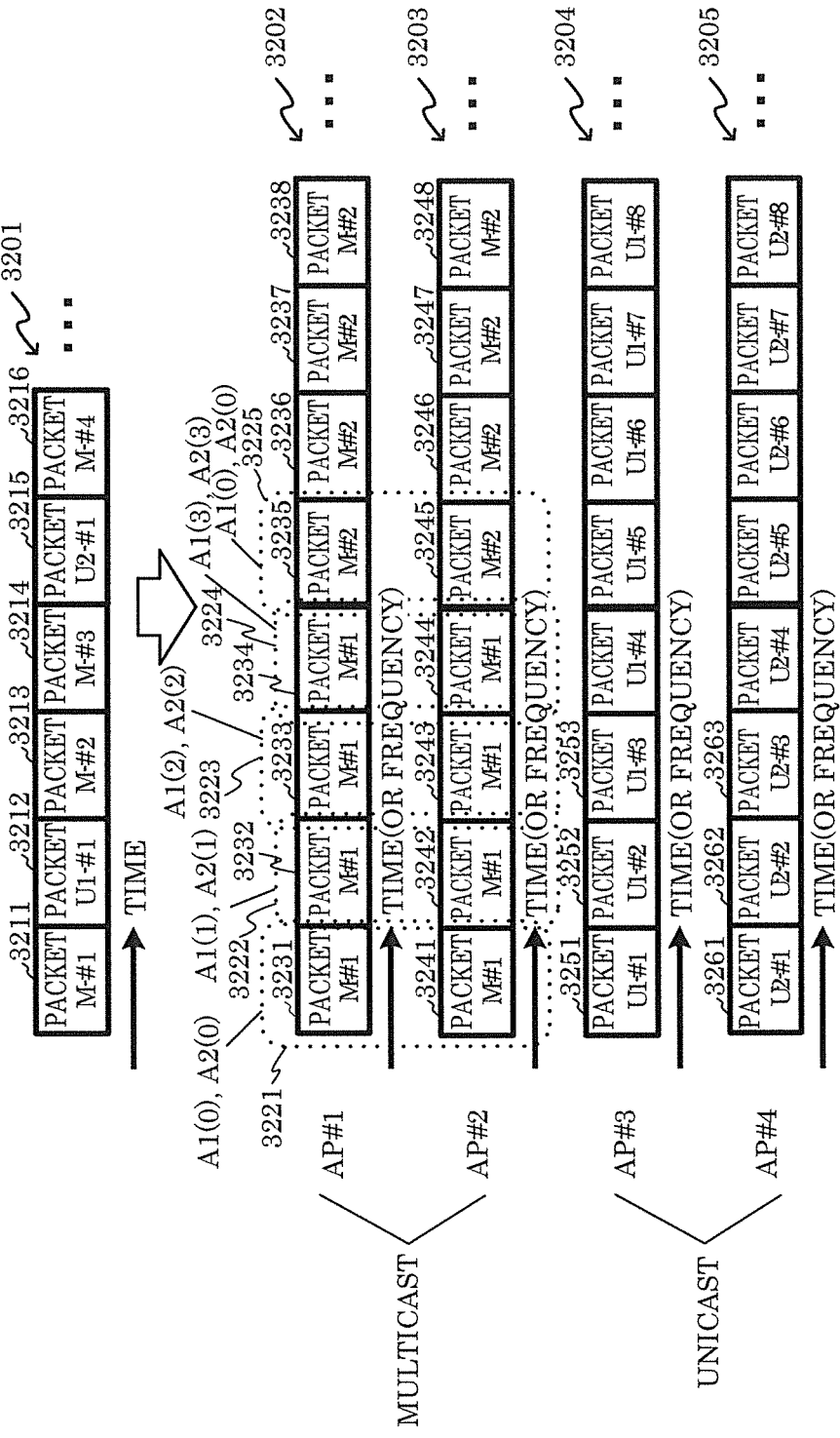
FIG. 32 is a diagram illustrating an example of transmitted data in the case of setting APs 2520-1 and 2520-2 for multicast and APs 2520-3 and 2520-4 for unicast to perform transmission

Transmission data separator 302 receives packets 3211, 3212, 3213, 3214, ... in this order, as illustrated in FIG. 32. Packets 3211, 3213, 3214, 3216, ... are multicast packets. Packets 3211, 3213, 3214, 3216, ... are generated from one set of multicast data. Packets 3212, ... are first unicast packets. Packets 3212, ... are generated from first unicast data. Packets 3215, ... are second unicast packets. Packets 3215, ... are generated from second unicast data.

Transmission data separator 302 outputs multicast packets 3211, 3213, 3214, 3216, ... in this order, to each of APs 2520-1 and 2520-2. Transmission data separator 302 also outputs unicast packets 3212, ... in this order, to AP 2520-3. Transmission data separator 302 also outputs unicast packets 3215, ... in this order, to AP 2520-4.

(a) Process 1 of Each AP

As illustrated in FIGS. 25 and 32, AP 2520-1 prepares A1(0), A1(1), A1(2), A1(3), ... as weights. Likewise, AP 2520-2 prepares A2(0), A2(1), A2(2), A2(3), ... as weights.

(b) Process 2 of Each AP

Another example of the process of each AP is described below, with reference to FIG. 33.

(Process of AP 2520-1)

Figure 33:
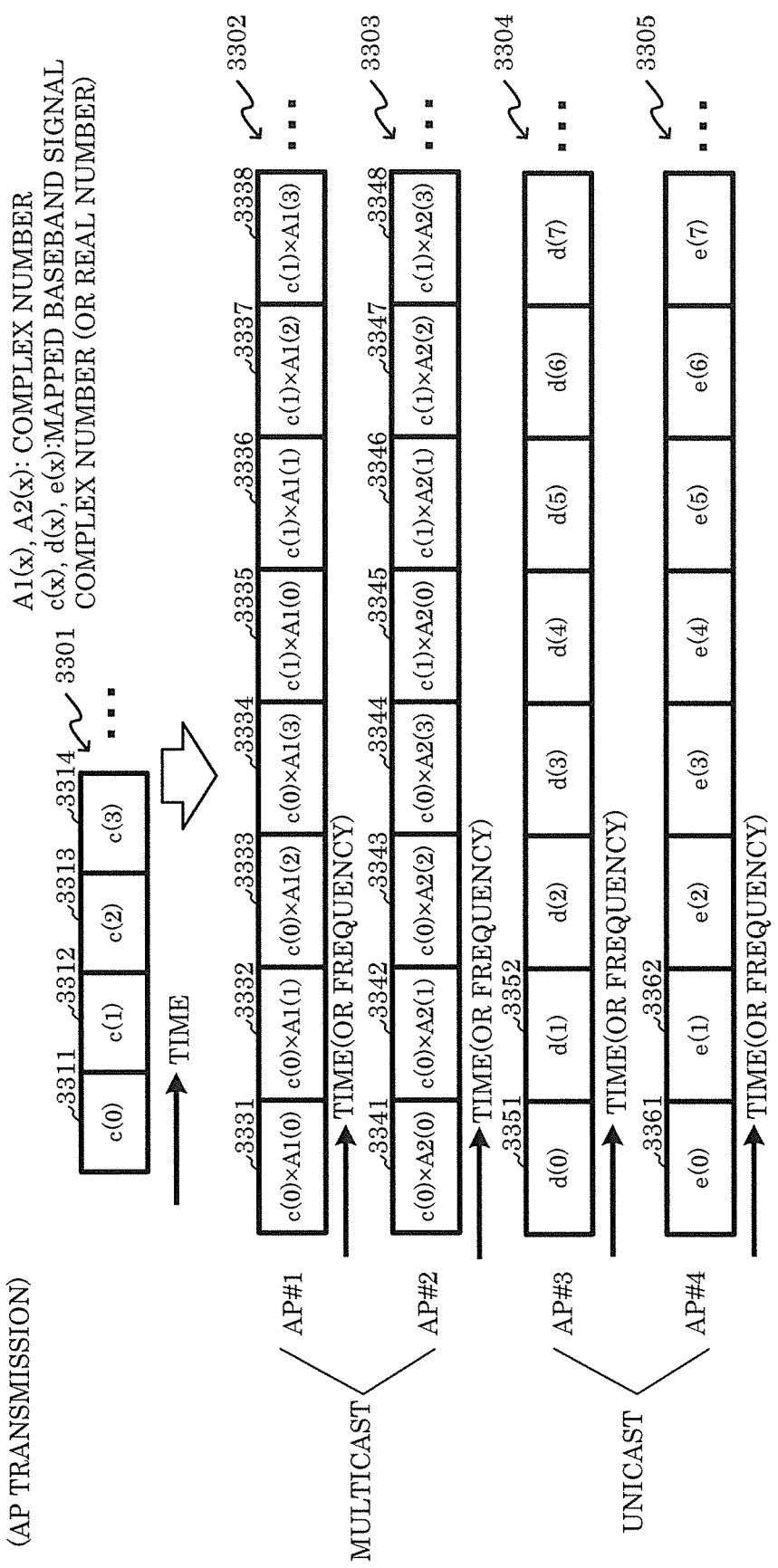
FIG. 33 is a diagram illustrating another example of transmitted data in the case of setting APs 2520-1 and 2520-2 for multicast and APs 2520-3 and 2520-4 for unicast to perform transmission

Mapping unit 206 in AP 2520-1 generates mapped baseband signal complex numbers 3311 "c(0)", 3312 "c(1)", 3313 "c(2)", 3314 "c(3)", ..., as illustrated in FIG. 33.

c(0) is a mapped baseband signal related to packet 3211, c(1) is a mapped baseband signal related to packet 3213, c(2) is a mapped baseband signal related to packet 3214, c(3) is a mapped baseband signal related to packet 3216, ....

After mapped baseband signal complex number 3311 "c(0)" is generated, weighting unit 2601 in AP 2520-1 calculates c(0)×A1(0) (3331), c(0)×A1(1) (3332), c(0)×A1(2) (3333), and c(0)×A1(3) (3334), using complex numbers A1(0), A1(1), A1(2), and A1(3).

AP 2520-1 wirelessly outputs c(0)×A1(0) (3331), c(0)×A1(1) (3332), c(0)×A1(2) (3333), and c(0)×A1(3) (3334).

After mapped baseband signal complex number 3312 "c(1)" is generated, weighting unit 2601 in AP 2520-1 calculates c(1)×A1(0) (3335), c(1)×A1(1) (3336), c(1)×A1(2) (3337), and c(1)×A1(3) (3338), using complex numbers A1(0), A1(1). A1(2), and A1(3).

AP 2520-1 wirelessly outputs c(1)×A1(0) (3335), c(1)×A1(1) (3336), c(1)×A1(2) (3337), and c(1)×A1(3) (3338).

In the case where mapped baseband signal complex numbers 3313 "c(2)", 3314 "c(3)", ... are generated, AP 2520-1 operates in the same way as above.

(Process of AP 2520-2)

Mapping unit 206 in AP 2520-2 generates mapped baseband signal complex numbers 3311 "c(0)", 3312 "c(1)", 3313 "c(2)", 3314 "c(3)", ..., as illustrated in FIG. 33.

c(0) is a mapped baseband signal related to packet 3211, c(1) is a mapped baseband signal related to packet 3213, c(2) is a mapped baseband signal related to packet 3214, c(3) is a mapped baseband signal related to packet 3216, ....

After mapped baseband signal complex number 3311 "c(0)" is generated, weighting unit 2601 in AP 2520-2 calculates c(0)×A2(0) (3341), c(0)×A2(1) (3342), c(0)×A2(2) (3343), and c(0)×A2(3) (3344), using complex numbers A2(0), A2(1), A2(2), and A2(3).

AP 2520-2 wirelessly outputs c(0)×A2(0) (3341), c(0)×A2(1) (3342), c(0)×A2(2) (3343), and c(0)×A2(3) (3344).

After mapped baseband signal complex number 3312 "c(1)" is generated, weighting unit 2601 in AP 2520-2 calculates c(1)×A2(0) (3345), c(1)×A2(1) (3346), c(1)×A2(2) (3347), and c(1)×A2(3) (3348), using complex numbers A2(0), A2(1), A2(2), and A2(3).

AP 2520-2 wirelessly outputs c(1)×A2(0) (3345), c(1)×A2(1) (3346), c(1)×A2(2) (3347), and c(1)×A2(3) (3348).

In the case where mapped baseband signal complex numbers 3313 "c(2)", 3314 "c(3)", ... are generated, AP 2520-2 operates in the same way as above.

(Process of AP 2520-3)

Mapping unit 206 in AP 2520-3 generates mapped baseband signal complex numbers "d(0)", "d(1)", "d(2)", ....

d(0) is a mapped baseband signal related to packet 3251, d(1) is a mapped baseband signal related to packet 3252, d(2) is a mapped baseband signal related to packet 3253, ....

After mapped baseband signal complex number "d(0)" is generated, AP 2520-3 wirelessly outputs mapped baseband signal complex number "d(0)" (3351), as illustrated in FIG. 33.

After mapped baseband signal complex number "d(1)" is generated, AP 2520-3 wirelessly outputs mapped baseband signal complex number "d(1)" (3352), as illustrated in FIG. 33.

Likewise, AP 2520-3 generates mapped baseband signal complex numbers "d(2)", "d(3)", "d(4)" . . . , "d(7)", . . . , and wirelessly outputs generated "d(2)", "d(3)", "d(4)", . . . , "d(7)", . . . , as illustrated in FIG. 33.

(Process of AP 2520-4)

Mapping unit 206 in AP 2520-4 generates mapped baseband signal complex numbers "e(0)", "e(1)", "e(2)", . . . .

e(0) is a mapped baseband signal related to packet 3261, e(1) is a mapped baseband signal related to packet 3262, e(2) is a mapped baseband signal related to packet 3263, . . . .

After mapped baseband signal complex number "e(0)" is generated, AP 2520-4 wirelessly outputs mapped baseband signal complex number "e(0)" (3361), as illustrated in FIG. 33.

After mapped baseband signal complex number "e(1)" is generated, AP 2520-4 wirelessly outputs mapped baseband signal complex number "e(1)" (3362), as illustrated in FIG. 33.

Likewise, AP 2520-4 generates mapped baseband signal complex numbers "e(2)", "e(3)", "e(4)", . . . , "e(7)", . . . , and wirelessly outputs generated "e(2)", "e(3)", "e(4)", . . . , "e(7)", . . . , as illustrated in FIG. 33.

Thus, features lie in that each multicast packet is subjected to different weighting and transmitted a plurality of times, and that each multicast packet is transmitted a plurality of times from a plurality of APs.

Transmission using a plurality of APs has the advantageous effect of widening the cell area. In addition, transmitting each multicast packet a plurality of times with different weighting has the advantageous effect of maintaining more uniform reception quality in the cell area because the packet is transmitted a plurality of times with different directivity.

Moreover, a flexible system in which APs 2520-3 and 2520-4 can transmit unicast packets is realized.

There is thus the advantage of realizing a flexible system by, for example, switching the transmission state among the transmission state in FIG. 28, the transmission state in FIG. 30, and the transmission state in FIG. 32 depending on time (e.g. switching depending on the terminal presence situation).

4.5 Conclusion

According to this embodiment, large-capacity transmission of Gbps level can be achieved. Moreover, the number of terminals accommodated in the case of implementing multicast can be increased. Furthermore, unicast communication can be realized simultaneously with multicast. A flexible system can thus be provided.

5. Embodiment 4

Wireless communication system 3400 according to Embodiment 4 as another embodiment of the present disclosure is described below.

5.1 Wireless Communication System 3400

Figure 34:
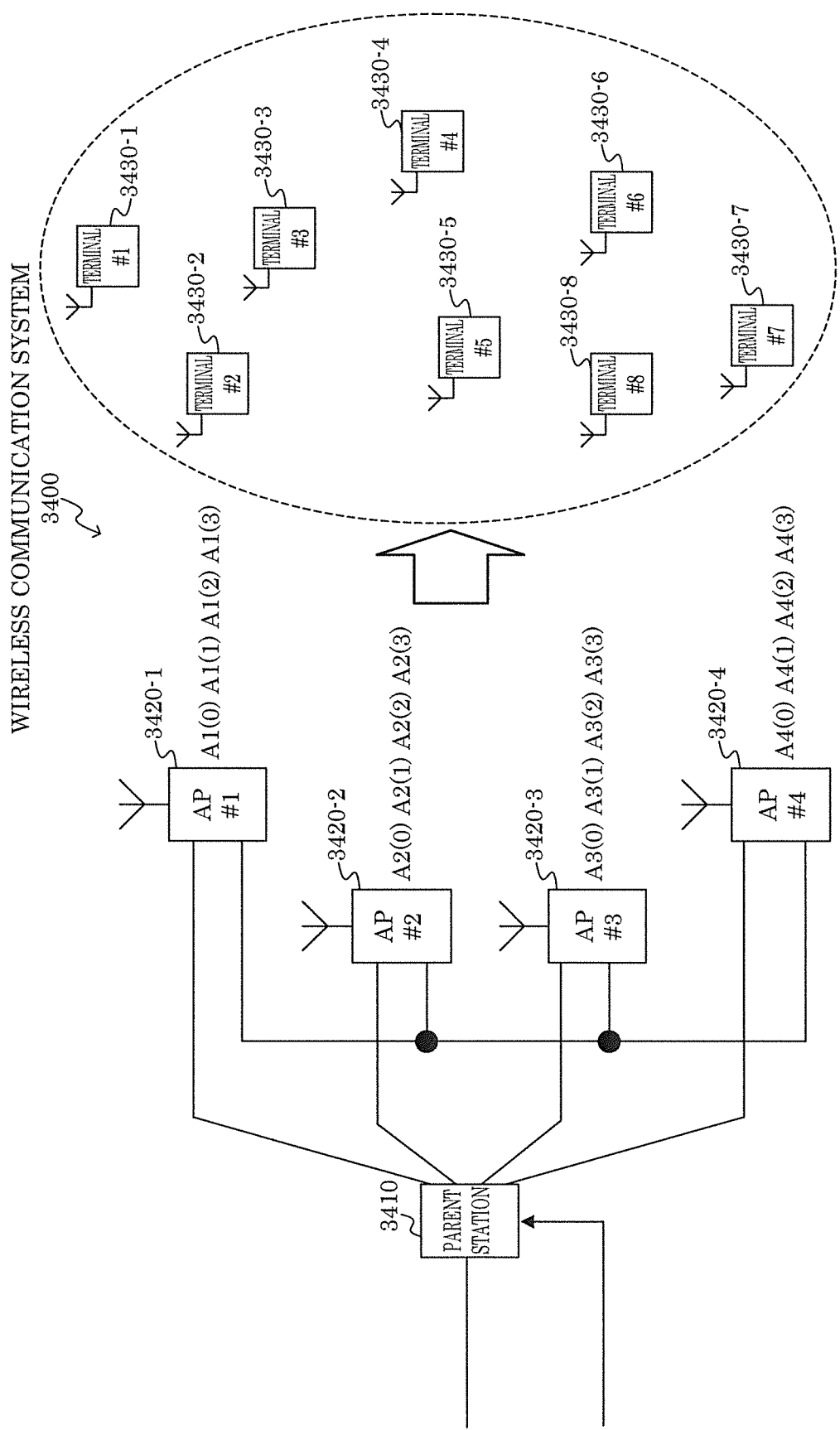
FIG. 34 is a block diagram illustrating the structure of wireless communication system 3400 according to Embodiment 4.

Wireless communication system 3400 includes parent station 3410, APs 3420-1, 3420-2, 3420-3, and 3420-4, and terminals 3430-1, 3430-2, . . . , 3430-8, as illustrated in FIG. 34.

Parent station 3410 is connected to a communication device (not illustrated) directly, or indirectly via a communication line. The communication device is, for example, a broadcast device for broadcasting data or a distribution system or a server for transmitting data. The communication device transmits a control signal and data. The control signal includes unicast transmission method-related setting or multicast transmission method-related setting, and weighting method setting. The communication device may include a plurality of communication devices. In this case, a first communication device may transmit the control signal, and a second communication device may transmit the data. Parent station 3410 is wiredly (or wirelessly) connected to APs 3420-1, 3420-2, 3420-3, and 3420-4. AP 3420-1 is wiredly (or wirelessly) connected to APs 3420-2, 3420-3, and 3420-4.

Parent station 3410 receives the control signal and the data from the communication device. Parent station 3410 transmits the control signal to AP 3420-1. Parent station 3410 transmits the data to each of APs 3420-1, 3420-2, 3420-3, and 3420-4. APs 3420-1, 3420-2, 3420-3, and 3420-4 wirelessly transmit the data received from parent station 3410.

Terminals 3430-1, 3430-2, . . . , 3430-8 are each a mobile phone, a smartphone, a tablet, or a personal computer (PC) that has a wireless communication function using a frequency bandwidth of 6 GHz or more such as millimeter wave, e.g. a frequency bandwidth of 60 GHz. Terminal 3430-1, for example, wirelessly receives data from AP 3420-1 in the case where terminal 3430-1 is located near AP 3420-1. Terminals 3430-2, . . . , 3430-8 each wirelessly receive data from its nearby AP, as with terminal 3430-1.

Terminal 3430-1 also wirelessly transmits data. In the case where terminal 3430-1 is located near AP 3420-1, AP 3420-1 wirelessly receives the data from terminal 3430-1. AP 3420-1 transmits the received data to parent station 3410.

Terminals 3430-2, 3430-3, . . . , 3430-8 each wirelessly transmit data, as with terminal 3430-1. An AP located near each terminal wirelessly receives the data from the terminal. The AP transmits the data received from the terminal, to parent station 3410.

Parent station 3410 receives the data from each terminal, via the corresponding AP. Parent station 3410 outputs the received data to the communication device.

The control signal transmitted from parent station 3410 to AP 3420-1 includes unicast transmission-related setting or multicast transmission-related setting in each AP and weighting method setting in each AP. Parent station 3410 does not perform unicast transmission-related setting and multicast transmission-related setting for APs 3420-2, 3420-3, and 3420-4. Parent station 3410 does not perform weighting method setting for APs 3420-2, 3420-3, and 3420-4.

AP 3420-1 performs unicast transmission-related setting or multicast transmission-related setting for APs 3420-2, 3420-3, and 3420-4. AP 3420-1 also performs weighting method setting for APs 3420-2, 3420-3, and 3420-4.

AP 3420-1 is called "master AP". APs 3420-2, 3420-3, and 3420-4 are called "non-master AP".

5.2 AP 3420-1 as Master AP

Figure 35:
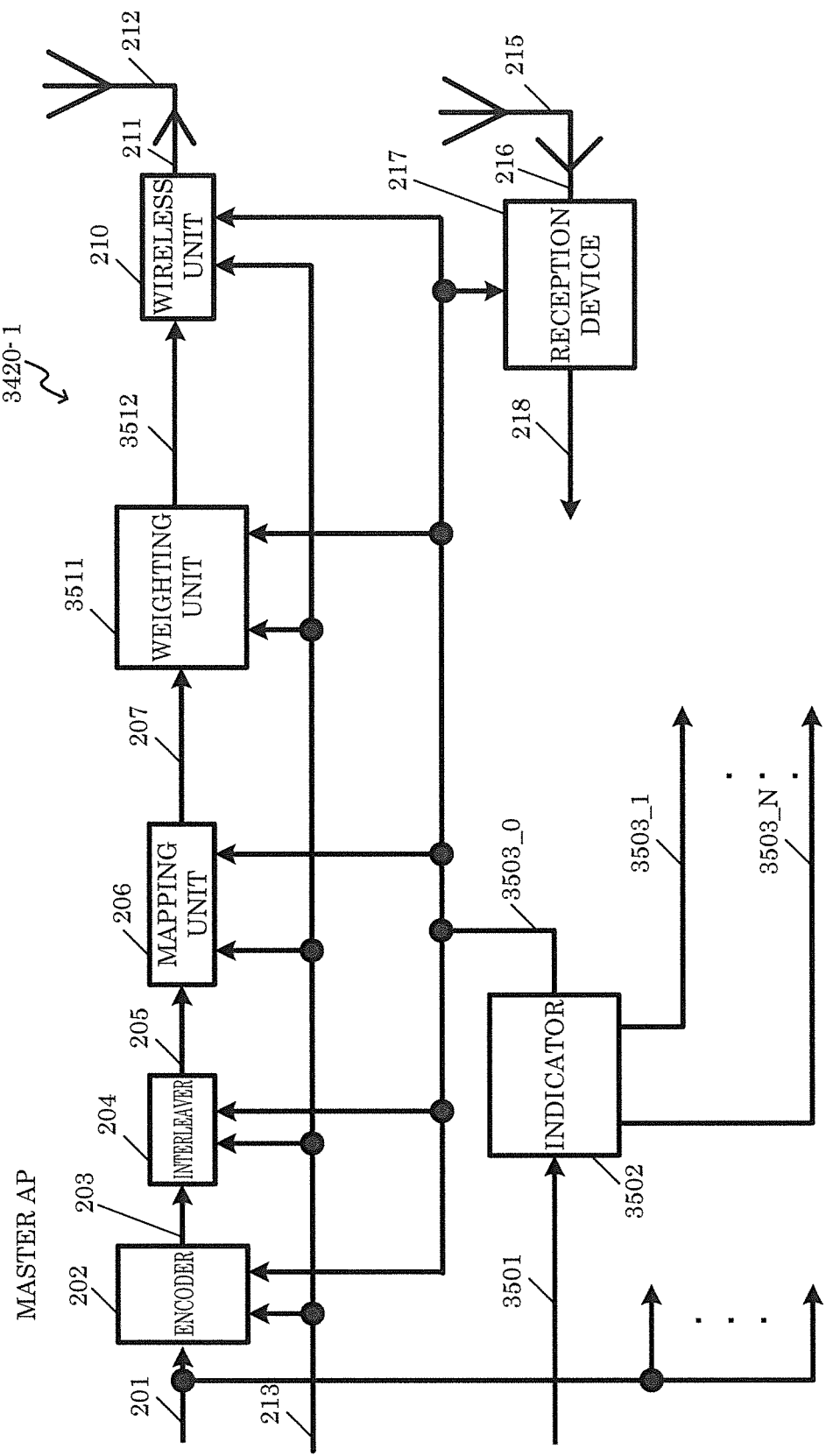
FIG. 35 is a block diagram illustrating the structure of AP 3420-1 which is a master AP.

AP 3420-1 as a master AP includes encoder 202, interleaver 204, mapping unit 206, weighting unit 3511, wireless unit 210, antenna 212, antenna 215, reception device 217, and indicator 3502, as illustrated in FIG. 35.

AP 3420-1 receives control signal 3501 from parent station 3410. Control signal 3501 includes unicast transmission-related setting or multicast transmission-related setting, and weighting method setting.

AP 3420-1 performs unicast transmission-related setting or multicast transmission-related setting, based on control signal 3501 received from parent station 3410. AP 3420-1 also performs weighting method setting, based on control signal 3501. In the case where multicast transmission setting is performed, the AP is set to use the same frequency (frequency band) as other APs.

In the case of performing unicast transmission setting, AP 3420-1 operates reception device 217. In the case of performing multicast transmission setting, AP 3420-1 may stop the operation of reception device 217.

AP 3420-1 performs wireless transmission/reception using the same channel in the case of unicast transmission and in the case of multicast transmission. Here, AP 3420-1 may divide one wireless carrier into several time slots, and use each time slot as a communication channel. Alternatively, AP 3420-1 may use each of a plurality of different frequencies in the frequency bandwidth of 60 GHz, as a communication channel.

(1) Encoder 202

Encoder 202 receives data 201 from parent station 3410. Encoder 202 also receives control signal 213 from a controller included in AP 3420-1. Control signal 213 includes information such as encoding scheme designation, error correction scheme designation, encoding rate, and block length. Encoder 202 performs error correction encoding, such as convolution encoding, LDPC encoding, or turbo encoding, on data 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 3420-1. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 3420-1. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a weighting process.

(4) Weighting Unit 3511

Weighting unit 3511 receives modulated signal 207 from mapping unit 206. Weighting unit 3511 also receives control signal 3503_0. Control signal 3503_0 includes weighting method setting. Weighting unit 3511 performs weighting on modulated signal 207 according to the weighting method setting included in control signal 3503_0, to generate weighted signal 3512. Weighting unit 3511 outputs weighted signal 3512.

(5) Wireless Unit 210 and Antenna 212

Wireless unit 210 receives weighted signal 3512 from weighting unit 3511. Wireless unit 210 also receives control signal 213 from the controller included in AP 3420-1. Control signal 213 includes designation of frequency conversion, amplification, etc. Wireless unit 210 performs processes such as frequency conversion and amplification on weighted signal 3512, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 3410.

Although antennas 212 and 215 are described separately for convenience's sake, they may be the same entity.

(7) Indicator 3502

Indicator 3502 is connected to parent station 3410.

Indicator 3502 receives control signal 3501 from parent station 3410. Control signal 3501 includes unicast transmission-related setting or multicast transmission-related setting, and weighting method setting.

Separate control signal 3501 may be set for each AP, or same control signal 3501 may be set for all APs.

Indicator 3502 performs multicast transmission setting or unicast transmission setting for all APs including AP 3420-1, using control signals 3503_0, 3503_1, . . . , 3503_N.

Here, indicator 3502 may perform multicast transmission setting for all APs, or perform unicast transmission setting for all APs. Indicator 3502 may perform multicast transmission setting for part of the APs, and unicast transmission setting for the other APs. Thus, multicast transmission setting and unicast transmission setting may be mixed for the APs.

For a plurality of APs set for multicast transmission, the modulated signal before weighting is the same signal. In other words, the same data is transmitted.

Indicator 3502 also indicates a weighting method to each AP, using control signals 3503_0, 3503_1, . . . , 3503_N.

For a plurality of APs set for unicast transmission, the modulated signal before weighting may be the same signal or a different signal. In other words, the same data may be transmitted, or different data may be transmitted.

Thus, indicator 3502 generates control signals 3503_0, 3503_1, . . . , 3503_N for the respective APs, from received control signal 3501. Each control signal includes multicast transmission-related setting or unicast transmission-related setting, and weighting method setting. Indicator 3502 outputs control signals 3503_0, 3503_1, . . . , 3503_N to itself and APs 3420-2, 3420-3, and 3420-4.

In the case of designating unicast transmission for AP 3420-1, indicator 3502 operates reception device 217. In the case of designating multicast transmission for AP 3420-1, indicator 3502 may stop the operation of reception device 217.

5.3 Non-Master AP 3600

APs 3420-2, 3420-3, and 3420-4 are each a non-master AP. APs 3420-2, 3420-3, and 3420-4 are described below, as AP 3600 collectively.

Figure 36:
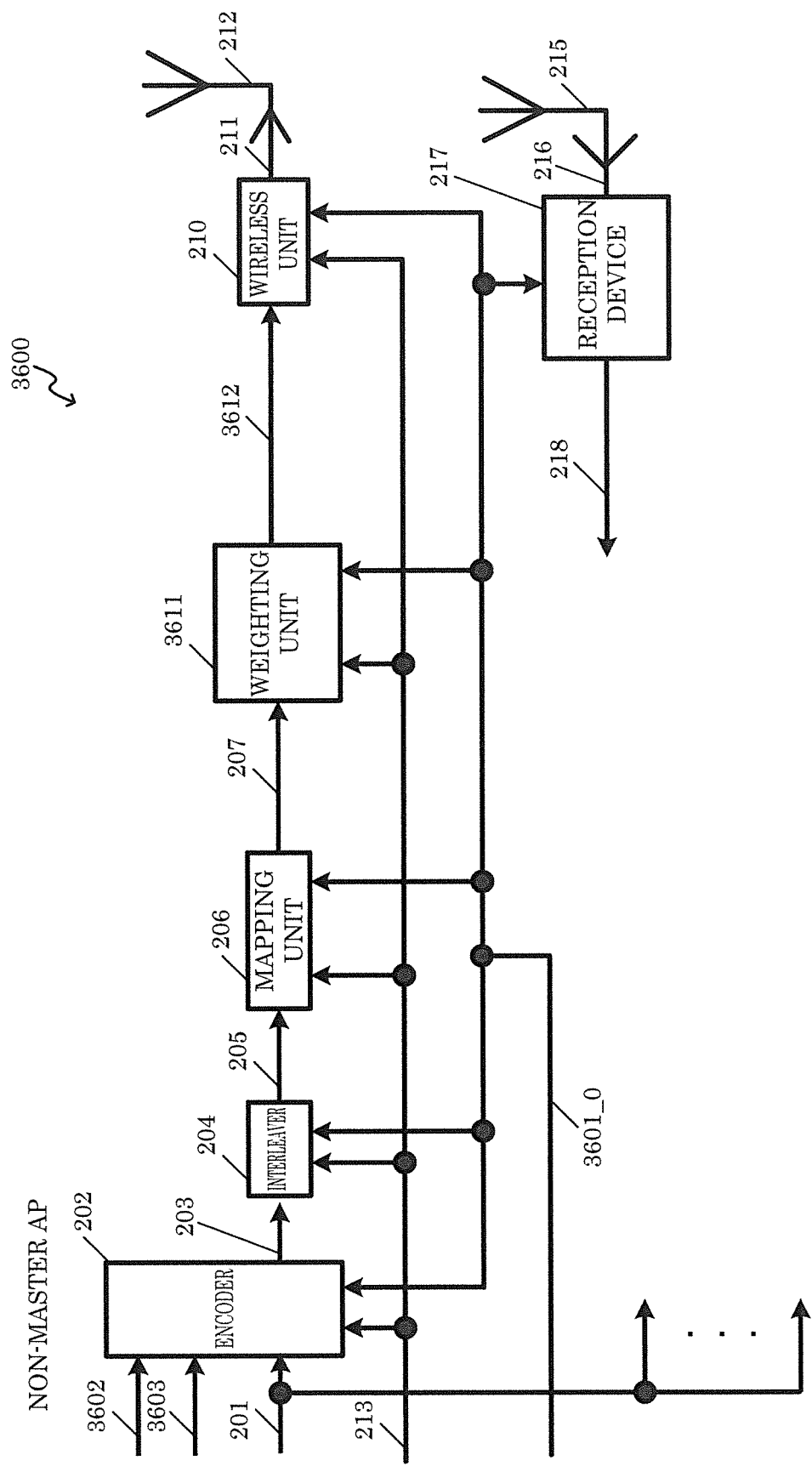
FIG. 36 is a block diagram illustrating the structure of AP 3600 which is not a master AP.

Non-master AP 3600 includes encoder 202, interleaver 204, mapping unit 206, weighting unit 3611, wireless unit 210, antenna 212, antenna 215, and reception device 217, as illustrated in FIG. 36.

AP 3600 receives control signal 3601_0 from master AP 3420-1. Control signal 3601_0 includes unicast transmission-related setting or multicast transmission-related setting, and weighting method setting. AP 3600 also receives data 3602 from master AP 3420-1. In the case of performing AP cooperation, AP 3600 may receive data 3603 from another non-master AP. In the case of operating singly in unicast transmission, AP 3600 may receive data 201 from parent station 3410.

AP 3600 performs unicast transmission-related setting or multicast transmission-related setting, based on control signal 3601_0. AP 3600 also performs weighting method setting, based on control signal 3601_0. In the case where multicast transmission is set, the AP is set to use the same frequency (frequency band) as other APs.

In the case where unicast transmission is set, AP 3600 operates reception device 217. In the case where multicast transmission is set, AP 3600 may stop the operation of reception device 217.

AP 3600 performs wireless transmission/reception using the same channel (or the same frequency (frequency band)) in the case of unicast transmission and in the case of multicast transmission. Here, AP 3600 may divide one wireless carrier into several time slots, and use each time slot as a communication channel. Alternatively AP 3600 may use each of a plurality of different frequencies in the frequency bandwidth of 60 GHz, as a communication channel.

(1) Encoder 202

Encoder 202 receives data 3602, 3603, or 201. Encoder 202 also receives control signal 213 from a controller included in AP 3600. Control signal 213 includes information such as encoding scheme designation, error correction scheme designation, encoding rate, and block length. Encoder 202 performs error correction encoding, such as convolution encoding, LDPC encoding, or turbo encoding, on data 3602, 3603, or 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 3600. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 3600. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a weighting process.

(4) Weighting Unit 3611

Weighting unit 3611 receives modulated signal 207 from mapping unit 206. Weighting unit 3611 also receives control signal 3601_0. Control signal 3601_0 includes weighting method setting. Weighting unit 3611 performs weighting on modulated signal 207 according to the weighting method setting included in control signal 3601_0, to generate weighted signal 3612. Weighting unit 3611 outputs weighted signal 3612.

(5) Wireless Unit 210 and Antenna 212

Wireless unit 210 receives weighted signal 3612 from weighting unit 3611. Wireless unit 210 also receives control signal 213 from the controller included in AP 3600. Control signal 213 includes designation of frequency conversion, amplification, etc. Wireless unit 210 performs processes such as frequency conversion and amplification on weighted signal 3612, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 3410.

Although antennas 212 and 215 are described separately for convenience's sake, they may be the same entity.

5.4 Parent Station 3410

Figure 37:
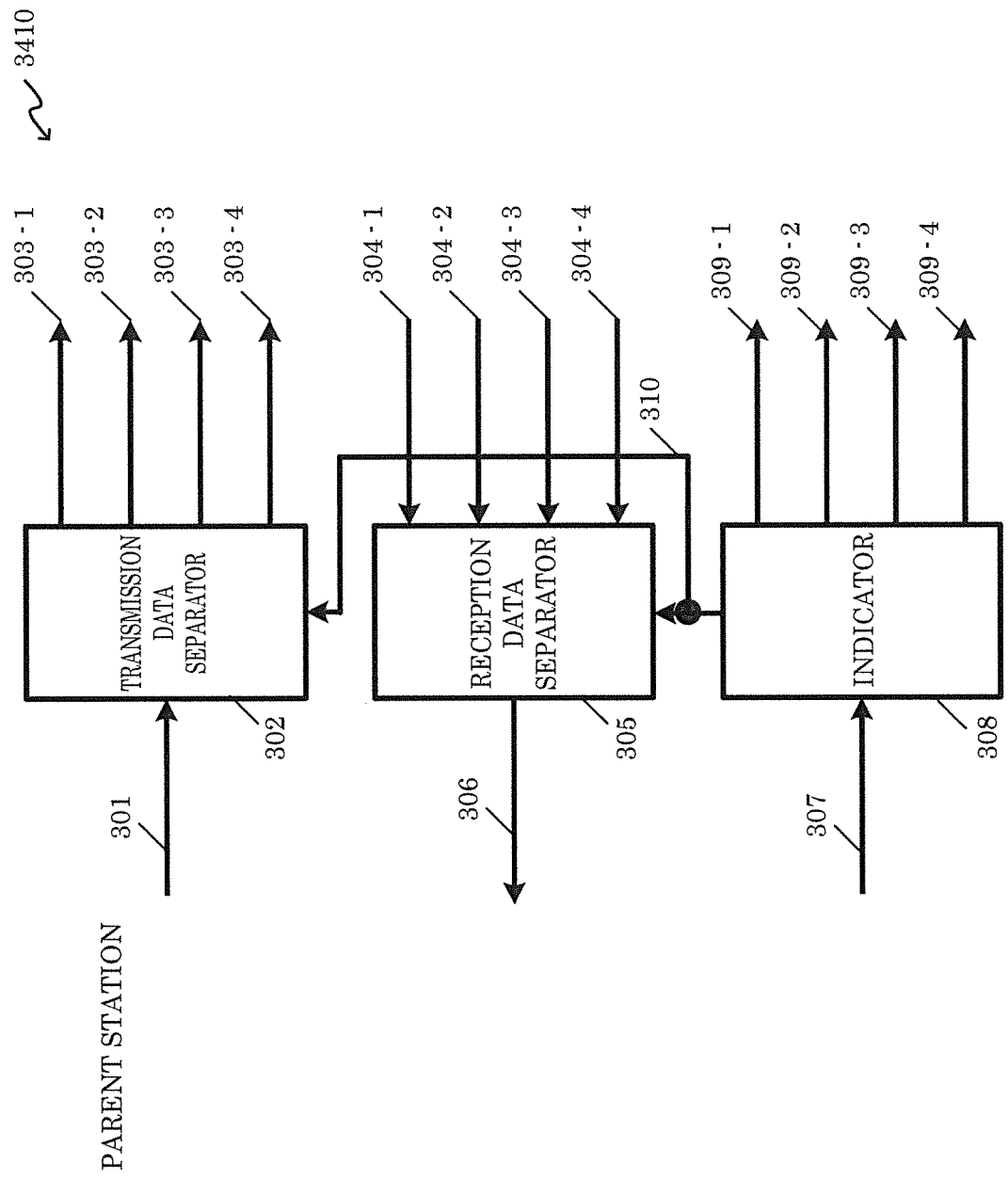
FIG. 37 is a block diagram illustrating the structure of parent station 3410.

Parent station 3410 includes transmission data separator 302, reception data separator 305, and indicator 308, as illustrated in FIG. 37.

(1) Indicator 308

Indicator 308 is connected to the communication device and APs 3420-1, 3420-2, 3420-3, and 3420-4.

Indicator 308 receives control signal 307. Control signal 307 includes unicast transmission-related setting or multicast transmission-related setting, and weighting method setting. For example, the communication device includes a PC, and the user of the PC inputs the control signal through the PC.

Separate control signal 307 may be set for each AP, or same control signal 307 may be set for all APs.

Multicast transmission may be set for all APs, or unicast transmission may be set for all APs. Multicast transmission may be set for part of the APs, and unicast transmission for the other APs. Thus, multicast transmission-related setting and unicast-related setting may be mixed for the APs.

For a plurality of APs set for multicast, the modulated signal before weighting is the same signal. In other words, the same data is transmitted.

Indicator 308 also indicates a weighting method to each AP.

For a plurality of APs set for unicast, the modulated signal before weighting may be the same signal or a different signal. In other words, the same data may be transmitted, or different data may be transmitted.

Indicator 308 outputs the received control signal to transmission data separator 302, reception data separator 305, and APs 3420-1, 3420-2, 3420-3, and 3420-4.

(2) Transmission Data Separator 302

Transmission data separator 302 is connected to the communication device, indicator 308, and APs 3420-1, 3420-2, 3420-3, and 3420-4.

Transmission data separator 302 receives a control signal from indicator 308. Transmission data separator 302 outputs the received control signal to APs 3420-1, 3420-2, 3420-3, and 3420-4.

Transmission data separator 302 also receives data from the communication device. Transmission data separator 302 separates the received data into data for AP 3420-1, data for AP 3420-2, data for AP 3420-3, and data for AP 3420-4. Transmission data separator 302 outputs the separated data to each of APs 3420-1, 3420-2, 3420-3, and 3420-4.

(3) Reception Data Separator 305

Reception data separator 305 is connected to the communication device, indicator 308, and APs 3420-1, 3420-2, 3420-3, and 3420-4.

Reception data separator 305 receives respective data from APs 3420-1, 3420-2, 3420-3, and 3420-4. Reception data separator 305 outputs the received data to the communication device.

5.5 Example of Transmitted Data

An example of data transmitted by parent station 3410 and APs 3420-1, 3420-2, 3420-3, and 3420-4 is described below.

(1) In the Case of Setting all APs for Multicast Transmission to Transmit Data

An example of transmitted data in the case of setting all APs 3420-1, 3420-2, 3420-3, and 3420-4 for multicast transmission to transmit data is described below, with reference to FIGS. 38 and 39.

Figure 38:
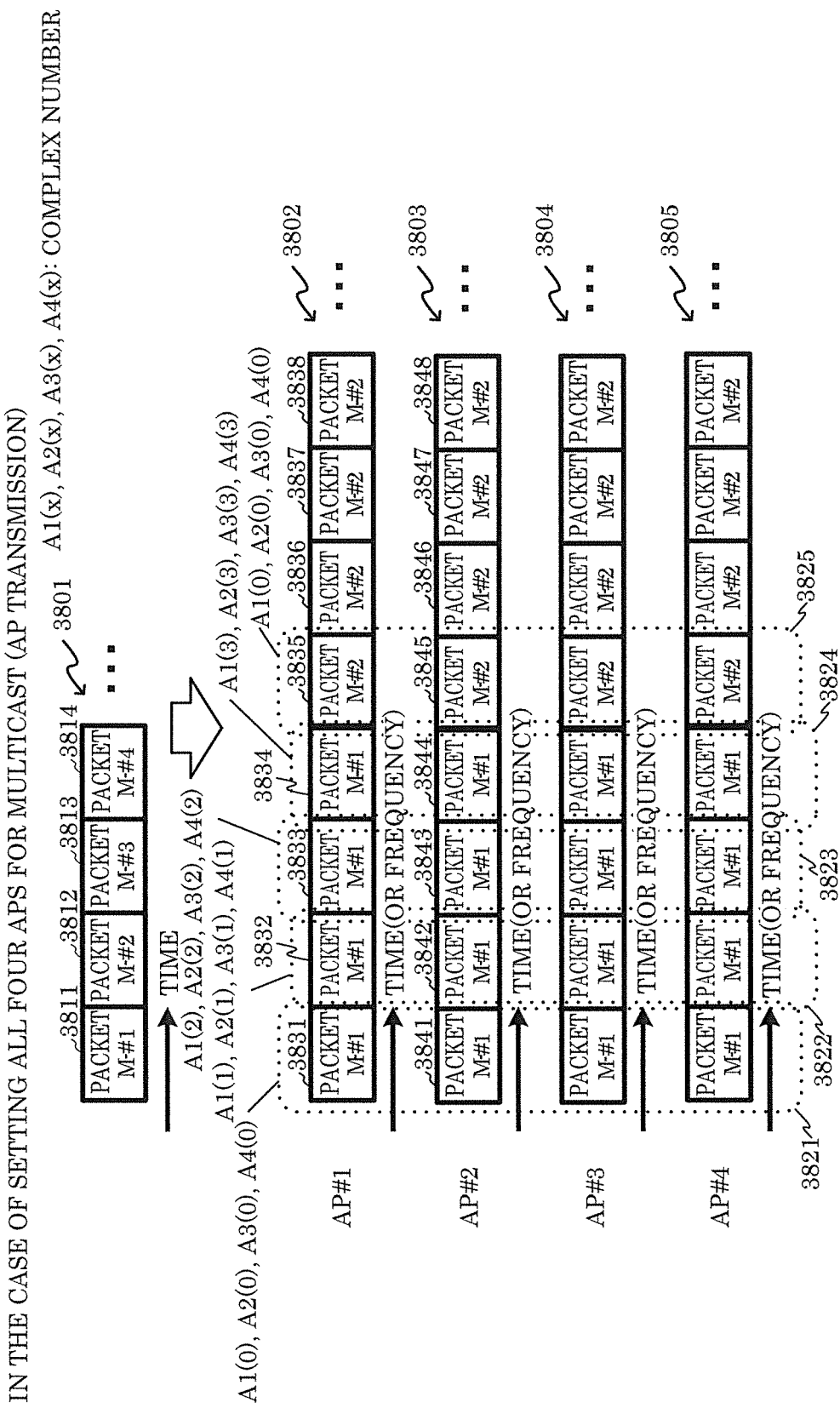
FIG. 38 is a diagram illustrating an example of transmitted data in the case of setting all APs 3420-1, 3420-2, 3420-3, and 3420-4 for multicast to perform transmission

Parent station 3410 receives packets 3811, 3812, 3813, 3814, . . . in this order, as illustrated in FIG. 38. Packets 3811, 3812, 3813, 3814, . . . are all multicast packets. Packets 3811, 3812, 3813, 3814, . . . are generated from one set of multicast data. Parent station 3410 transmits packets 3811, 3812, 3813, 3814, . . . in this order, to AP 3420-1.

AP 3420-1 receives packets 3811, 3812, 3813, 3814, . . . in this order. AP 3420-1 then transmits packets 3811, 3812, 3813, 3814, . . . in this order, to APs 3420-2, 3420-3, and 3420-4.

(a) Process 1 of Each AP

As illustrated in FIGS. 34 and 38, AP 3420-1 prepares A1(0), A1(1), A1(2), A1(3), . . . as weights. Likewise, AP 3420-2 prepares A2(0), A2(1), A2(2), A2(3), . . . as weights. AP 3420-3 prepares A3(0), A3(1), A3(2), A3(3), . . . as weights. AP 3420-4 prepares A4(0), A4(1), A4(2), A4(3), . . . as weights.

(b) Process 2 of Each AP

Another example of the process of each AP is described below, with reference to FIG. 39.

(Process of AP 3420-1)

Figure 39:
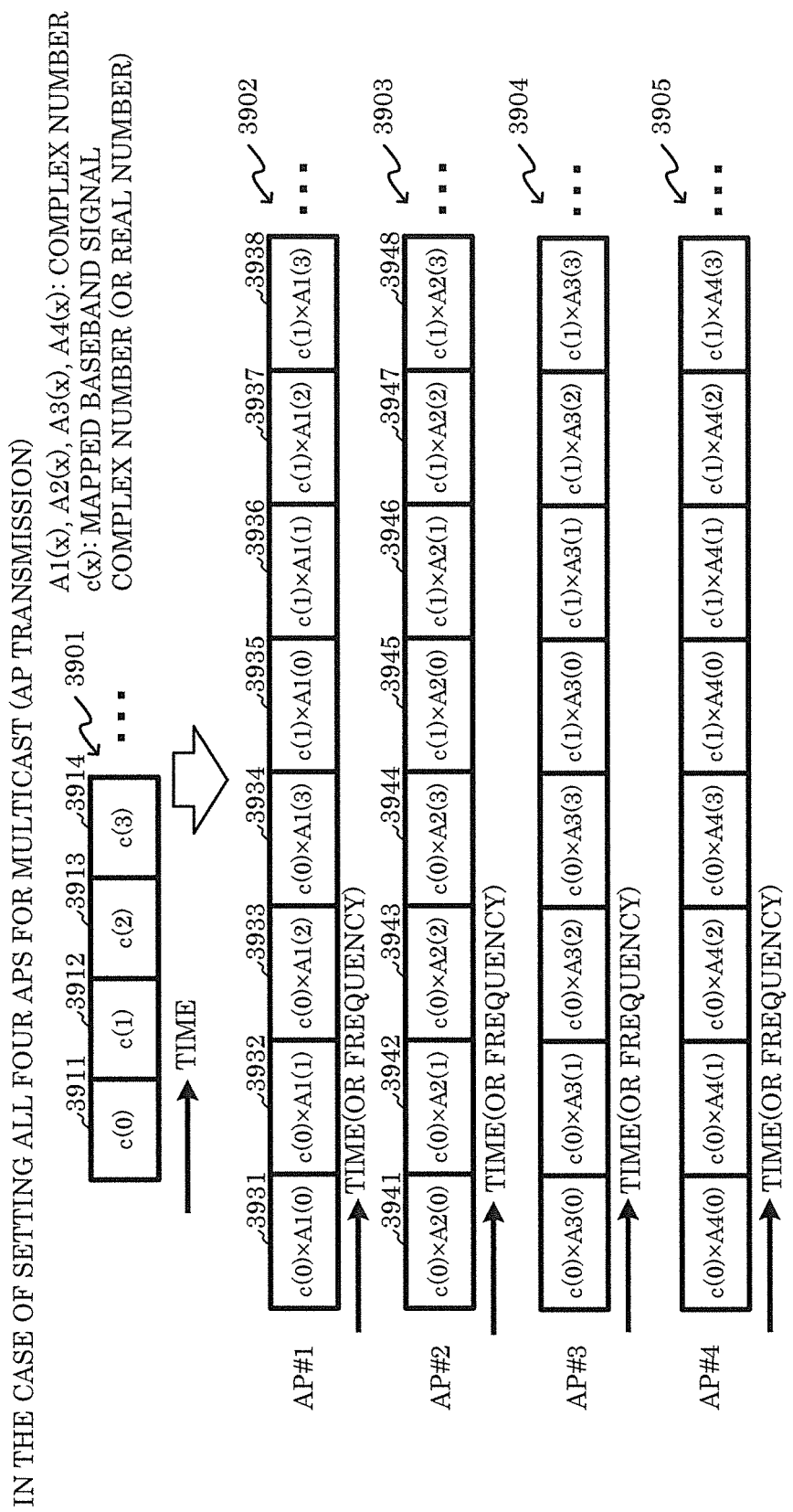
FIG. 39 is a diagram illustrating another example of transmitted data in the case of setting all APs 3420-1, 3420-2, 3420-3, and 3420-4 for multicast to perform transmission

Mapping unit 206 in AP 3420-1 generates mapped baseband signal complex numbers 3911 "c(0)", 3912 "c(1)", 3913 "c(2)", 3914 "c(3)", . . . , as illustrated in FIG. 39.

c(0) is a mapped baseband signal related to packet 3811, c(1) is a mapped baseband signal related to packet 3812, c(2) is a mapped baseband signal related to packet 3813, c(3) is a mapped baseband signal related to packet 3814, . . . .

After mapped baseband signal complex number 3911 "c(0)" is generated, weighting unit 3511 in AP 3420-1 calculates c(0)×A1(0) (3931), c(0)×A1(1) (3932), c(0)×A1(2) (3933), and c(0)×A1(3) (3934), using complex numbers A1(0), A1(1), A1(2), and A1(3).

AP 3420-1 wirelessly outputs c(0)×A1(0) (3931), c(0)×A1(1) (3932), c(0)×A1(2) (3933), and c(0)×A1(3) (3934).

After mapped baseband signal complex number 3912 "c(1)" is generated, weighting unit 3511 in AP 3420-1 calculates c(1)×A1(0) (3935), c(1)×A1(1) (3936), c(1)×A1(2) (3937), and c(1)×A1(3) (3938), using complex numbers A1(0), A1(1), A1(2), and A1(3).

AP 3420-1 wirelessly outputs c(1)×A1(0) (3935), c(1)×A1(1) (3936), c(1)×A1(2) (3937), and c(1)×A1(3) (3938).

In the case where mapped baseband signal complex numbers 3913 "c(2)", 3914 "c(3)", . . . are generated, AP 3420-1 operates in the same way as above.

(Process of AP 3420-2)

Mapping unit 206 in AP 3420-2 generates mapped baseband signal complex numbers 3911 "c(0)", 3912 "c(1)", 3913 "c(2)", 3914 "c(3)", . . . , as illustrated in FIG. 39.

c(0) is a mapped baseband signal related to packet 3811, c(1) is a mapped baseband signal related to packet 3812, c(2) is a mapped baseband signal related to packet 3813, c(3) is a mapped baseband signal related to packet 3814, . . . .

After mapped baseband signal complex number 3911 "c(0)" is generated, weighting unit 3611 in AP 3420-2 calculates c(0)×A2(0) (3941), c(0)×A2(1) (3942), c(0)×A2(2) (3943), and c(0)×A2(3) (3944), using complex numbers A2(0), A2(1), A2(2), and A2(3).

AP 3420-2 wirelessly outputs c(0)×A2(0) (3941), c(0)×A2(1) (3942), c(0)×A2(2) (3943), and c(0)×A2(3) (3944).

After mapped baseband signal complex number 3912 "c(1)" is generated, weighting unit 3611 in AP 3420-2 calculates c(1)×A2(0) (3945), c(1)×A2(1) (3946), c(1)×A2(2) (3947), and c(1)×A2(3) (3948), using complex numbers A2(0), A2(1), A2(2), and A2(3).

AP 3420-2 wirelessly outputs c(1)×A2(0) (3945), c(1)×A2(1) (3946), c(1)×A2(2) (3947), and c(1)×A2(3) (3948).

In the case where mapped baseband signal complex numbers 3913 "c(2)", 3914 "c(3)", . . . are generated, AP 3420-2 operates in the same way as above.

(Process of APs 3420-3 and 3420-4)

APs 3420-3 and 3420-4 operate in the same way as above.

Here, weighting unit 3611 in AP 3420-3 performs weighting using complex numbers A3(0), A3(1), A3(2), and A3(3).

Moreover, weighting unit 3611 in AP 3420-4 performs weighting using complex numbers A4(0), A4(1), A4(2), and A4(3).

Thus, features lie in that each packet is subjected to different weighting and transmitted a plurality of times, and that each packet is transmitted a plurality of times from a plurality of APs.

Transmission using a plurality of APs has the advantageous effect of widening the cell area. In addition, transmitting each packet a plurality of times with different weighting has the advantageous effect of maintaining more uniform reception quality in the cell area because the packet is transmitted a plurality of times with different directivity.

For example, weighting coefficients A1($i$), A2($i$), A3($i$), and A4($i$) have the following properties.

Suppose a modulated signal of packet A is transmitted N times (N is an integer greater than or equal to 2). Let A1($u$) be a weighting coefficient used to transmit the u-th modulated signal of packet A, and A1($v$) be a weighting coefficient used to transmit the v-th modulated signal of packet A. u and v are each an integer greater than or equal to 1 and less than or equal to N, where u≠v. For all u and v that are each an integer greater than or equal to 1 and less than or equal to N where u≠v, A1($u$)≠A1($v$) holds.

Equally suppose a modulated signal of packet A is transmitted N times (N is an integer greater than or equal to 2). Let Ak(u) be a weighting coefficient used to transmit the u-th modulated signal of packet A. and Ak(v) be a weighting coefficient used to transmit the v-th modulated signal of packet A. u and v are each an integer greater than or equal to 1 and less than or equal to N, where u≠v. For all u and v that are each an integer greater than or equal to 1 and less than or equal to N where u≠v, Ak(u)≠Ak(v) holds (k is an integer greater than or equal to 1).

Weighting coefficient Ak(i) may have a cycle. When the cycle is denoted by M (M is an integer greater than or equal to 2), the following holds.

[Math. 9]

$$Ak(i)=Ak(i \bmod M) \quad \text{Expression (9).}$$

i mod M is the remainder after division of i by M.

(2) In the Case of Setting APs 3420-1 and 3420-2 for Multicast Transmission and APs 3420-3 and 3420-4 for Unicast Transmission to Transmit Data An example of transmitted data in the case of setting APs 3420-1 and 3420-2 for multicast transmission and APs 3420-3 and 3420-4 for unicast transmission to transmit data is described below, with reference to FIGS. 40 and 41. In this case, APs 3420-3 and 3420-4 transmit the same data (the modulated signal after mapping is the same).

Figure 40:
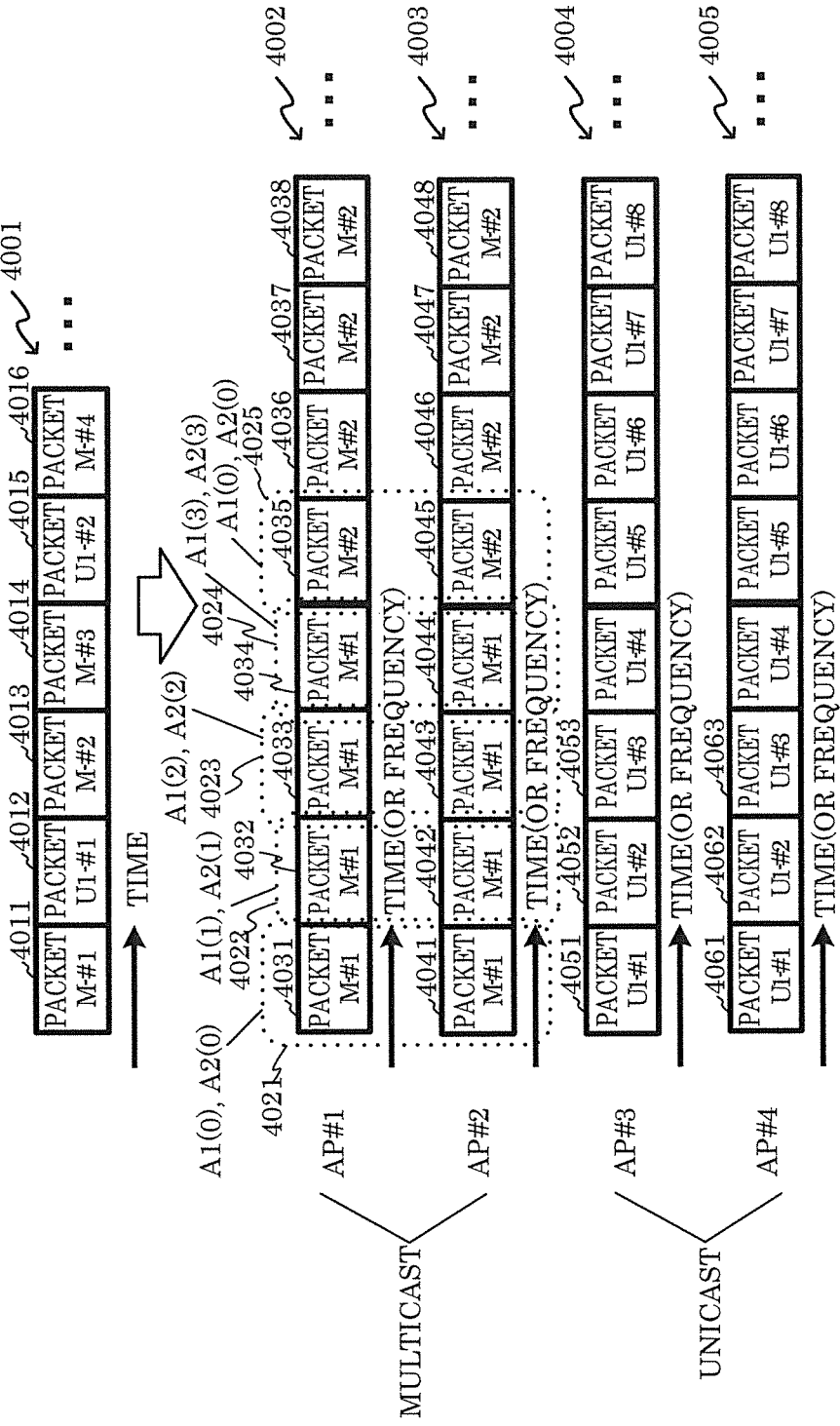
FIG. 40 is a diagram illustrating an example of transmitted data in the case of setting APs 3420-1 and 3420-2 for multicast and APs 3420-3 and 3420-4 for unicast to perform transmission

Parent station 3410 receives packets 4011, 4012, 4013, 4014, . . . in this order, as illustrated in FIG. 40. Packets 4011, 4013, 4014, 4016, . . . are multicast packets. Packets 4011, 4013, 4014, 4016, . . . are generated from one set of multicast data. Packets 4012, 4015, . . . are unicast packets. Packets 4012, 4015, . . . are generated from one set of unicast data.

Parent station 3410 outputs multicast packets 4011, 4013, 4014, 4016, . . . in this order, to AP 3420-1. Parent station 3410 also outputs unicast packets 4012, 4015, . . . in this order, to each of APs 3420-3 and 3420-4.

AP 3420-1 receives multicast packets 4011, 4013, 4014, 4016, . . . in this order. AP 3420-1 transmits multicast packets 4011, 4013, 4014, 4016, . . . in this order, to AP 3420-2.

(a) Process 1 of Each AP

As illustrated in FIGS. 34 and 40, AP 3420-1 prepares A1(0), A1(1), A1(2), A1(3), . . . as weights. Likewise, AP 3420-2 prepares A2(0), A2(1), A2(2), A2(3), . . . as weights.

(b) Process 2 of Each AP

Another example of the process of each AP is described below, with reference to FIG. 41.

(Process of AP 3420-1)

Figure 41:
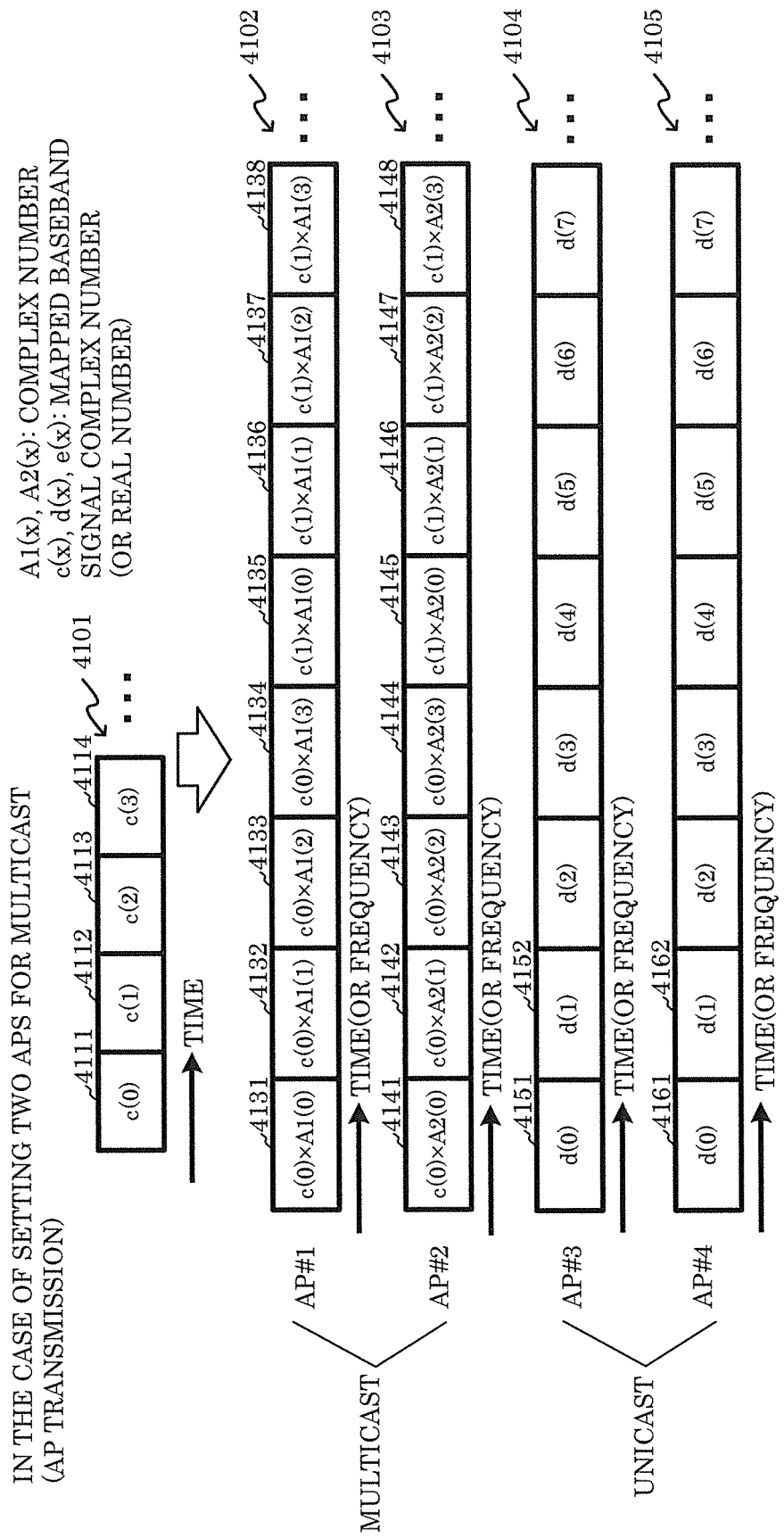
FIG. 41 is a diagram illustrating another example of transmitted data in the case of setting APs 3420-1 and 3420-2 for multicast and APs 3420-3 and 3420-4 for unicast to perform transmission

Mapping unit 206 in AP 3420-1 generates mapped baseband signal complex numbers 4111 "c(0)", 4112 "c(1)", 4113 "c(2)", 4114 "c(3)", . . . , as illustrated in FIG. 41.

c(0) is a mapped baseband signal related to packet 4011, c(1) is a mapped baseband signal related to packet 4013, c(2) is a mapped baseband signal related to packet 4014, c(3) is a mapped baseband signal related to packet 4016, . . . .

After mapped baseband signal complex number 4111 "c(0)" is generated, weighting unit 3511 in AP 3420-1 calculates c(0)×A1(0) (4131), c(0)×A1(1) (4132), c(0)×A1(2) (4133), and c(0)×A1(3) (4134), using complex numbers A1(0), A1(1), A1(2), and A1(3).

AP 3420-1 wirelessly outputs c(0)×A1(0) (4131), c(0)×A1(1) (4132), c(0)×A1(2) (4133), and c(0)×A1(3) (4134).

After mapped baseband signal complex number 4112 "c(1)" is generated, weighting unit 3511 in AP 3420-1 calculates c(1)×A1(0) (4135), c(1)×A1(1) (4136), c(1)×A1(2) (4137), and c(1)×A1(3) (4138), using complex numbers A1(0), A1(1). A1(2), and A1(3).

AP 3420-1 wirelessly outputs c(1)×A1(0) (4135), c(1)×A1(1) (4136), c(1)×A1(2) (4137), and c(1)×A1(3) (4138).

In the case where mapped baseband signal complex numbers 4113 "c(2)", 4114 "c(3)", . . . are generated, AP 3420-1 operates in the same way as above.

(Process of AP 3420-2)

Mapping unit 206 in AP 3420-2 generates mapped baseband signal complex numbers 4111 "c(0)", 4112 "c(1)", 4113 "c(2)", 4114 "c(3)", . . . , as illustrated in FIG. 41.

c(0) is a mapped baseband signal related to packet 4011, c(1) is a mapped baseband signal related to packet 4013, c(2) is a mapped baseband signal related to packet 4014, c(3) is a mapped baseband signal related to packet 4016, . . . .

After mapped baseband signal complex number 4111 "c(0)" is generated, weighting unit 3611 in AP 3420-2 calculates c(0)×A2(0) (4141), c(0)×A2(1) (4142), c(0)×A2(2) (4143), and c(0)×A2(3) (4144), using complex numbers A2(0), A2(1), A2(2), and A2(3).

AP 3420-2 wirelessly outputs c(0)×A2(0) (4141), c(0)×A2(1) (4142), c(0)×A2(2) (4143), and c(0)×A2(3) (4144).

After mapped baseband signal complex number 4112 "c(1)" is generated, weighting unit 3611 in AP 3420-2 calculates c(1)×A2(0) (4145), c(1)×A2(1) (4146), c(1)×A2(2) (4147), and c(1)×A2(3) (4148), using complex numbers A2(0), A2(1), A2(2), and A2(3).

AP 3420-2 wirelessly outputs c(1)×A2(0) (4145), c(1)×A2(1) (4146), c(1)×A2(2) (4147), and c(1)×A2(3) (4148).

In the case where mapped baseband signal complex numbers 4113 "c(2)", 4114 "c(3)", . . . are generated, AP 3420-2 operates in the same way as above.

(Process of AP 3420-3)

Mapping unit 206 in AP 3420-3 generates mapped baseband signal complex numbers "d(0)", "d(1)", "d(2)", "d(3)", . . . .

d(0) is a mapped baseband signal related to packet 4051, d(1) is a mapped baseband signal related to packet 4052, d(2) is a mapped baseband signal related to packet 4053, . . . .

After mapped baseband signal complex number "d(0)" is generated, AP 3420-3 wirelessly outputs generated d(0) (4151).

After mapped baseband signal complex number "d(1)" is generated, AP 3420-3 wirelessly outputs generated d(1) (4152).

Likewise, AP 3420-3 generates mapped baseband signal complex numbers "d(2)", "d(3)", . . . , and wirelessly outputs generated "d(2)", "d(3)", . . . .

(Process of AP 3420-4)

Mapping unit 206 in AP 3420-4 generates mapped baseband signal complex numbers "d(0)", "d(1)", "d(2)", "d(3)", . . . .

d(0) is a mapped baseband signal related to packet 4061, d(1) is a mapped baseband signal related to packet 4062, d(2) is a mapped baseband signal related to packet 4063, . . . .

After mapped baseband signal complex number "d(0)" is generated, AP 3420-4 wirelessly outputs generated d(0) (4161).

After mapped baseband signal complex number "d(1)" is generated, AP 3420-4 wirelessly outputs generated d(1) (4162).

Likewise, AP 3420-4 generates mapped baseband signal complex numbers "d(2)", "d(3)", . . . , and wirelessly outputs generated "d(2)", "d(3)", . . . .

Thus, features lie in that each multicast packet is subjected to different weighting and transmitted a plurality of times, and that each multicast packet is transmitted a plurality of times from a plurality of APs.

Transmission using a plurality of APs has the advantageous effect of widening the cell area. In addition, transmitting each multicast packet a plurality of times with different weighting has the advantageous effect of maintaining more uniform reception quality in the cell area because the packet is transmitted a plurality of times with different directivity.

In APs 3420-3 and 3420-4, phase change may be performed or weighting may be changed with respect to time or frequency. This has the advantageous effect of improving unicast packet reception quality.

(3) in the Case of Setting APs 3420-1 and 3420-2 for Multicast Transmission and APs 3420-3 and 3420-4 for Unicast Transmission to Transmit Data An example of transmitted data in the case of setting APs 3420-1 and 3420-2 for multicast transmission and APs 3420-3 and 3420-4 for unicast transmission to transmit data is described below, with reference to FIGS. 42 and 43. In this case, APs 3420-3 and 3420-4 transmit different data.

Figure 42:
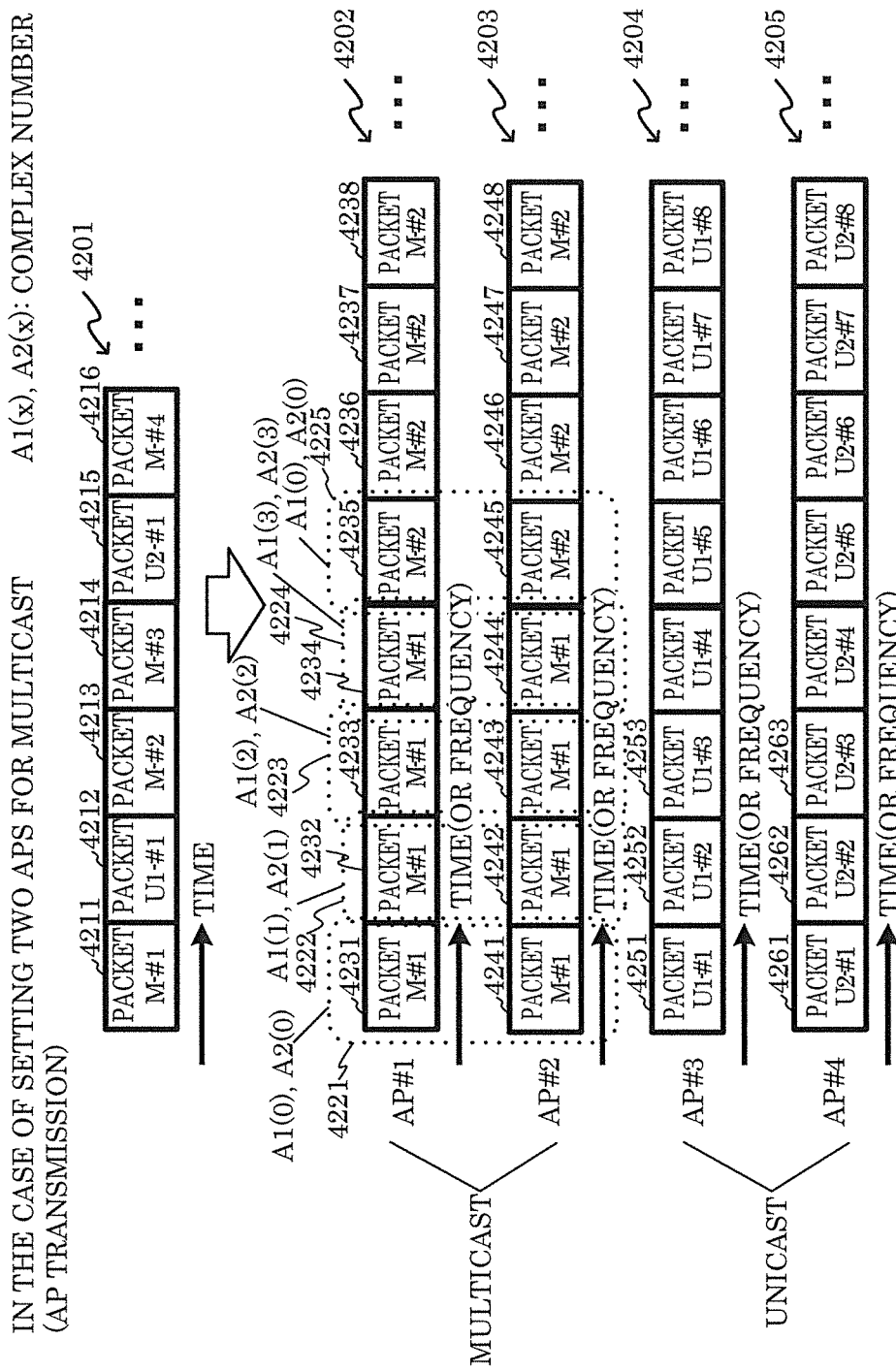
FIG. 42 is a diagram illustrating an example of transmitted data in the case of setting APs 3420-1 and 3420-2 for multicast and APs 3420-3 and 3420-4 for unicast to perform transmission

Parent station 3410 receives packets 4211, 4212, 4213, 4214, 4215, 4216, . . . in this order, as illustrated in FIG. 42. Packets 4211, 4213, 4214, 4216, . . . are multicast packets. Packets 4211, 4213, 4214, 4216, . . . are generated from one set of multicast data. Packets 4212, . . . are first unicast packets. Packets 4212, . . . are generated from first unicast data. Packets 4215, . . . are second unicast packets. Packets 4215, . . . are generated from second unicast data.

Parent station 3410 outputs multicast packets 4211, 4213, 4214, 4216, . . . in this order, to AP 3420-1. Parent station 3410 also outputs unicast packets 4212, . . . in this order, to AP 3420-3. Parent station 3410 also outputs unicast packets 4215, . . . in this order, to AP 3420-4.

AP 3420-1 receives multicast packets 4211, 4213, 4214, 4216, . . . in this order. AP 3420-1 then transmits multicast packets 4211, 4213, 4214, 4216, . . . in this order, to AP 3420-2.

(a) Process 1 of Each AP

As illustrated in FIGS. 34 and 42, AP 3420-1 prepares A1(0), A1(1), A1(2), A1(3), . . . as weights. Likewise, AP 3420-2 prepares A2(0), A2(1), A2(2), A2(3), . . . as weights.

(b) Process 2 of Each AP

Another example of the process of each AP is described below, with reference to FIG. 43.

(Process of AP 3420-1)

Figure 43:
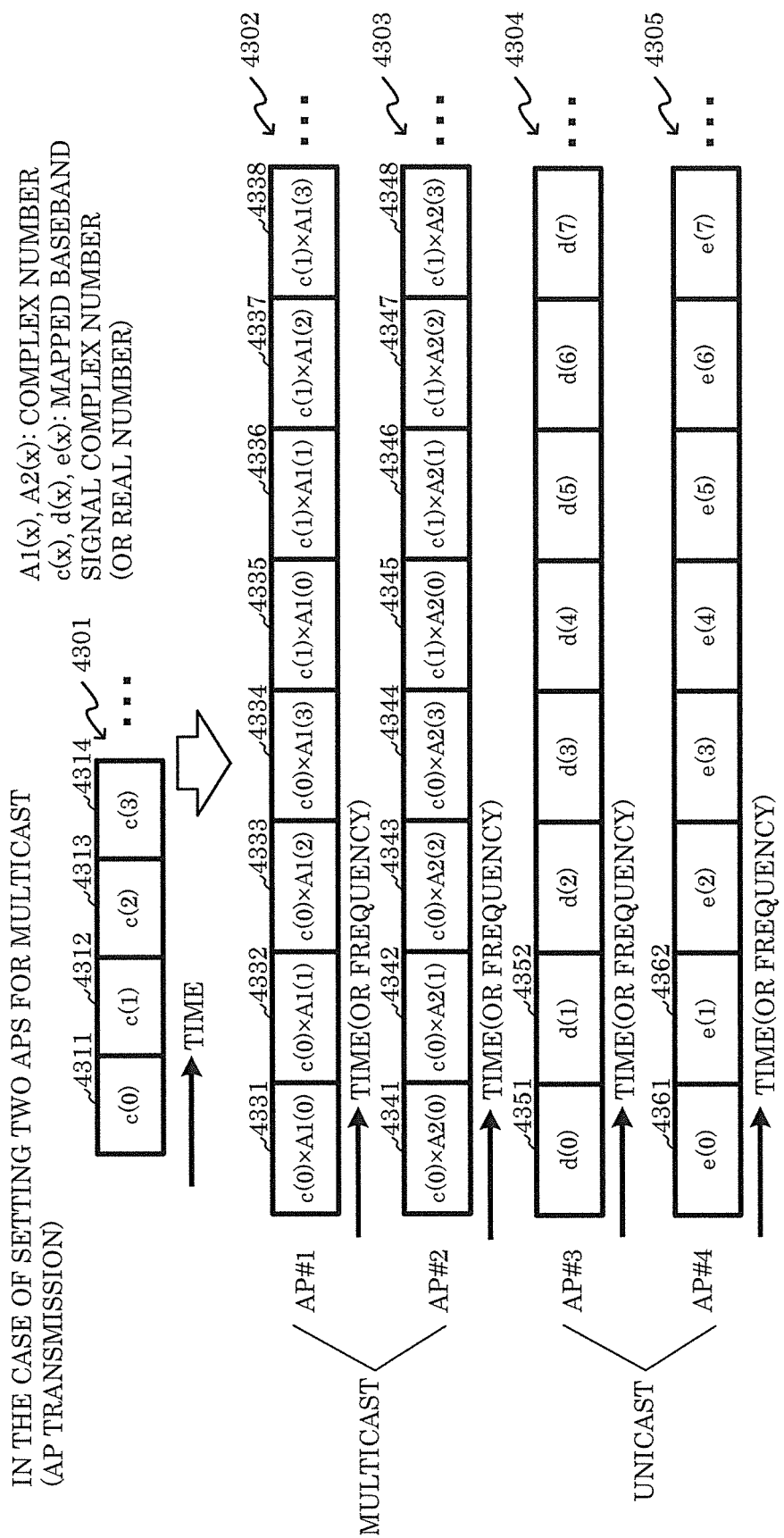
FIG. 43 is a diagram illustrating another example of transmitted data in the case of setting APs 3420-1 and 3420-2 for multicast and APs 3420-3 and 3420-4 for unicast to perform transmission

Mapping unit 206 in AP 3420-1 generates mapped baseband signal complex numbers 4311 "c(0)", 4312 "c(1)", 4313 "c(2)", 4314 "c(3)", . . . , as illustrated in FIG. 43.

c(0) is a mapped baseband signal related to packet 4211, c(1) is a mapped baseband signal related to packet 4213, c(2) is a mapped baseband signal related to packet 4214, c(3) is a mapped baseband signal related to packet 4216, . . . .

After mapped baseband signal complex number 4311 "c(0)" is generated, weighting unit 3511 in AP 3420-1 calculates c(0)×A1(0) (4331), c(0)×A1(1) (4332), c(0)×A1(2) (4333), and c(0)×A1(3) (4334), using complex numbers A1(0), A1(1). A1(2), and A1(3).

AP 3420-1 wirelessly outputs c(0)×A1(0) (4331), c(0)×A1(1) (4332), c(0)×A1(2) (4333), and c(0)×A1(3) (4334).

After mapped baseband signal complex number 4312 "c(1)" is generated, weighting unit 3511 in AP 3420-1 calculates c(1)×A1(0) (4335), c(1)×A1(1) (4336), c(1)×A1(2) (4337), and c(1)×A1(3) (4338), using complex numbers A1(0), A1(1), A1(2), and A1(3).

AP 3420-1 wirelessly outputs c(1)×A1(0) (4335), c(1)×A1(1) (4336), c(1)×A1(2) (4337), and c(1)×A1(3) (4338).

In the case where mapped baseband signal complex numbers 4313 "c(2)", 4314 "c(3)", . . . are generated, AP 3420-1 operates in the same way as above.

(Process of AP 3420-2)

Mapping unit 206 in AP 3420-2 generates mapped baseband signal complex numbers 4311 "c(0)", 4312 "c(1)", 4313 "c(2)", 4314 "c(3)", . . . , as illustrated in FIG. 43.

c(0) is a mapped baseband signal related to packet 4211, c(1) is a mapped baseband signal related to packet 4213, c(2) is a mapped baseband signal related to packet 4214, c(3) is a mapped baseband signal related to packet 4216, . . . .

After mapped baseband signal complex number 4311 "c(0)" is generated, weighting unit 3611 in AP 3420-2 calculates c(0)×A2(0) (4341), c(0)×A2(1) (4342), c(0)×A2(2) (4343), and c(0)×A2(3) (4344), using complex numbers A2(0), A2(1), A2(2), and A2(3).

AP 3420-2 wirelessly outputs c(0)×A2(0) (4341), c(0)×A2(1) (4342), c(0)×A2(2) (4343), and c(0)×A2(3) (4344).

After mapped baseband signal complex number 4312 "c(1)" is generated, weighting unit 3611 in AP 3420-2 calculates c(1)×A2(0) (4345), c(1)×A2(1) (4346), c(1)×A2(2) (4347), and c(1)×A2(3) (4348), using complex numbers A2(0), A2(1), A2(2), and A2(3).

AP 3420-2 wirelessly outputs c(1)×A2(0) (4345), c(1)×A2(1) (4346), c(1)×A2(2) (4347), and c(1)×A2(3) (4348).

In the case where mapped baseband signal complex numbers 4313 "c(2)", 4314 "c(3)", . . . are generated, AP 3420-2 operates in the same way as above.

(Process of AP 3420-3)

Mapping unit 206 in AP 3420-3 generates mapped baseband signal complex numbers "d(0)", "d(1)", "d(2)", "d(3)", . . . .

d(0) is a mapped baseband signal related to packet 4251, d(1) is a mapped baseband signal related to packet 4252, d(2) is a mapped baseband signal related to packet 4253, . . . .

After mapped baseband signal complex number "d(0)" is generated, AP 3420-3 wirelessly outputs generated d(0) (4351).

After mapped baseband signal complex number "d(1)" is generated, AP 3420-3 wirelessly outputs generated d(1) (4352).

Likewise, AP 3420-3 generates mapped baseband signal complex numbers "d(2)", "d(3)", . . . , and wirelessly outputs generated "d(2)", "d(3)", . . . .

(Process of AP 3420-4)

Mapping unit 206 in AP 3420-4 generates mapped baseband signal complex numbers "e(0)", "e(1)", "e(2)", "e(3)", . . . .

e(0) is a mapped baseband signal related to packet 4261, e(1) is a mapped baseband signal related to packet 4262, e(2) is a mapped baseband signal related to packet 4263, . . . .

After mapped baseband signal complex number "e(0)" is generated, AP 3420-4 wirelessly outputs generated e(0) (4361).

After mapped baseband signal complex number "e(1)" is generated, AP 3420-4 wirelessly outputs generated e(1) (4362).

Likewise, AP 3420-4 generates mapped baseband signal complex numbers "e(2)", "e(3)", . . . , and wirelessly outputs generated "e(2)", "e(3)", . . . .

Thus, features lie in that each multicast packet is subjected to different weighting and transmitted a plurality of times, and that each multicast packet is transmitted a plurality of times from a plurality of APs.

Transmission using a plurality of APs has the advantageous effect of widening the cell area. In addition, transmitting each multicast packet a plurality of times with different weighting has the advantageous effect of maintaining more uniform reception quality in the cell area because the packet is transmitted a plurality of times with different directivity.

Moreover, a flexible system in which APs 3420-3 and 3420-4 transmit unicast packets is realized.

There is thus the advantage of realizing a flexible system by, for example, switching the transmission state among the transmission state in FIG. 38, the transmission state in FIG. 40, and the transmission state in FIG. 42 depending on time (e.g. switching depending on the terminal presence situation).

5.6 Conclusion

According to this embodiment, large-capacity transmission of Gbps level can be achieved. Moreover, the number of terminals accommodated in the case of implementing multicast can be increased. Furthermore, unicast communication can be realized simultaneously with multicast. A flexible system can thus be provided.

6. Embodiment 5

Wireless communication system 4400 according to Embodiment 5 as another embodiment of the present disclosure is described below.

6.1 Wireless Communication System 4400

Figure 44:
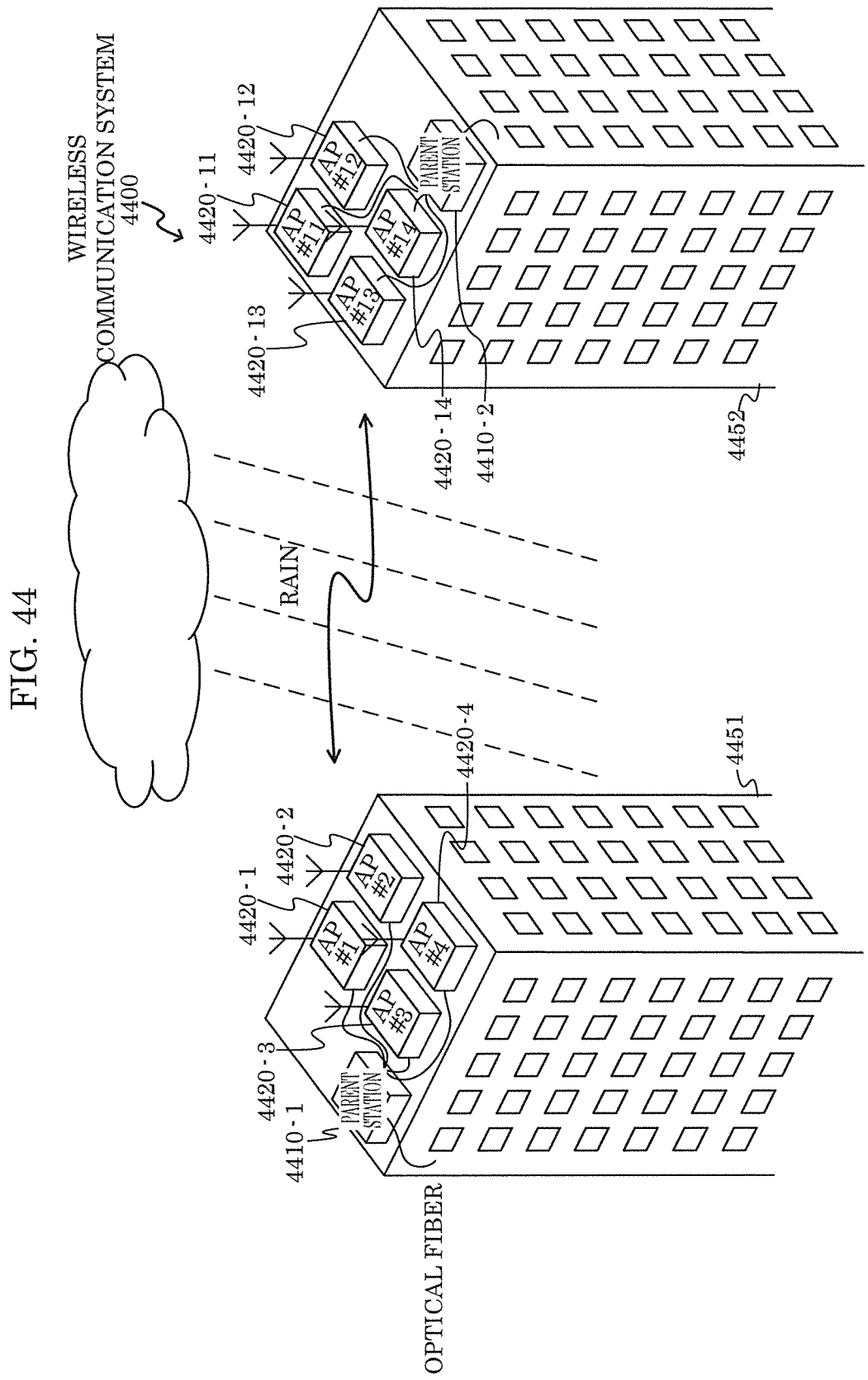
FIG. 44 is a block diagram illustrating the structure of wireless communication system 4400 according to Embodiment 5.

Wireless communication system 4400 includes parent station 4410-1, APs 4420-1, 4420-2, 4420-3, and 4420-4, parent station 4410-2, and APs 4420-11, 4420-12, 4420-13, and 4420-14, as illustrated in FIG. 44.

For example, APs 4420-1, 4420-2, 4420-3, and 4420-4 are installed on the roof of building 4451, and parent station 4410-1 is installed inside building 4451. Moreover, APs 4420-11, 4420-12, 4420-13, and 4420-14 are installed on the roof of building 4452, and parent station 4410-2 is installed inside building 4452. Their installation is, however, not limited to such.

Consider a use case where there is no obstacle such as another building between APs 4420-1, 4420-2, 4420-3, and 4420-4 and APs 4420-11, 4420-12, 4420-13, and 4420-14 (although such a use case is not a limitation).

In wireless communication system 4400, APs 4420-1, 4420-2, 4420-3, and 4420-4 and APs 4420-11, 4420-12, 4420-13, and 4420-14 perform wireless communication between buildings 4451 and 4452.

Parent station 4410-1 is connected to a communication device (communication device A) (not illustrated) holding data transmitted by APs, either directly or indirectly via a communication line. Communication device A is, for example, a mobile phone, a smartphone, a tablet, or a personal computer. Communication device A may be, for example, a broadcast device for broadcasting data or a distribution system or a server for transmitting data. Communication device A transmits a control signal for controlling the parent station and the APs, and "data to be transmitted by AP". The control signal may include unicast setting. Communication device A may include a plurality of communication devices. In this case, a first communication device may transmit the control signal, and a second communication device may transmit the data. Communication device A may be used inside building 4451. Communication device A may be used outside buildings 4451 and 4452. Parent station 4410-1 is wiredly (or wirelessly) connected to APs 4420-1, 4420-2, 4420-3, and 4420-4, and APs 4420-1, 4420-2, 4420-3, and 4420-4 transmit data obtained from communication device A.

The control signal includes information of a setting parameter when each AP performs unicast transmission, and a parameter of a phase change method when each AP performs phase change.

AP 4420-1 is called "master AP". APs 4420-2, 4420-3, and 4420-4 are called "non-master AP".

Parent station 4410-2 is connected to another communication device (communication device B), either directly or indirectly via a communication line. Communication device B is, for example, a mobile phone, a smartphone, a tablet, or a personal computer. Communication device A may be installed in a building or the like or installed outdoors, as mentioned above. Communication device B may be used inside building 4452. Communication device B may be used outside buildings 4451 and 4452. Parent station 4410-2 is wiredly (or wirelessly) connected to APs 4420-11, 4420-12, 4420-13, and 4420-14, and APs 4420-11, 4420-12, 4420-13, and 4420-14 transmit data obtained from communication device B.

AP 4420-11 is a master AP, and APs 4420-12, 4420-13, and 4420-14 are non-master APs.

6.2 AP 4420-1 as Master AP

Figure 45:
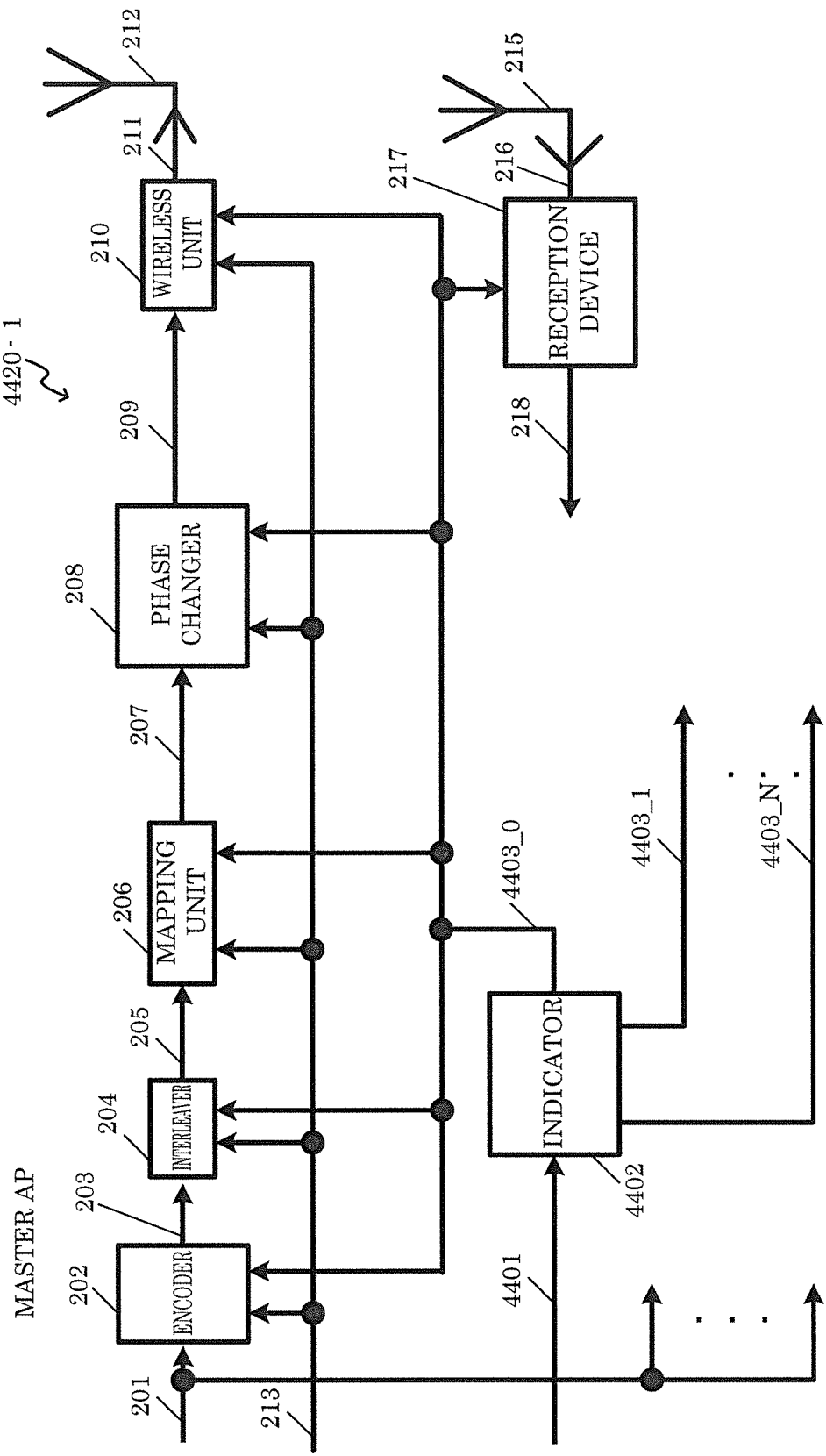
FIG. 45 is a block diagram illustrating the structure of AP 4420-1 which is a master AP.

AP 4420-1 as a master AP includes encoder 202, interleaver 204, mapping unit 206, phase changer 208, wireless unit 210, antenna 212, antenna 215, reception device 217, and indicator 4402, as illustrated in FIG. 45.

AP 4420-11 is also a master AP, and so has the same structure as master AP 4420-1.

AP 4420-1 receives control signal 4401 from parent station 4410-1. Control signal 4401 includes unicast transmission setting for each AP, and phase change parameter setting when performing phase change.

AP 4420-1 performs unicast transmission-related setting, based on control signal 4401 received from parent station 4410-1. AP 4420-1 also performs phase change method parameter setting, based on control signal 4401.

In the case of performing unicast transmission, AP 4420-1 operates reception device 217.
(1) Encoder 202

Encoder 202 receives data 201 from parent station 4410-1. Encoder 202 also receives control signal 213 from a controller included in AP 4420-1. Control signal 213 includes information such as encoding scheme designation, error correction scheme designation, encoding rate, and block length. Encoder 202 performs error correction encoding, such as convolution encoding, LDPC encoding, or turbo encoding, on data 201, using the schemes designated by control signal 213. Encoder 202 outputs encoded data 203.
(2) Interleaver 204

Interleaver 204 receives encoded data 203 from encoder 202. Interleaver 204 also receives control signal 213 from the controller included in AP 4420-1. Control signal 213 includes interleave method designation. Interleaver 204 performs interleaving, i.e. rearrangement, on encoded data 203, using the method designated by control signal 213. Interleaver 204 outputs interleaved data 205.
(3) Mapping Unit 206

Mapping unit 206 receives interleaved data 205 from interleaver 204. Mapping unit 206 also receives control signal 213 from the controller included in AP 4420-1.

Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a phase change process.

(4) Phase Changer 208

Phase changer 208 receives modulated signal 207 from mapping unit 206. Phase changer 208 also receives control signal 4403_0. Control signal 4403_0 includes phase change method setting. Phase changer 208 performs phase change on modulated signal 207 according to the phase change method setting included in control signal 4403_0, to generate phase-changed signal 209. Phase changer 208 outputs phase-changed signal 209.

(5) Wireless Unit 210 and Antenna 212

Wireless unit 210 receives phase-changed signal 209 from phase changer 208. Wireless unit 210 also receives control signal 213 from the controller included in AP 4420-1. Control signal 213 includes designation of frequency conversion, amplification, etc. Wireless unit 210 performs processes such as frequency conversion and amplification on phase-changed signal 209, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 4410-1.

Although antennas 212 and 215 are described separately for convenience's sake, they may be the same entity.

(7) Indicator 4402

Indicator 4402 is connected to parent station 4410-1.

Indicator 1902 receives control signal 4401 from parent station 4410-1. Control signal 4401 includes information of unicast-related setting and phase change method setting.

Indicator 4402 provides unicast transmission-related setting information to all APs including AP 4420-1, based on control signal 4401.

Indicator 4402 also indicates a phase change method to each AP.

Indicator 4402 generates control signals 4403_0, 4403_1, . . . , 4403_N for the respective APs, from received control signal 4401. Each control signal includes unicast transmission-related information and phase change-related information. Indicator 4402 outputs control signals 4403_0, 4403_1, . . . , 4403_N to itself and APs 4420-2, 4420-3, and 4420-4.

In the case of performing unicast transmission for AP 4420-1, indicator 4402 operates reception device 217.

6.3 Non-Master AP 4600

APs 4420-2, 4420-3, and 4420-4 are each a non-master AP. APs 4420-12, 4420-13, and 4420-14 are also each a non-master AP.

Operation of APs 4420-2, 4420-3, and 4420-4 is described below, as AP 4600 collectively.

Figure 46:
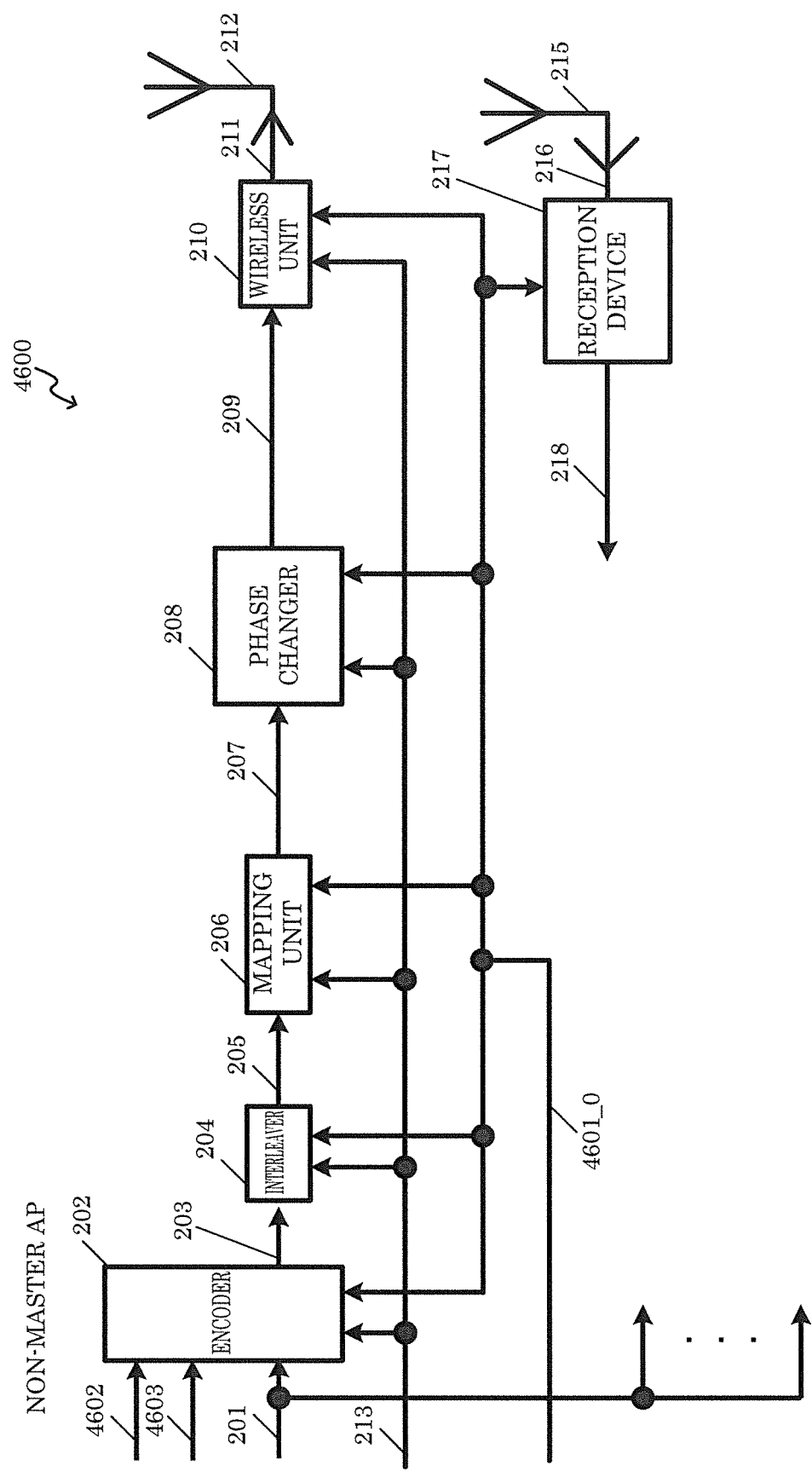
FIG. 46 is a block diagram illustrating the structure of AP 4600 which is not a master AP.

Non-master AP 4600 includes encoder 202, interleaver 204, mapping unit 206, phase changer 208, wireless unit 210, antenna 212, antenna 215, and reception device 217, as illustrated in FIG. 46.

AP 4600 receives control signal 4601_0 from AP 4420-1 which is a master AP. Control signal 4601_0 includes unicast transmission-related information and phase change-related information. AP 4600 also receives data 4602 (not performing AP cooperation) from AP 4420-1 which is a master AP. In the case of performing AP cooperation, AP 4600 may receive data 4603 from another AP. AP 4600 may receive data 201 from parent station 4410-1, and pass the data to another AP.

AP 4600 performs unicast transmission-related setting, based on control signal 4601_0. AP 4600 also performs phase change method setting, based on control signal 4601_0.

In the case of performing unicast setting, AP 4600 operates reception device 217.

(1) Encoder 202

Encoder 202 receives data 4602, 4603, or 201 from parent station 4410_1. Encoder 202 also receives control signal 213 from a controller included in AP 4600. Control signal 213 includes information such as encoding scheme designation, error correction scheme designation, encoding rate, and block length. Encoder 202 performs error correction encoding, such as convolution encoding, LDPC encoding, or turbo encoding, on data 4602, 4603, or 201, using the schemes designated by control signal 213. Encoder 202 outputs encoded data 203.

(2) Interleaver 204

Interleaver 204 receives encoded data 203 from encoder 202. Interleaver 204 also receives control signal 213 from the controller included in AP 4600. Control signal 213 includes interleave method designation. Interleaver 204 performs interleaving, i.e. rearrangement, on encoded data 203, using the method designated by control signal 213. Interleaver 204 outputs interleaved data 205.

(3) Mapping Unit 206

Mapping unit 206 receives interleaved data 205 from interleaver 204. Mapping unit 206 also receives control signal 213 from the controller included in AP 4600. Control signal 213 includes modulation scheme designation. Mapping unit 206 performs modulation, such as quadrature phase shift keying (QPSK), 16 quadrature amplitude modulation (16QAM), or 64 quadrature amplitude modulation (64QAM), on interleaved data 205 according to the modulation scheme designation included in control signal 213, to generate modulated signal 207. Mapping unit 206 outputs modulated signal 207. Other modulation schemes may be used.

Mapping unit 206 may perform mapping including a phase change process.

(4) Phase Changer 208

Phase changer 208 receives modulated signal 207 from mapping unit 206. Phase changer 208 also receives control signal 4601_0. Control signal 4601_0 includes phase change method setting. Phase changer 208 performs phase change on modulated signal 207 according to the phase change method setting included in control signal 4601_0, to generate phase-changed signal 209. Phase changer 208 outputs phase-changed signal 209.

(5) Wireless Unit 210 and Antenna 212

Wireless unit 210 receives phase-changed signal 209 from phase changer 208. Wireless unit 210 also receives control signal 213 from the controller included in AP 4600. Control signal 213 includes designation of frequency conversion, amplification, etc. Wireless unit 210 performs processes such as frequency conversion and amplification on phase-changed signal 209, to generate transmission signal 211. Wireless unit 210 outputs generated transmission signal 211 to antenna 212, using a frequency bandwidth of 6 GHz or more such as millimeter wave, e.g. a frequency bandwidth of 60 GHz.

Antenna 212 outputs transmission signal 211 as a radio wave.

(6) Antenna 215 and Reception Device 217

Antenna 215 receives signal 216 output from each terminal as a radio wave.

Reception device 217 receives signal 216 from antenna 215 using a frequency bandwidth of 6 GHz or more such as millimeter wave, e.g. a frequency bandwidth of 60 GHz, and performs processes such as amplification and frequency conversion on signal 216, to generate data 218. Reception device 217 outputs data 218 to parent station 4410-1 or 4410-2.

Although antennas 212 and 215 are described separately for convenience's sake, they may be the same entity.

6.4 Example of Transmitted Data

An example of data transmitted by parent station 4410-1 and APs 4420-1, 4420-2, 4420-3, and 4420-4 is described below.

It is assumed here that all APs are set for unicast to perform transmission.

(1) During Clear Weather

An example of transmitted data in the case of setting all APs 4420-1, 4420-2, 4420-3, and 4420-4 for unicast to transmit data during clear weather is described below, with reference to FIG. 47.

(Transmitting Side)

Parent station 4410-1 receives packets 4701, 4702, 4703, . . . , 4706, . . . (packets from the communication device) in this order, as illustrated in FIG. 47. Packets 4701, 4702, 4703, . . . , 4706, . . . are all unicast packets. Packets 4701, 4705, . . . are generated from first unicast data. Packets 4702, 4706, . . . are generated from second unicast data. Packets 4703, . . . are generated from third unicast data. Packets 4704, . . . are generated from fourth unicast data.

Parent station 4410-1 transmits packets 4701, 4702, 4703, . . . , 4706, . . . in this order, to AP 4420-1. AP 4420-1 receives packets 4701, 4702, 4703, . . . , 4706, . . . in this order.

AP 4420-1 processes, by itself, packets 4701, 4705, . . . generated from the first unicast data in this order. AP 4420-1 also transmits packets 4702, 4706, . . . generated from the second unicast data in this order, to AP 4420-2. AP 4420-1 also transmits packets 4703, . . . generated from the third unicast data in this order, to AP 4420-3. AP 4420-1 also transmits packets 4704, . . . generated from the fourth unicast data in this order, to AP 4420-4.

AP 4420-1 receives packets 4701, 4705, . . . for itself in this order. Upon receiving packets 4701, 4705, . . . in this order, AP 4420-1 wirelessly outputs packets 4711, 4712, 4713, 4714, . . . in this order, in unicast. Packets 4701, 4705, . . . respectively correspond to packets 4711, 4712, 4713, 4714.

Upon receiving packets 4702, 4706, . . . in this order, AP 4420-2 wirelessly outputs packets 4721, 4722, 4723, 4724, . . . in this order, in unicast. Packets 4702, 4706, . . . respectively correspond to packets 4721, 4722, 4723, 4724.

Upon receiving packets 4703, . . . in this order, AP 4420-3 wirelessly outputs packets 4731, 4732, 4733, 4734, . . . in this order, in unicast. Packets 4703, . . . respectively correspond to packets 4731, 4732, 4733, 4734.

Upon receiving packets 4704, . . . in this order, AP 4420-4 wirelessly outputs packets 4741, 4742, 4743, 4744, . . . in this order, in unicast. Packets 4704, . . . respectively correspond to packets 4741, 4742, 4743, 4744.

(Receiving Side)

For example, suppose APs 4420-1, 4420-2, 4420-3, 4420-4, 4420-11, 4420-12, 4420-13, and 4420-14 in FIG. 44 include antennas that perform beam forming and the like and have strong directivity. In this case, suppose APs 4420-1 and 4420-11 communicate with each other. APs 4420-2 and 4420-12 communicate with each other. APs 4420-3 and 4420-13 communicate with each other, and APs 4420-4 and 4420-14 communicate with each other.

Here, reception device 217 in AP 4420-11 receives packets transmitted from AP 4420-1. Reception device 217 in AP 4420-12 receives packets transmitted from AP 4420-2. Reception device 217 in AP 4420-13 receives packets transmitted from AP 4420-3. Reception device 217 in AP 4420-14 receives packets transmitted from AP 4420-4.

In the case where APs 4420-11, 4420-12, 4420-13, and 4420-14 simultaneously receive a modulated signal transmitted from AP 4420-1, a modulated signal transmitted from AP 4420-2, a modulated signal transmitted from AP 4420-3, and a modulated signal transmitted from AP 4420-4, the signal received by AP 4420-11, the signal received by AP 4420-12, the signal received by AP 4420-13, and the signal received by AP 4420-14 are subjected to a separation process to separate and obtain the packets.

Figure 48:
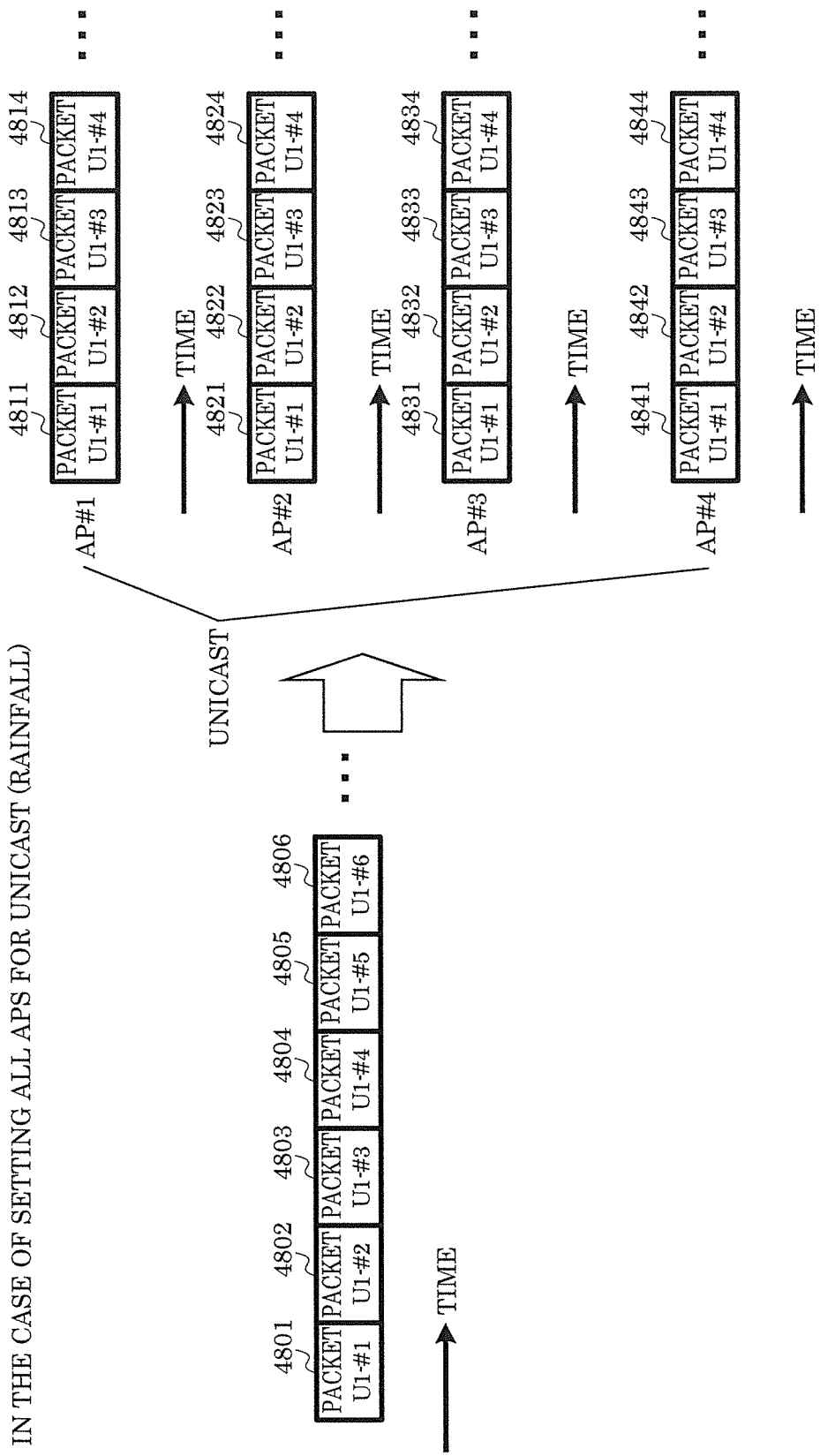
FIG. 48 is a diagram illustrating an example of transmitted data in the case of setting all APs 4420-1, 4420-2, 4420-3, and 4420-4 for unicast during rainfall.

As another example, suppose parent station 4410-1 obtains only packet U1-# X (X=1, 2, 3, . . . ). In such a case, for example, AP 4420-1 transmits packet U1-# X while the other APs stop operation. This reduces the number of APs in operation, and so has the advantageous effect of reducing power consumption in the system. During rainfall, transmission is performed as illustrated in FIG. 48 (the operation in FIG. 48 will be described in detail later). The advantages of this are as follows.

Particularly in the case of transmitting a modulated signal using a frequency in the millimeter wave band, rainfall causes significant attenuation of the signal (radio wave). To maintain a decrease in reception field intensity of the communication partner in a state where such attenuation occurs, the communication device needs to transmit the modulated signal with high average transmission power. However, a regulation value is often imposed on the average transmission power that can be transmitted by each communication equipment. Hence, the communication device may be unable to transmit the modulated signal with transmission power increased to such a level of average transmission power that can reduce the influence of rainfall attenuation.

In view of this, by transmitting modulated signals including the same data from a plurality of communication equipment as illustrated in FIG. 48, the advantageous effect that the communication partner has high reception field intensity while each communication device conforms to the regulation value on the average transmission power can be achieved.

Moreover, by performing such operation that "AP 4420-1 transmits packet U1-# X while the other APs stop operation" during clear weather as mentioned above, the advantageous effect of reducing power consumption in the system during clear weather can be achieved.

Thus, with different operations of the parent stations and APs between clear weather and rainfall, an advantageous system that can flexibly ensure communication quality and control power consumption can be realized.

(2) During Rainfall

An example of transmitted data in the case of setting all APs 4420-1, 4420-2, 4420-3, and 4420-4 for unicast to transmit data during rainfall is described below, with reference to FIG. 48.

(Transmitting Side)

Parent station 4410-1 receives packets 4801, 4802, 4803, ..., 4806, ... in this order, as illustrated in FIG. 48. Packets 4801, 4802, 4803, ..., 4806, ... are all unicast packets. Packets 4801, 4802, 4803, ..., 4806, ... are generated from one set of unicast data.

Parent station 4410-1 transmits packets 4801, 4802, 4803, ..., 4806, ... in this order, to AP 4420-1.

AP 4420-1 receives packets 4801, 4802, 4803, ..., 4806, ... in this order, and processes packets 4801, 4802, 4803, ..., 4806, ... in this order. AP 4420-1 transmits packets 4801, 4802, 4803, ..., 4806, ... in this order, to each of APs 4420-2, 4420-3, and 4420-4.

AP 4420-1 receives packets 4801, 4802, 4803, ..., 4806, ... in this order. Upon receiving packets 4801, 4802, 4803, ..., 4806, ... in this order, AP 4420-1 wirelessly outputs packets 4811, 4812, 4813, 4814, ... in this order, in unicast. Packets 4801, 4802, 4803, ..., 4806, ... respectively correspond to packets 4811, 4812, 4813, 4814.

AP 4420-2 receives packets 4801, 4802, 4803 ..., 4806, ... in this order. Upon receiving packets 4801, 4802, 4803, ..., 4806 ... in this order, AP 4420-2 wirelessly outputs packets 4821, 4822, 4823, 4824, ... in this order in unicast, under control of AP 4420-1 which is a master AP. Packets 4801, 4802, 4803, ..., 4806, ... respectively correspond to packets 4821, 4822, 4823, 4824.

AP 4420-3 receives packets 4801, 4802, 4803, ..., 4806, ... in this order. Upon receiving packets 4801, 4802, 4803, ..., 4806, ... in this order, AP 4420-3 wirelessly outputs packets 4831, 4832, 4833, 4834, ... in this order in unicast, under control of AP 4420-1 which is a master AP. Packets 4801, 4802, 4803, ..., 4806, ... respectively correspond to packets 4831, 4832, 4833, 4834.

AP 4420-4 receives packets 4801, 4802, 4803, ..., 4806, ... in this order. Upon receiving packets 4801, 4802, 4803, ..., 4806, ... in this order, AP 4420-4 wirelessly outputs packets 4841, 4842, 4843, 4844, ... in this order in unicast, under control of AP 4420-1 which is a master AP. Packets 4801, 4802, 4803, ..., 4806, ... respectively correspond to packets 4841, 4842, 4843, 4844.

A feature lies in that APs 4420-1, 4420-2, 4420-3, and 4420-4 transmit the same packets at the same time (the modulated signals after mapping at the same time are the same), as described in the other embodiments. Therefore, AP 4420-1 performs phase change, AP 4420-2 performs phase change, AP 4420-3 performs phase change, and also AP 4420-4 performs phase change (alternatively, any of APs 4420-1, 4420-2, 4420-3, and 4420-4 may perform no phase change).

Although FIG. 48 illustrates an example where four APs are present and transmit packet U1-# X (X=1, 2, 3, ... ), this is not a limitation. For example, N APs (N is an integer greater than or equal to 2) may be present, where M APs (M is an integer less than or equal to N, and greater than or equal to 2) transmit packet U1-# X (X=1, 2, 3, ... ).

The following structure can be derived from the above.

N APs (N is an integer greater than or equal to 2) are present. During clear weather (when radio wave attenuation due to rainfall is low (a situation where it is raining but radio wave attenuation is low is regarded as "during clear weather")), LAPs (L is an integer greater than or equal to 1, and less than or equal to N−1) transmit packet U1-# X (X=1, 2, 3, ... ).

During rainfall (when radio wave attenuation due to rainfall is high), M APs (M is an integer less than or equal to N, greater than or equal to 2, and greater than L) may transmit packet U1-# X (X=1, 2, 3, ... ).

By such transmission, a decrease in reception quality of the communication partner caused by propagation attenuation during rainfall can be suppressed, so that an advantageous system that can flexibly ensure communication quality and control power consumption can be realized. During clear weather, any AP not transmitting packet U1-# X may transmit other packets (or not transmit other packets). Likewise, during rainfall, any AP not transmitting packet U1-# X may transmit other packets (or not transmit other packets).

(Receiving Side)

Reception device 217 in AP 4420-11 simultaneously receives a modulated signal corresponding to packet 4811, a modulated signal corresponding to packet 4821, a modulated signal corresponding to packet 4831, and a modulated signal corresponding to packet 4841. Reception device 217 in AP 4420-11 then simultaneously receives a modulated signal corresponding to packet 4812, a modulated signal corresponding to packet 4822, a modulated signal corresponding to packet 4832, and a modulated signal corresponding to packet 4842. Reception device 217 in AP 4420-11 then simultaneously receives a modulated signal corresponding to packet 4813, a modulated signal corresponding to packet 4823, a modulated signal corresponding to packet 4833, and a modulated signal corresponding to packet 4843. Reception device 217 in AP 4420-11 then simultaneously receives a modulated signal corresponding to packet 4814, a modulated signal corresponding to packet 4824, a modulated signal corresponding to packet 4834, and a modulated signal corresponding to packet 4844.

By demodulating/decoding the synthesized reception signal, packets 4801, 4802, 4803, 4804, 4805, ... can be obtained.

6.5 Operation of AP 4420-1 as Master AP

Figure 49:
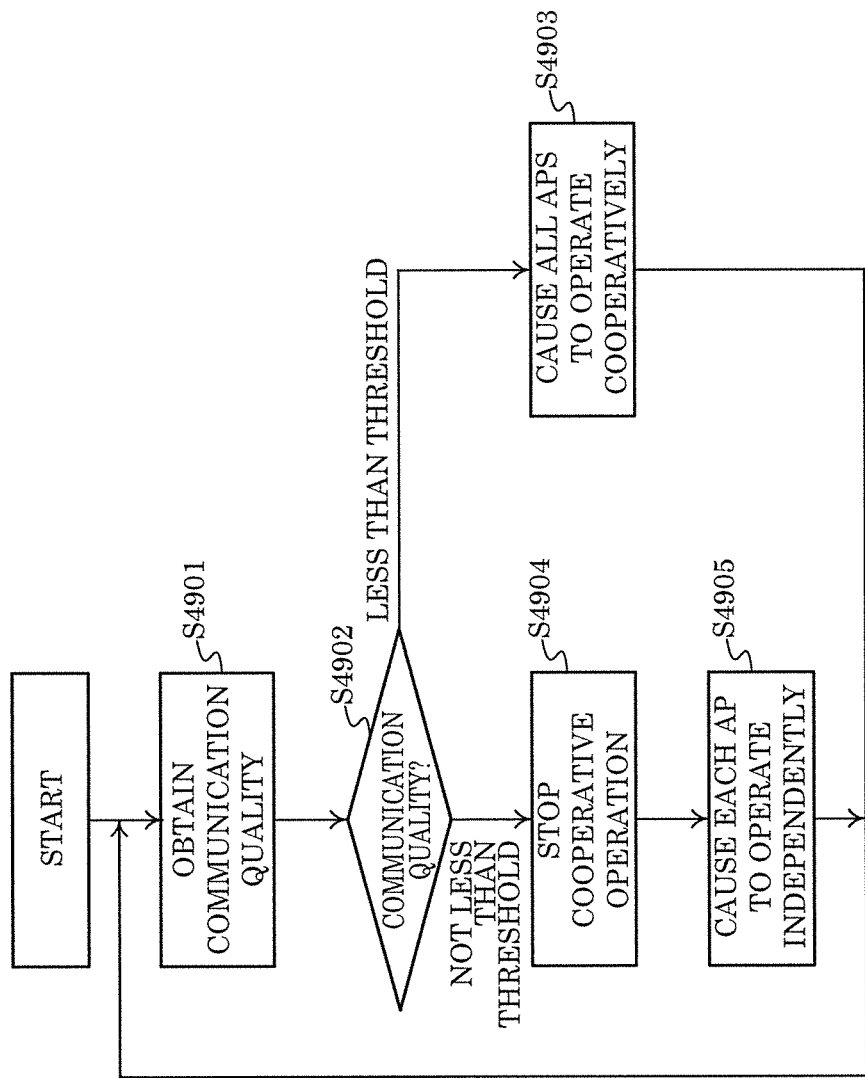
FIG. 49 is a flowchart illustrating the operation of AP 4420-1 which is a master AP.

The operation of AP 4420-1 which is a master AP is described below, with reference to a flowchart in FIG. 49.

Indicator 4402 in AP 4420-1 which is a master AP obtains communication quality of communication with AP 4420-11 which is a communication partner (Step S4901). Indicator 4402 then determines whether or not the obtained communication quality is not less than a threshold (Step S4902).

In the case where the obtained communication quality is less than the threshold (Step S4902: "less than threshold"), for example, indicator 4402 causes APs 4420-2, 4420-3, and 4420-4 to perform cooperative operation to transmit the same data (Step S4903). Indicator 4402 then returns to Step S4901 and repeats the process.

In the case where the obtained communication quality is not less than the threshold (Step S4902: "not less than threshold"), for example, indicator 4402 stops the cooperative operation of APs 4420-2, 4420-3, and 4420-4 (stops the transmission of the same data) (Step S4904). For example, indicator 4402 causes APs 4420-2, 4420-3, and 4420-4 to resume independent operation. The independent operation is operation before the cooperative operation starts (Step S4905). Indicator 4402 then returns to Step S4901 and repeats the process.

6.6 Transmission of Training Signal by Each AP

For example, AP 4420-1 transmits a training signal both during clear weather, and during rainfall. A communication partner receives the training signal, and transmits the reception result to AP 4420-1. AP 4420-1 obtains the reception result, thus obtaining communication quality with the AP on the receiving side. AP 4420-1 determines whether to perform or stop the above-mentioned cooperative operation, using the obtained communication quality. AP 4420-1 transmits the result indicating "whether to perform or stop cooperative operation", to APs 4420-2, 4420-3, and 4420-4 (here, AP 4420-1 may transmit "whether to perform or stop cooperative operation" to APs 4420-2, 4420-3, and 4420-4 via the parent station, or transmit "whether to perform or stop cooperative operation" directly to APs 4420-2, 4420-3, and 4420-4). In the case of determining to "perform cooperative operation", AP 4420-1 transmits information about a phase change value method, a modulation scheme, and encoding method to be used, to APs 4420-2, 4420-3, and 4420-4 (here, AP 4420-1 may transmit information about a phase change value method, a modulation scheme, and encoding method to be used, to APs 4420-2, 4420-3, and 4420-4 via the parent station).

In this embodiment, no mode for setting "multicast" may be provided (for example, in the case of applying this embodiment to a communication device installed in a building and a communication device installed in a building, there may be instances where multicast need not be performed).

Figure 47:
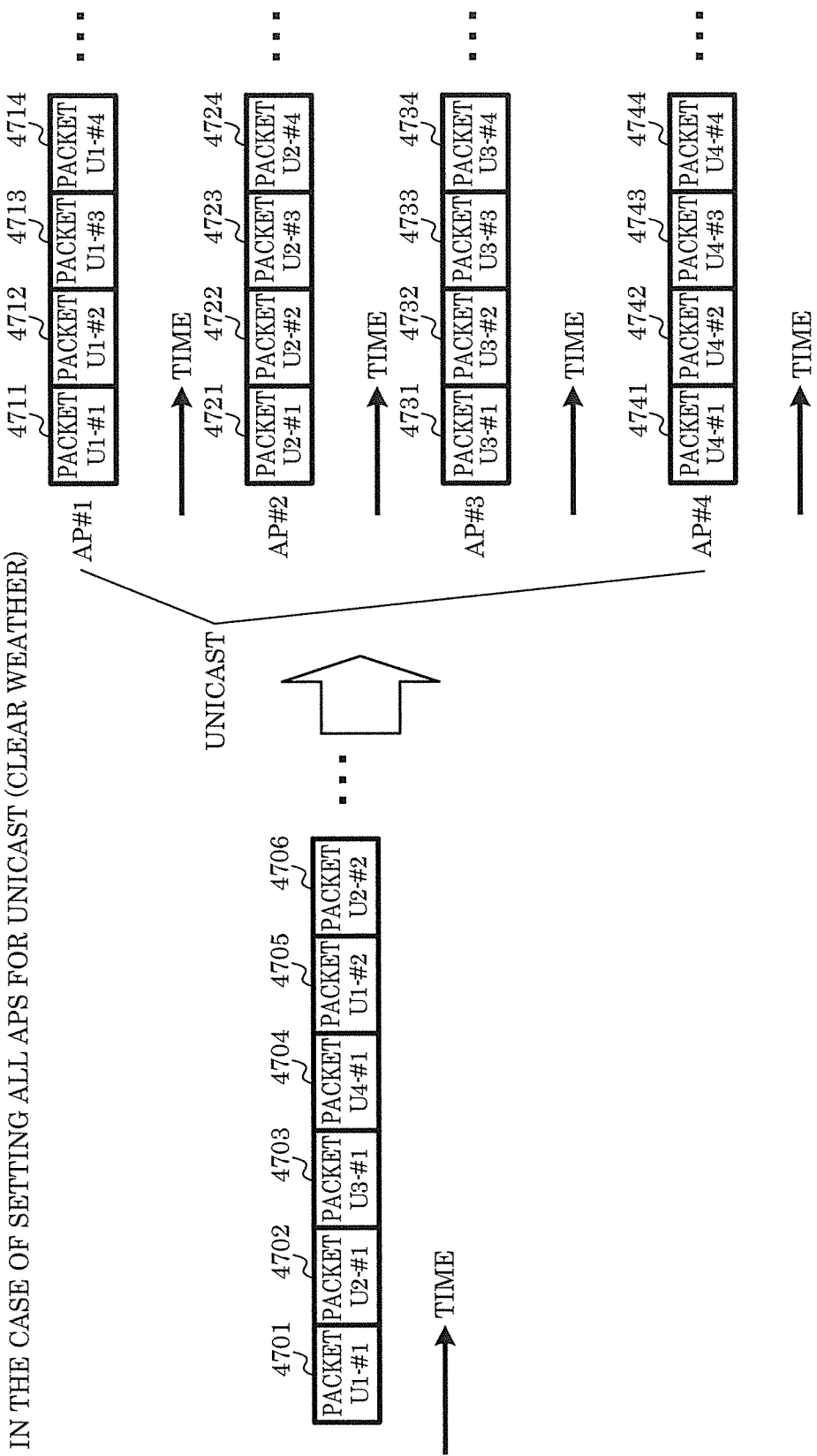
FIG. 47 is a diagram illustrating an example of transmitted data in the case of setting all APs 4420-1, 4420-2, 4420-3, and 4420-4 for unicast during clear weather.

Although the above describes an example where a master AP and non-master APs perform cooperative operation, cooperative operation in the case where a parent station has part of the functions of a master AP as illustrated in FIGS. 1, 25, etc. may be employed in switching the frame structure as illustrated in FIG. 47 and the frame structure as illustrated in FIG. 48 during clear weather and during rainfall. The structure of a transmission system for switching cooperative operation between during clear weather and during rainfall is not limited to such, and the above-mentioned function of "switching cooperative operation between during clear weather and during rainfall" per se is important.

6.4 Conclusion

According to this embodiment, large-capacity transmission of Gbps can be achieved. In addition, wireless communication can be ensured even in the case of rainfall. Furthermore, since the master AP stops cooperative operation when returning to clear weather from rainfall, so that unnecessary power consumption caused by performing cooperative operation during clear weather can be prevented.

Although the above embodiment describes the case where four APs perform cooperative operation, this is not a limitation. Two or more APs may perform cooperative operation. (Supplementary Remarks)

The embodiments and other contents in this description may be combined.

The embodiments and other contents are merely illustrative. For example, even when "modulation scheme, error (loss) correction encoding scheme (error correction encoding, code length, encoding rate, etc.), control information, etc." are illustrated, other "modulation scheme, error (loss) correction encoding scheme (error correction encoding, code length, encoding rate, etc.), control information, etc." may be similarly used in the same structure.

The embodiments and other contents in this description can be carried out using modulation schemes other than the modulation schemes mentioned in this description. Examples include amplitude phase shift keying (APSK) (e.g. 16 APSK, 64 APSK, 128 APSK, 256 APSK, 1024 APSK, 4096 APSK, etc.), pulse amplitude modulation (PAM) (e.g. 4 PAM, 8 PAM, 16 PAM, 64 PAM, 128 PAM, 256 PAM, 1024 PAM, 4096 PAM, etc.), phase shift keying (PSK) (e.g. BPSK, QPSK, 8 PSK, 16 PSK, 64 PSK, 128 PSK, 256 PSK, 1024 PSK, 4096 PSK, etc.), and quadrature amplitude modulation (QAM) (e.g. 4QAM, 8QAM, 16QAM, 64QAM, 128QAM, 256QAM, 1024QAM, 4096QAM, etc.). In each modulation scheme, uniform mapping or non-uniform mapping may be used.

The transmission method in the wireless communication scheme may be a transmission method (SISO (Single-Input Single-Output) transmission method, SIMO (Single-Input Multiple-Output) transmission method) in which a transmission device has one antenna and a reception device receives a signal with one or more antennas, or a transmission method (MIMO (Multiple-Input Multiple-Output) transmission method, MISO (Multiple-Input Single-Output) transmission method) in which a transmission device transmits a plurality of streams and a reception device receives a modulated signal with one or more antennas. Moreover, space-time block encoding or space-time trellis encoding may be used (in the case of using a multicarrier scheme such as OFDM, symbols may be arranged in a time axis direction, in a frequency axis direction, or in a frequency-time axis direction).

The term "complex number" in this description is used to refer to "defining in a complex number", which includes a real number with an imaginary component being 0.

The present disclosure is not limited to the above embodiments, and can be implemented in any form for achieving the object according to the present disclosure and its related or subsidiary object. For example, the following are applicable.

(1) The operation procedure of the communication device on the communication station side described in each of the above embodiments may be described in a program, and the program may be stored in read only memory (ROM) beforehand. A central processing unit (CPU) may then read the program stored in the ROM and execute it. Alternatively, the program describing the operation procedure of the communication device on the communication station side may be stored in a computer-readable storage medium and loaded into random access memory (RAM) in a computer. A CPU of the computer may then read the program stored in the RAM and execute it.

(2) The structural elements in each of the above embodiments may be typically realized by large scale integration (LSI) which is an integrated circuit. The structural elements may each be individually implemented as one chip, or may be partly or wholly implemented on one chip.

Although LSI is mentioned here, the integrated circuit may be called (integrated circuit) IC, system LSI, super LSI, or ultra LSI, depending on the degree of integration.

The integrated circuit technology is not limited to LSI, and may be realized by a dedicated circuit or a general-purpose processor. A field programmable gate array (FPGA) which can be programmed or a reconfigurable processor which is capable of reconfiguring connections and settings of circuit cells in LSI after LSI manufacturing may be used.

Furthermore, when an integrated circuit technology that replaces LSI emerges from development of semiconductor technologies or other derivative technologies, such a technology may be used to integrate the functional blocks. For instance, biotechnology may be adapted in this way.

In this description, for example, communication/broadcast equipment such as a broadcast station, a base station, an access point, a terminal, or a mobile phone includes a transmission device, and communication equipment such as a television, a radio, a terminal, a personal computer, a mobile phone, an access point, or a base station includes a reception device. A transmission device and a reception device according to the present disclosure may be equipment that has a communication function and can be connected, via some kind of interface, to a device for executing an application such as a television, a radio, a personal computer, or a mobile phone.

In each embodiment, symbols other than data symbols, such as pilot symbols (pre-amble, unique word, post-amble, reference symbol, etc.) and control information symbols, may be arranged in a frame in any way. Although the terms such as pilot symbols and control information symbols are used here, any terms may be used, and the functions per se are important.

For example, a pilot symbol is any known symbol modulated in a transmitter/receiver using PSK modulation (alternatively, the receiver may be able to know the symbol transmitted by the transmitter, through synchronization). The receiver performs frequency synchronization, time synchronization, channel estimation (channel state information (CSI) estimation) (of each modulated signal), signal detection, etc., using this symbol.

A control information symbol is a symbol for transmitting information (e.g. modulation scheme, error (loss) correction encoding scheme, encoding rate in error (loss) correction encoding scheme, upper layer setting information, etc. used in communication) that needs to be transmitted to the communication partner to realize communication of information (e.g. application) other than data.

The transmission device and the reception device need to be notified of a transmission method (MIMO, SISO, space-time block encoding, interleave scheme), a modulation scheme, an error correction encoding scheme, and a packet-level error (loss) correction scheme, although the description of this part is omitted in some embodiments. A symbol for transmitting these information is present in a frame transmitted by the transmission device, with the reception device obtaining the symbol and changing its operation.

The present disclosure is not limited to the above embodiments, and various modifications are possible. For example, although each of the above embodiments is carried out as a communication device, this is not a limitation, and its communication method may be realized as software.

INDUSTRIAL APPLICABILITY

A transmission method according to the present disclosure enables wireless transmission in a plurality of transmission devices using a millimeter wave frequency bandwidth, and so is useful as a wireless communication technique.

REFERENCE MARKS IN THE DRAWINGS

110 parent station
121 to 124 AP
131 to 138 terminal
202 encoder
204 interleaver
206 mapping unit
208 phase changer
210 wireless unit
212 antenna
215 antenna
217 reception device
302 transmission data separator
305 reception data separator
308 indicator
100, 1400, 1500, 1600 wireless communication system
1800, 2500, 3400, 4400 wireless communication system

The invention claimed is:

1. A transmission system, comprising:
a first transmitter and a second transmitter that are each configured to perform unicast of transmission data to a reception device, the unicast including a first unicast mode and a second unicast mode, the first transmitter and the second transmitter being each configured to switch between the first unicast mode and the second unicast mode regardless of a position of the reception device,
wherein, in the first unicast mode,
the first transmitter transmits a first signal to the reception device;
the second transmitter transmits a second signal to the reception device;
the first signal and the second signal carry the same data; and
the first signal and the second signal are transmitted simultaneously at the same frequency, and
wherein, in the second unicast mode,
the second transmitter does not unicast to the reception device; and
the first transmitter transmits a third signal to the reception device.

2. The transmission system according to claim 1, wherein the second transmitter transmits a fourth signal to another reception device in the second unicast mode.

3. The transmission system according to claim 2, wherein at least one of the first transmitter or the second transmitter performs phase-change in the second unicast mode.

4. The transmission system according to claim 1, wherein the first transmitter and the second transmitter are each configured to transmit a signal as a millimeter wave having a frequency higher than 6 GHz.

5. The transmission system according to claim 1, wherein the first transmitter and the second transmitter are each configured to switch between the first unicast mode and the second unicast mode according to an instruction signal, the instruction signal being generated based on attenuation characteristics or input from a user.

6. The transmission system according to claim 1, wherein the first transmitter and the second transmitter are each configured to perform multicast in a multicast mode.

7. A transmission method used in a transmission system including a first transmitter and a second transmitter that perform unicast of transmission data to a reception device, the unicast including a first unicast mode and a second unicast mode, the transmission method comprising:
switching between the first unicast mode and the second unicast mode regardless of a position of the reception device;
in the first unicast mode,
transmitting, by the first transmitter, a first signal to the reception device;

transmitting, by the second transmitter, a second signal to the reception device; and changing the first unicast mode to the second unicast mode;

in the second unicast mode, controlling the second transmitter not to unicast to the reception device;

transmitting, by the first transmitter, a third signal to the reception device, and changing the second unicast mode to the first unicast mode, wherein, in the first unicast mode, the first signal and the second signal carry the same data; and the first signal and the second signal are transmitted simultaneously at the same frequency.

8. The transmission method according to claim 7, wherein in the second unicast mode, a fourth signal is transmitted to another reception device from the second transmitter.

9. The transmission method according to claim 8, wherein in the second unicast mode, phase-change is performed in at least one of the first transmitter or the second transmitter.

10. The transmission method according to claim 7, wherein a signal is transmitted from each of the first transmitter and the second transmitter as a millimeter wave having a frequency higher than 6 GHz.

11. The transmission method according to claim 7, wherein a unicast mode is switched between the first unicast mode and the second unicast mode if the first transmitter and the second transmitter receive an instruction signal, the instruction signal being generated based on attenuation characteristics or input from a user.

12. The transmission method according to claim 7, further comprising: performing multicast, by the first transmitter and the second transmitter, in a multicast mode.

13. A transmission system comprising:

a first access point (AP);

a second AP; and a control circuit configured to control the first AP and the second AP, regardless of a position of a reception device, to unicast such that:

in a first period, the first AP and the second AP unicast first data and second data to the reception device simultaneously at a first frequency channel, respectively, the first data being same as the second data; and in a second period, the first AP unicasts third data to the reception device and the second AP does not unicast to the reception device.

14. The transmission system according to claim 13, wherein the control circuit is configured to detect characteristics of a communication path between the first AP to the reception device, and the control circuit is configured to determine whether to control the second AP to unicast to the reception device based on the characteristics.

15. The transmission system according to claim 13, wherein the control circuit is configured to control the second AP to unicast fourth data to another reception device in the second period.

16. The transmission system according to claim 15, wherein at least one of the first AP or the second AP performs phase-change in the second period.

17. The transmission system according to claim 13, wherein the first AP and the second AP are each configured to transmit a signal as a millimeter wave having a frequency higher than 6 GHz.

18. The transmission system according to claim 13, wherein the first AP and the second AP are each configured to perform multicast in a third period.

19. The transmission system according to claim 13, wherein a first packet containing the first data has a first destination address, a second packet containing the second data has a second destination address, and the first destination address is same as the second destination address.

* * * * *